United States Patent
Sugiyama et al.

(10) Patent No.: US 10,983,342 B2
(45) Date of Patent: Apr. 20, 2021

(54) LIGHT SOURCE APPARATUS AND HEAD UP DISPLAY APPARATUS

(71) Applicant: MAXELL, LTD., Kyoto (JP)

(72) Inventors: Toshinori Sugiyama, Kyoto (JP); Koji Hirata, Kyoto (JP); Masahiko Yatsu, Kyoto (JP); Yasuhiko Kunii, Kyoto (JP); Kazuomi Kaneko, Kyoto (JP)

(73) Assignee: MAXELL, LTD., Kyoto (JP)

( * ) Notice: Subject to any disclaimer, the term of this patent is extended or adjusted under 35 U.S.C. 154(b) by 167 days.

(21) Appl. No.: 16/336,935

(22) PCT Filed: Sep. 27, 2017

(86) PCT No.: PCT/JP2017/035045
§ 371 (c)(1),
(2) Date: Mar. 27, 2019

(87) PCT Pub. No.: WO2018/066437
PCT Pub. Date: Apr. 12, 2018

(65) Prior Publication Data
US 2019/0265472 A1    Aug. 29, 2019

(30) Foreign Application Priority Data

Oct. 4, 2016  (JP) .............................. JP2016-196500
Jun. 16, 2017 (JP) .............................. JP2017-118315

(51) Int. Cl.
*G02B 27/01* (2006.01)
*F21V 8/00* (2006.01)
*F21S 2/00* (2016.01)
*G03B 21/00* (2006.01)
(Continued)

(52) U.S. Cl.
CPC .......... *G02B 27/0101* (2013.01); *B60K 35/00* (2013.01); *F21S 2/00* (2013.01);
(Continued)

(58) Field of Classification Search
CPC .......................... G02B 27/01; G02B 19/0028; G02B 19/0061; G02B 27/0101; G02B 27/0149;
(Continued)

(56) References Cited

U.S. PATENT DOCUMENTS

2010/0195022 A1* 8/2010 Shikii .................. G02B 6/0028
349/65
2012/0162549 A1* 6/2012 Gao .................... G02B 27/0172
349/11
(Continued)

FOREIGN PATENT DOCUMENTS

JP    7-294745 A    11/1995
JP    11-224518 A    8/1999
(Continued)

OTHER PUBLICATIONS

International Search Report of PCT/JP2017/035045 dated Dec. 19, 2017.
(Continued)

*Primary Examiner* — Balram T Parbadia
(74) *Attorney, Agent, or Firm* — Mattingly & Malur, PC

(57) ABSTRACT

Provided is a light source apparatus that is small and lightweight, has high light utilization efficiency, and is easily utilizable as a modularized, planar light source. The light source apparatus 10 has a light source unit including a plurality of LED elements 14, a LED collimator 15 including a plurality of collimator elements each arranged on a light-emitting axis of each of the plural LED elements 14, and a light guide 17 disposed on an emission side of the LED collimator 15. The light guide 17 includes an incidence portion 171 having an incidence surface on which light on the light-emitting axis from the LED elements 14 is incident, and an emission portion 173c having an emission surface emitting light, and has a free-form surface shape for realiz-
(Continued)

ing predetermined light distribution control on at least one of the incidence surface and the emission surface.

17 Claims, 51 Drawing Sheets

(51) Int. Cl.
  *B60K 35/00* (2006.01)
  *G03B 21/14* (2006.01)
(52) U.S. Cl.
  CPC .............. *G02B 6/002* (2013.01); *G02B 6/003* (2013.01); *G02B 6/0023* (2013.01); *G02B 6/0025* (2013.01); *G02B 6/0048* (2013.01); *G02B 6/0051* (2013.01); *G02B 6/0055* (2013.01); *G02B 6/0085* (2013.01); *G02B 27/01* (2013.01); *G02B 27/0149* (2013.01); *G03B 21/00* (2013.01); *G03B 21/14* (2013.01); *G02B 2027/015* (2013.01); *G02B 2027/0159* (2013.01)
(58) Field of Classification Search
  CPC ...... G02B 27/283; G02B 5/09; G02B 6/0016; G02B 6/0018; G02B 6/002; G02B 6/0023; G02B 6/0025; G02B 6/003; G02B 6/0038; G02B 6/0048; G02B 6/0051; G02B 6/0055; G02B 6/0085; G02B 2027/015; G02B 2027/0159; G02B 6/0028; G03B 21/00; G03B 21/14; F21Y 115/10; B60K 35/00; F21S 2/00; F21V 8/00
  See application file for complete search history.

(56) References Cited

U.S. PATENT DOCUMENTS

| | | | | |
|---|---|---|---|---|
| 2012/0188791 | A1* | 7/2012 | Voloschenko | G02B 6/0055 362/606 |
| 2012/0194418 | A1* | 8/2012 | Osterhout | G02B 27/0149 345/156 |
| 2012/0206322 | A1* | 8/2012 | Osterhout | G02B 27/0093 345/8 |
| 2012/0206485 | A1* | 8/2012 | Osterhout | G06F 3/017 345/633 |
| 2012/0212414 | A1* | 8/2012 | Osterhout | G06F 3/011 345/158 |
| 2012/0224062 | A1* | 9/2012 | Lacoste | G02B 27/01 348/148 |
| 2013/0021581 | A1* | 1/2013 | Takahashi | H01S 5/02296 353/31 |
| 2014/0118829 | A1* | 5/2014 | Ma | G02B 27/0172 359/567 |
| 2014/0140091 | A1* | 5/2014 | Vasylyev | G02B 6/0085 362/606 |
| 2015/0061975 | A1* | 3/2015 | Komatsu | G02B 27/017 345/8 |
| 2016/0011419 | A1* | 1/2016 | Gao | G02B 27/0172 359/471 |
| 2016/0139408 | A1 | 5/2016 | Yagi | |
| 2017/0293148 | A1* | 10/2017 | Park | G02B 27/0172 |

FOREIGN PATENT DOCUMENTS

| | | |
|---|---|---|
| JP | 2000-249965 A | 9/2000 |
| JP | WO2010/050489 A1 | 3/2012 |
| JP | 2016-033668 A | 3/2016 |
| JP | 2016-095436 A | 5/2016 |
| JP | 2016-139050 A | 8/2016 |
| WO | 2016/121309 A1 | 8/2016 |

OTHER PUBLICATIONS

Japanese Office Action received in corresponding Japanese Application No. 2016-196500 dated Apr. 21, 2020.

* cited by examiner

FIG. 2
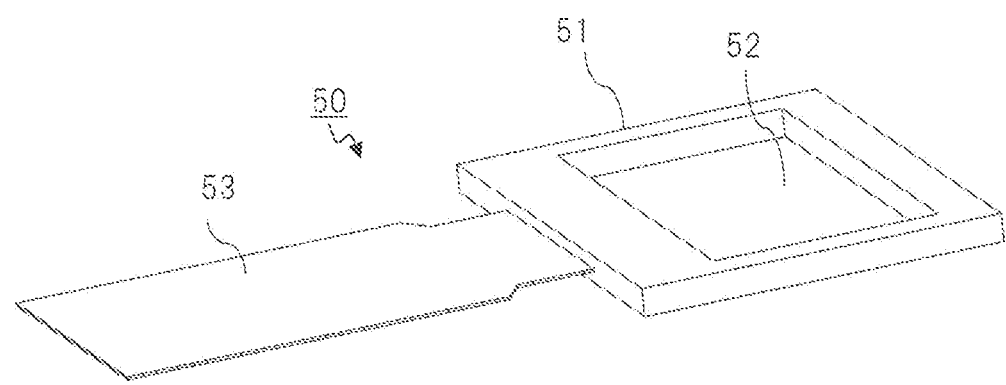
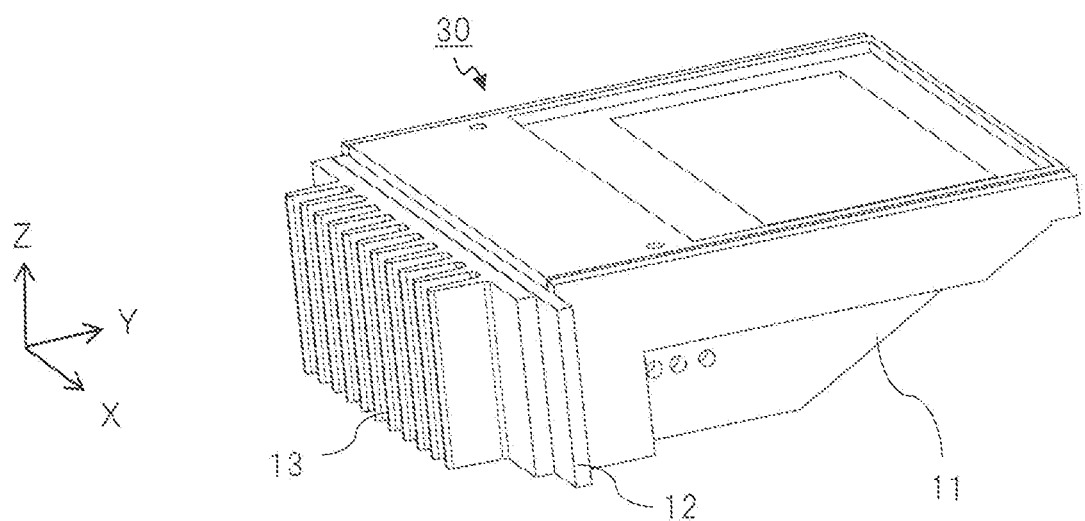

FIG. 7
(a)
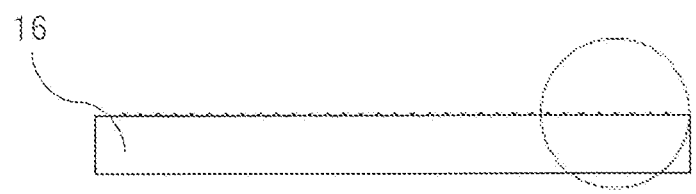
(b)
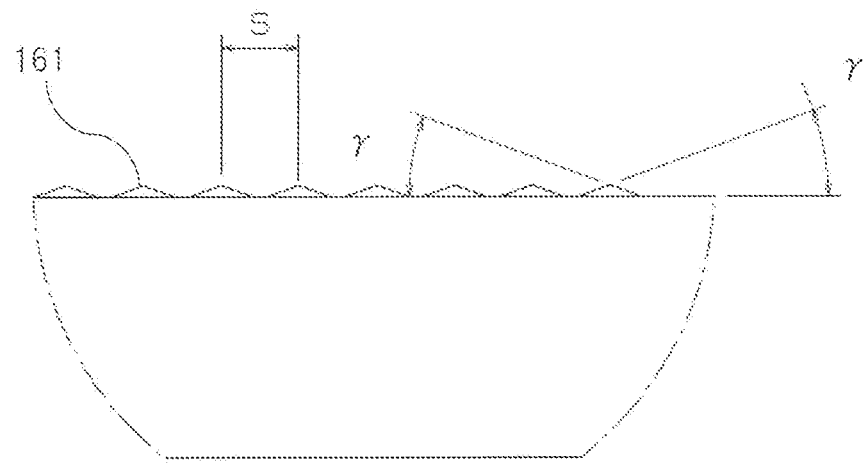

FIG. 8
(a)
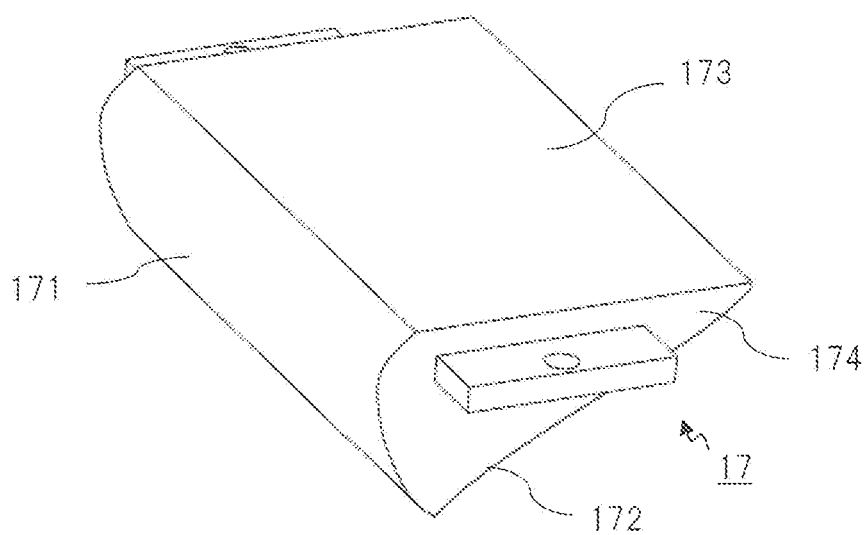
(b)
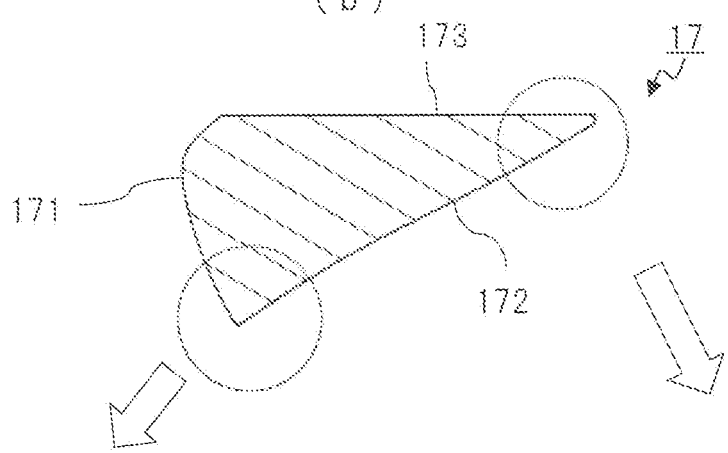
(c)
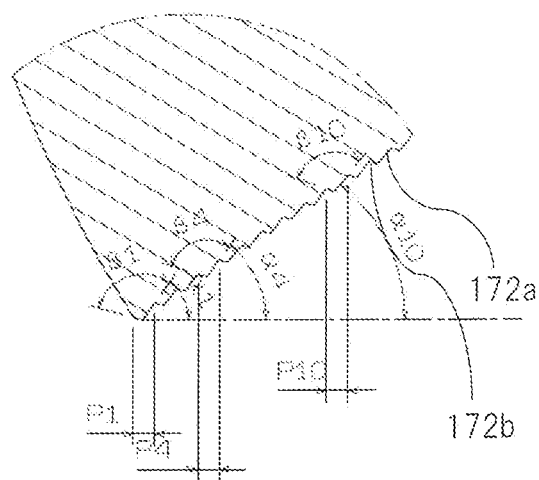
(d)
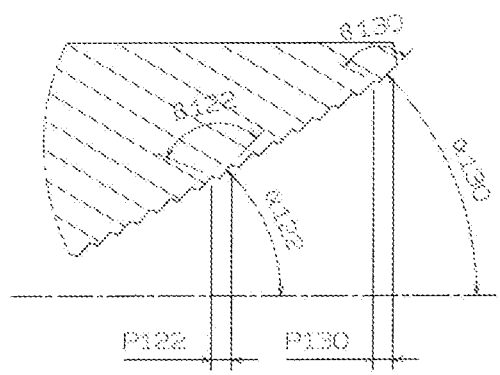

(COMPARATIVE EXAMPLE)

FIG. 16
(a)
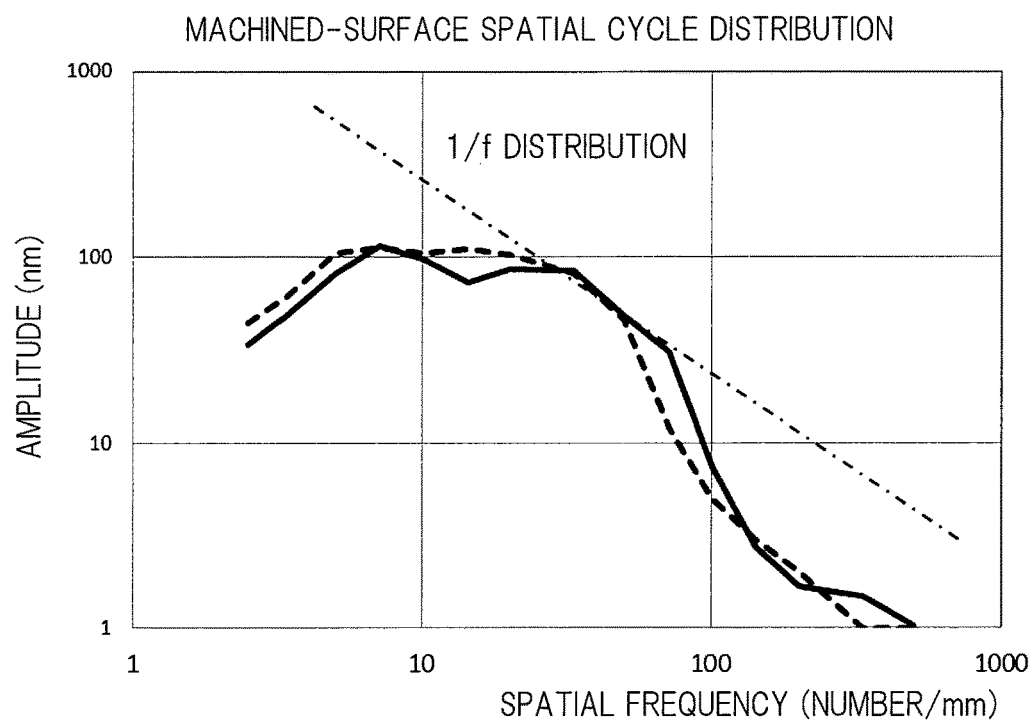
(b)
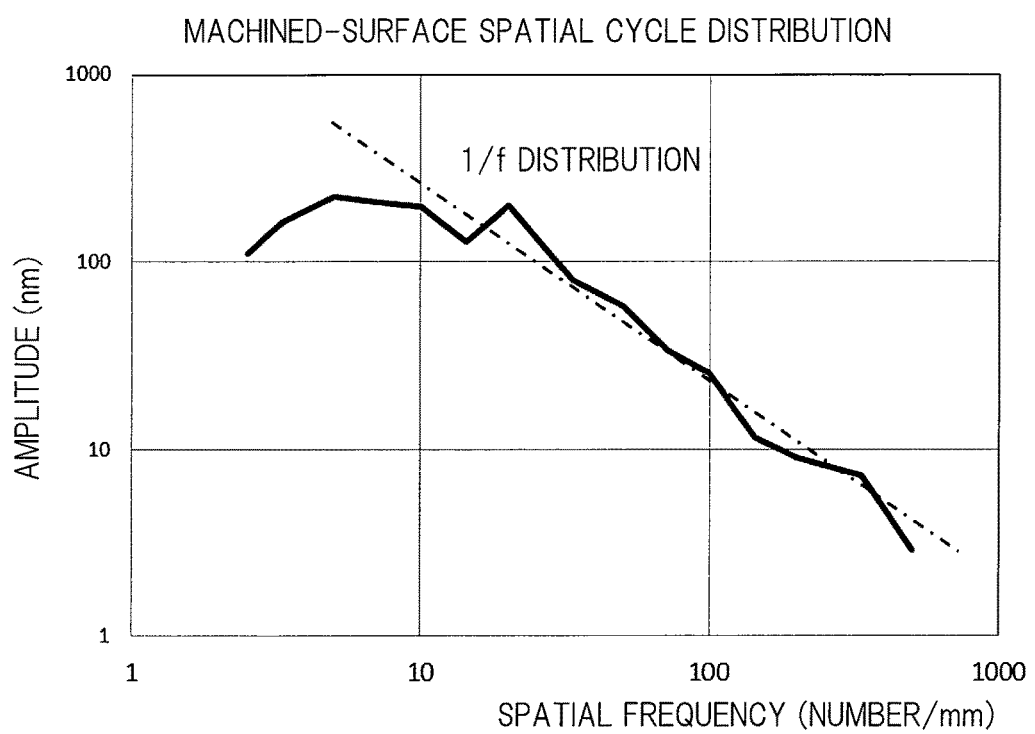

FIG. 17
(a)
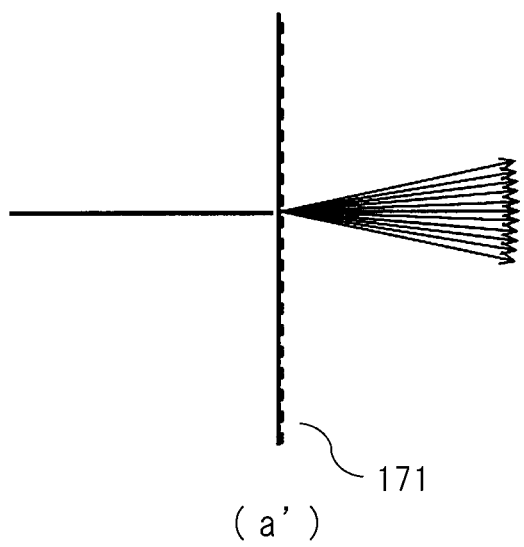
(b)
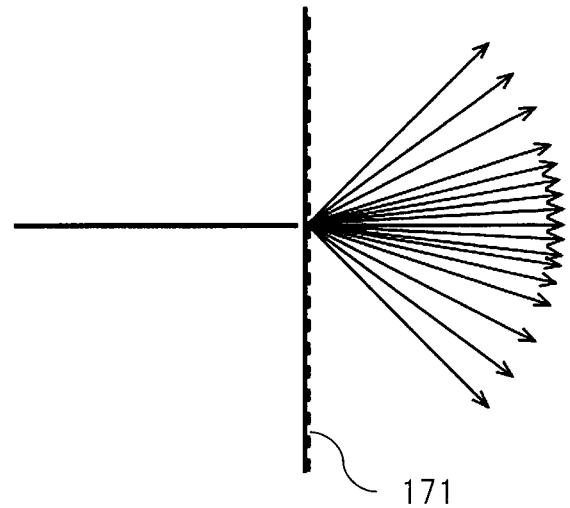
(a')
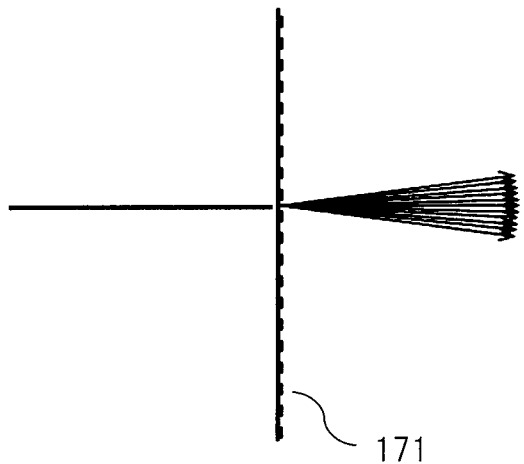

FIG. 20
(a)
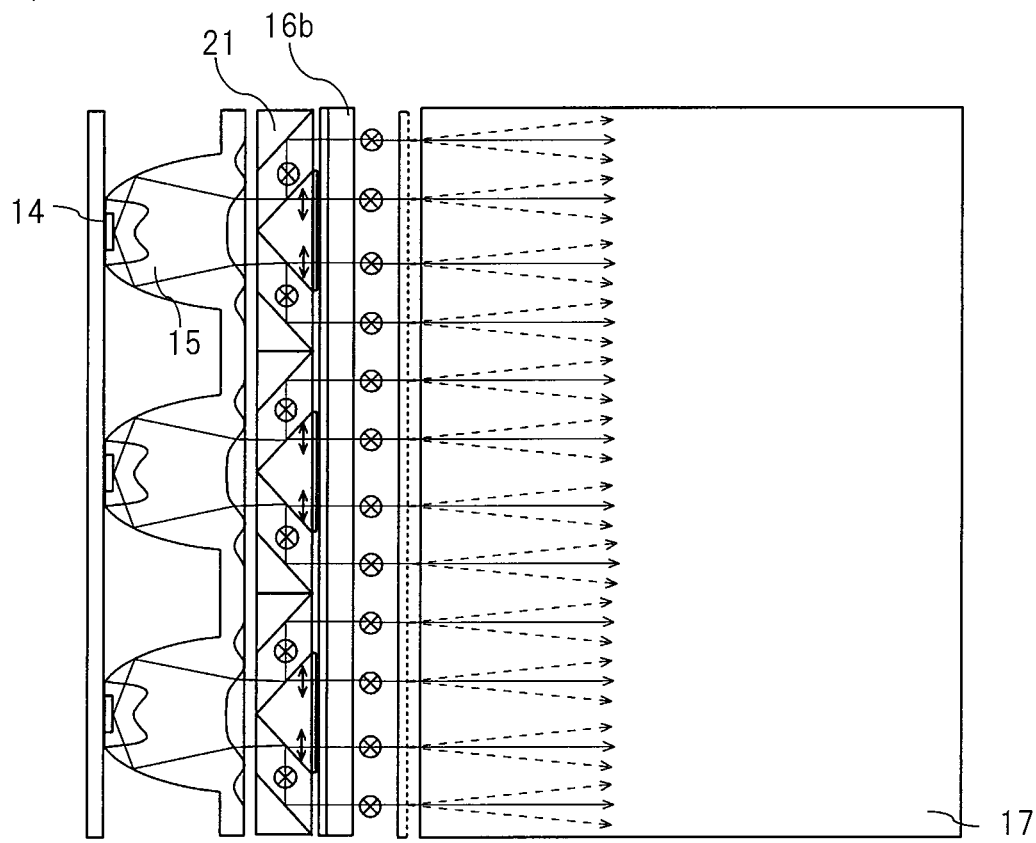
(b)
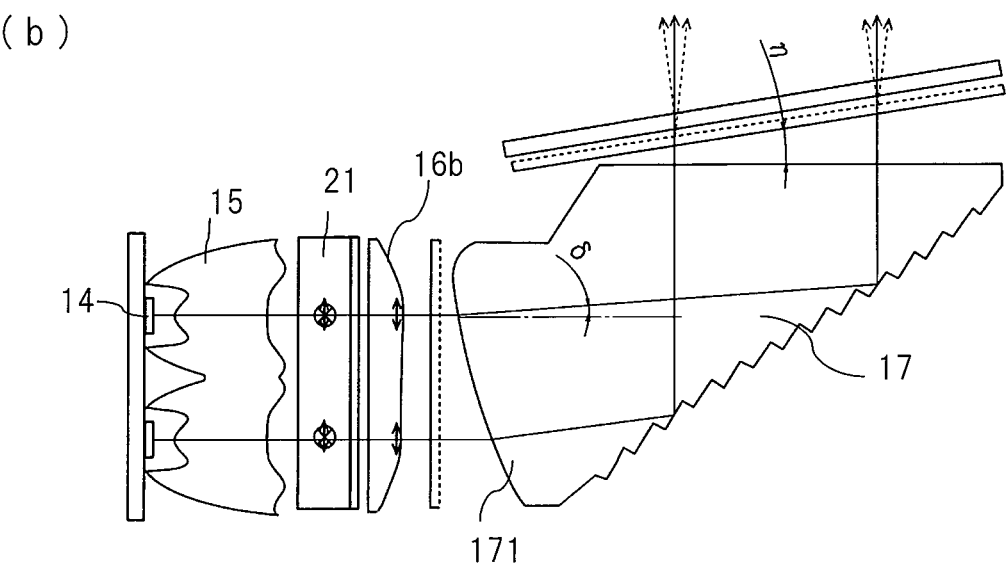

FIG. 22
(a) 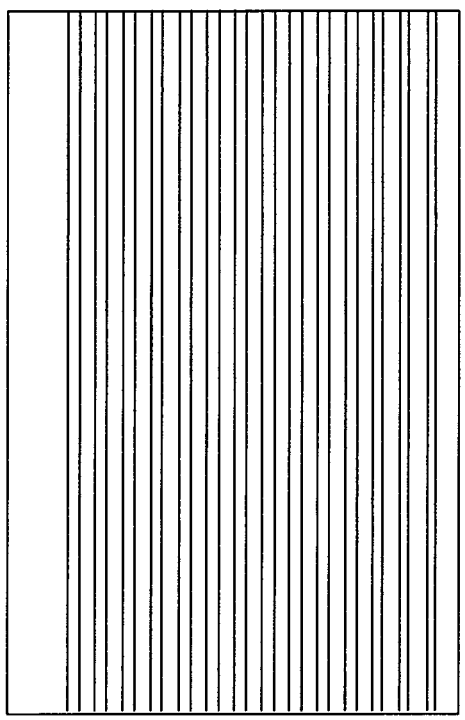
(b) 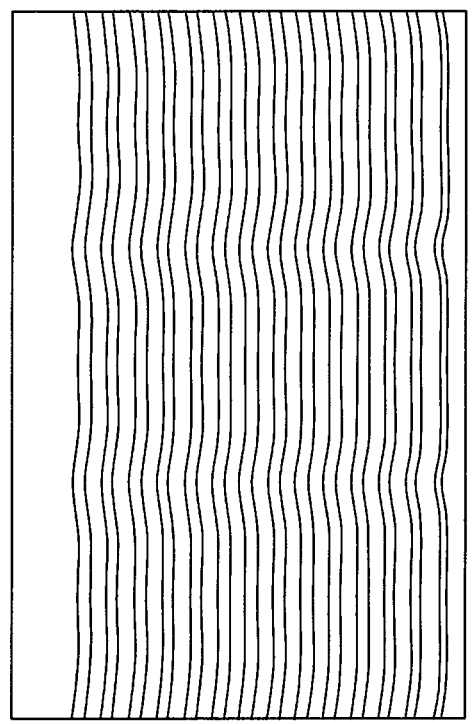

(EMBODIMENT 2)

10: LIGHT SOURCE APPARATUS
14: LED ELEMENT
15: LED COLLIMATOR
17: LIGHT GUIDE
21: POLARIZATION CONVERSION ELEMENT

171: INCIDENCE PORTION
172: REFLECTION PORTION
173: EMISSION PORTION
175: VERTEX PORTION

FIG. 34
(a)
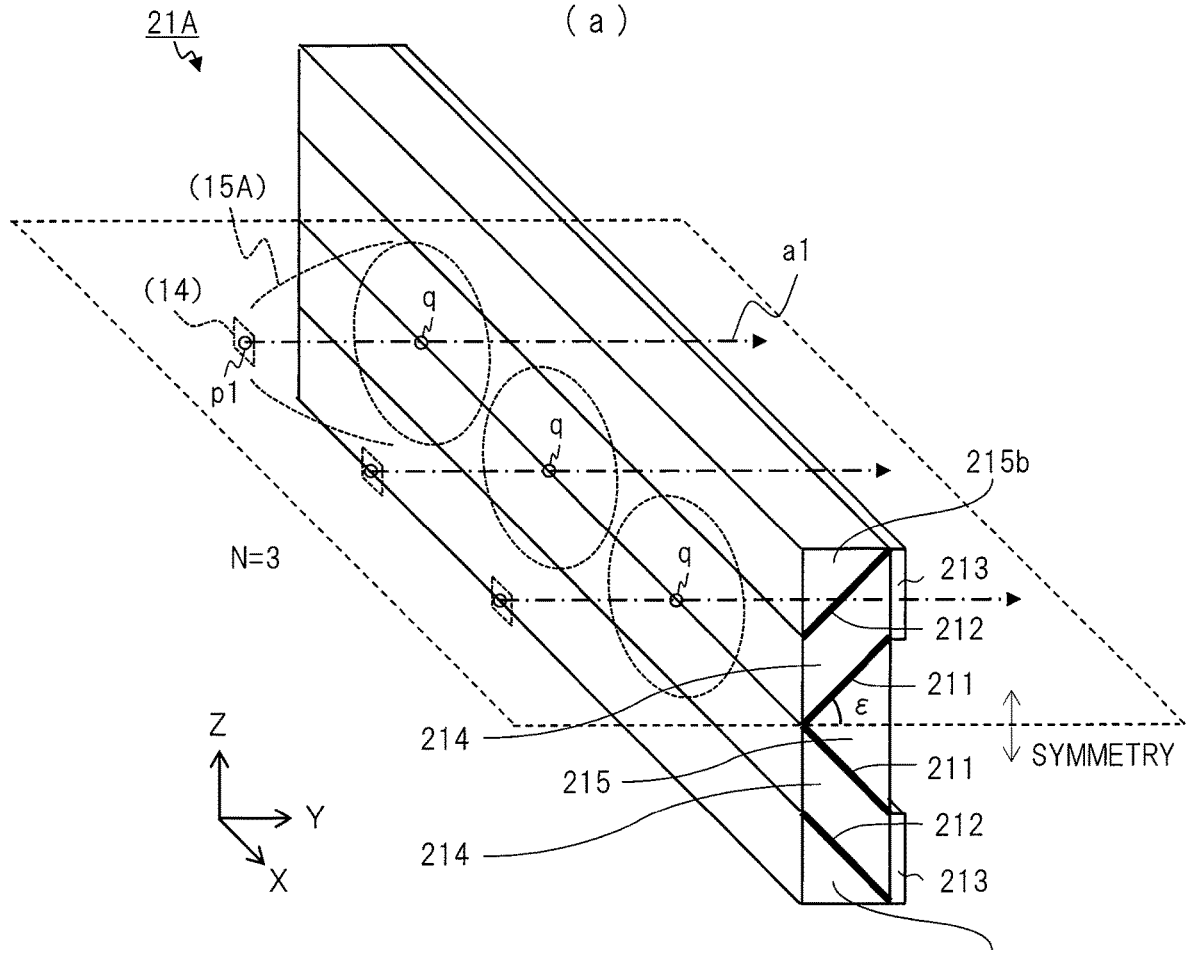
(b)
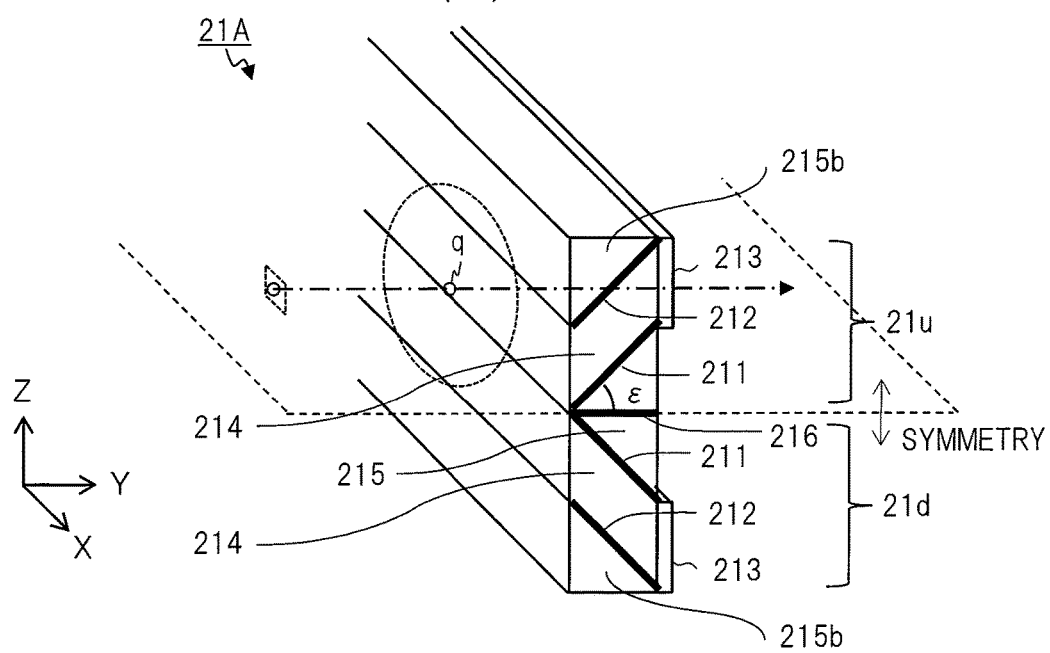

FIG. 35
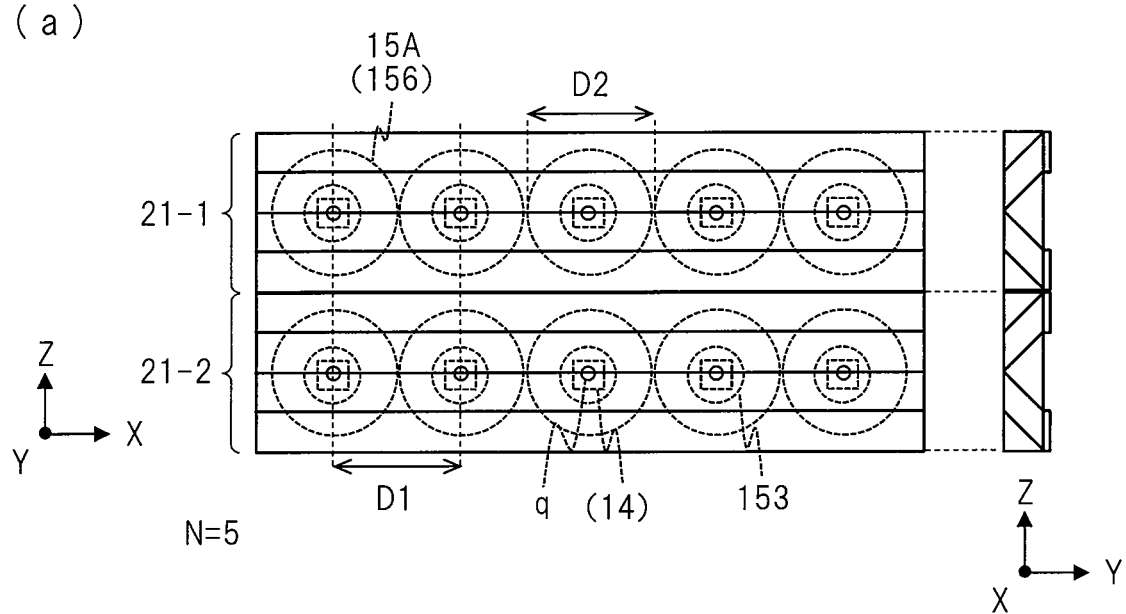
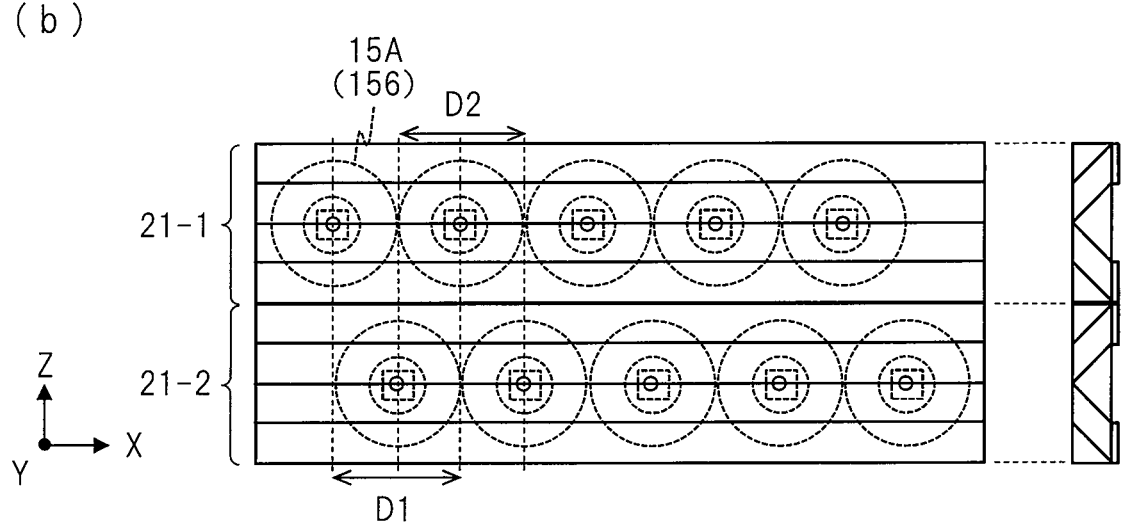

(COMPARATIVE EXAMPLE)

FIG. 38
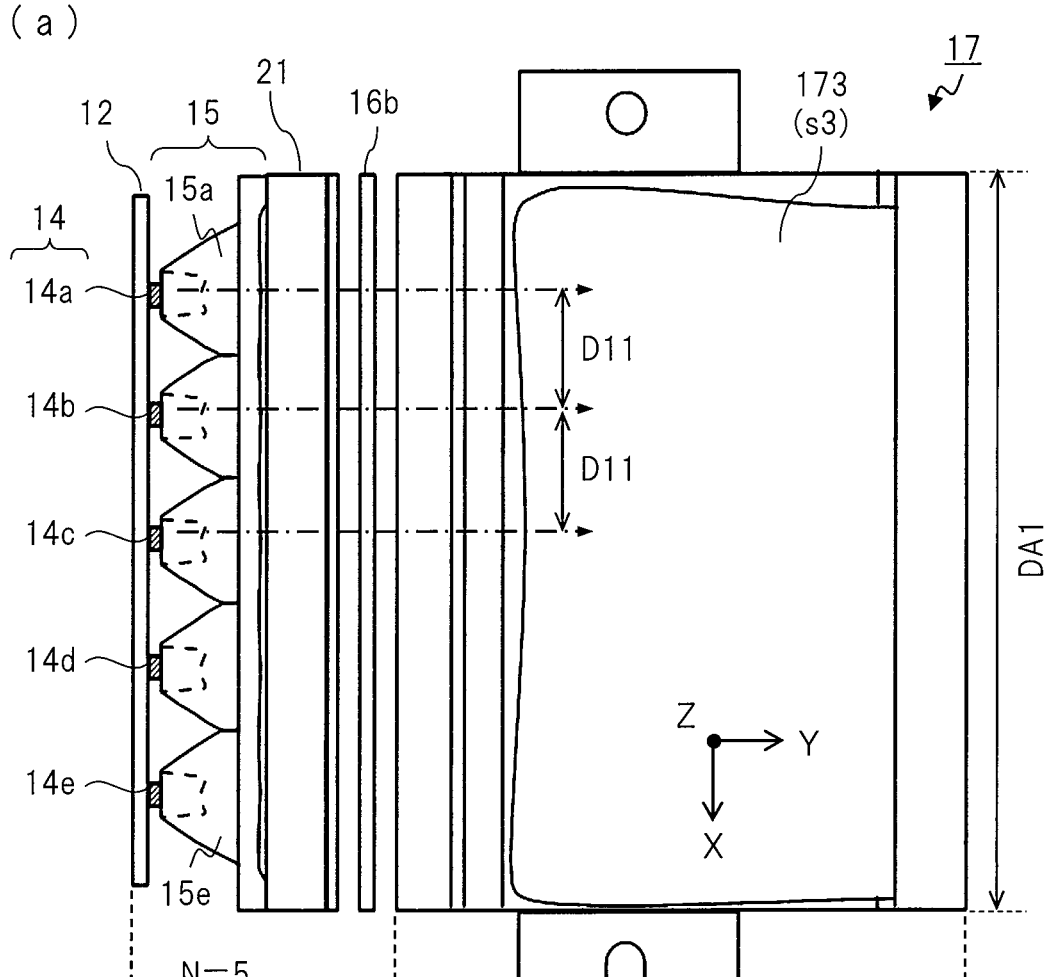
(a)
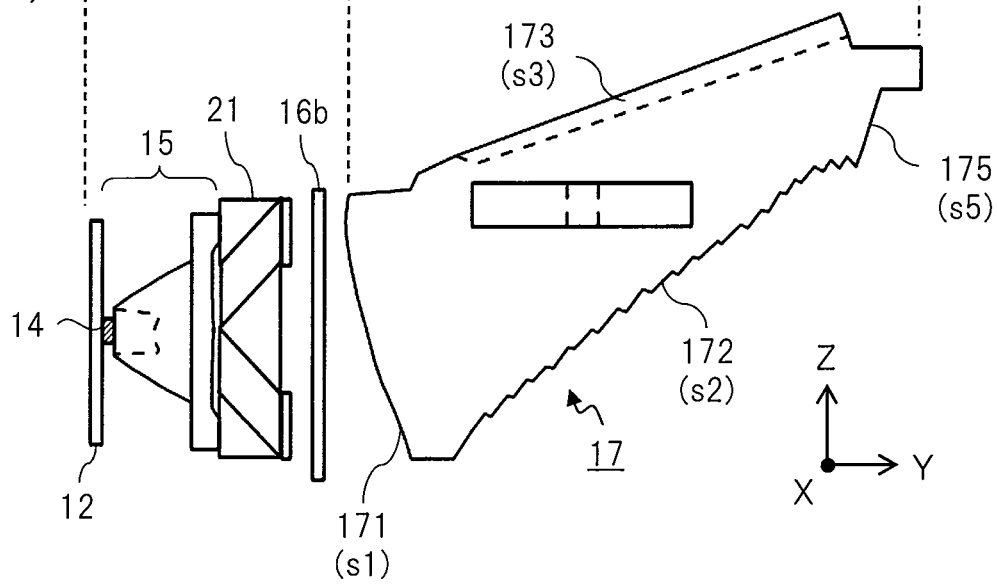
(b)

FIG. 39
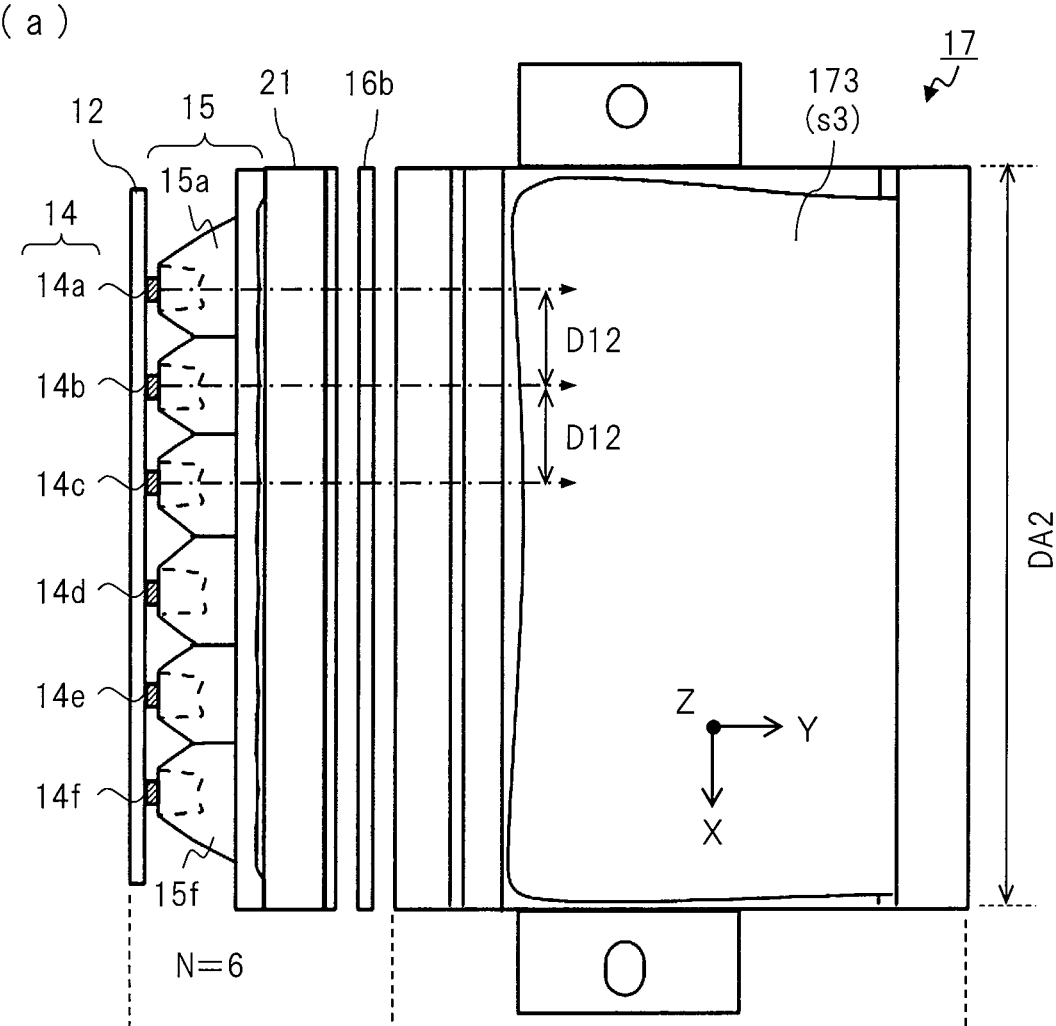
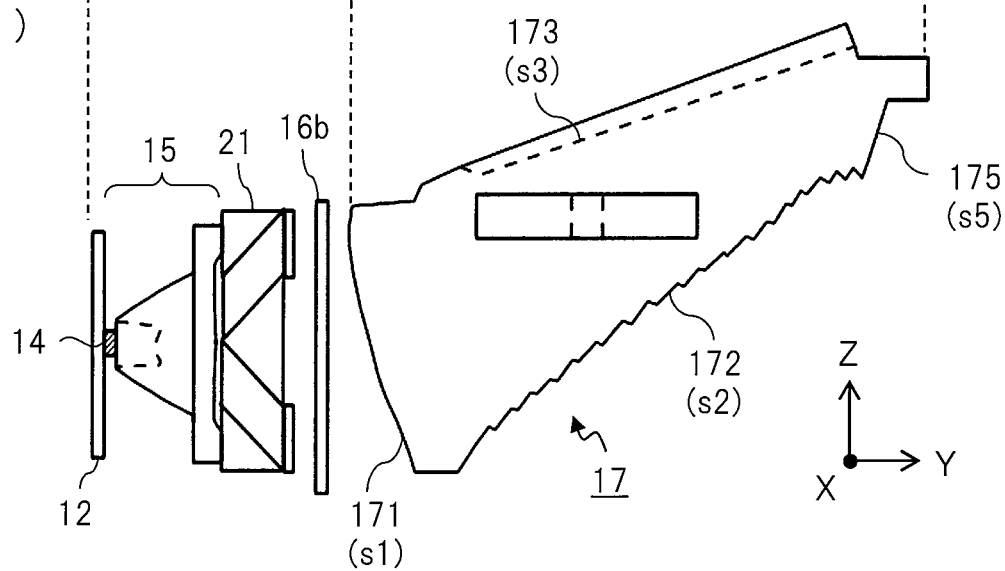

FIG. 41
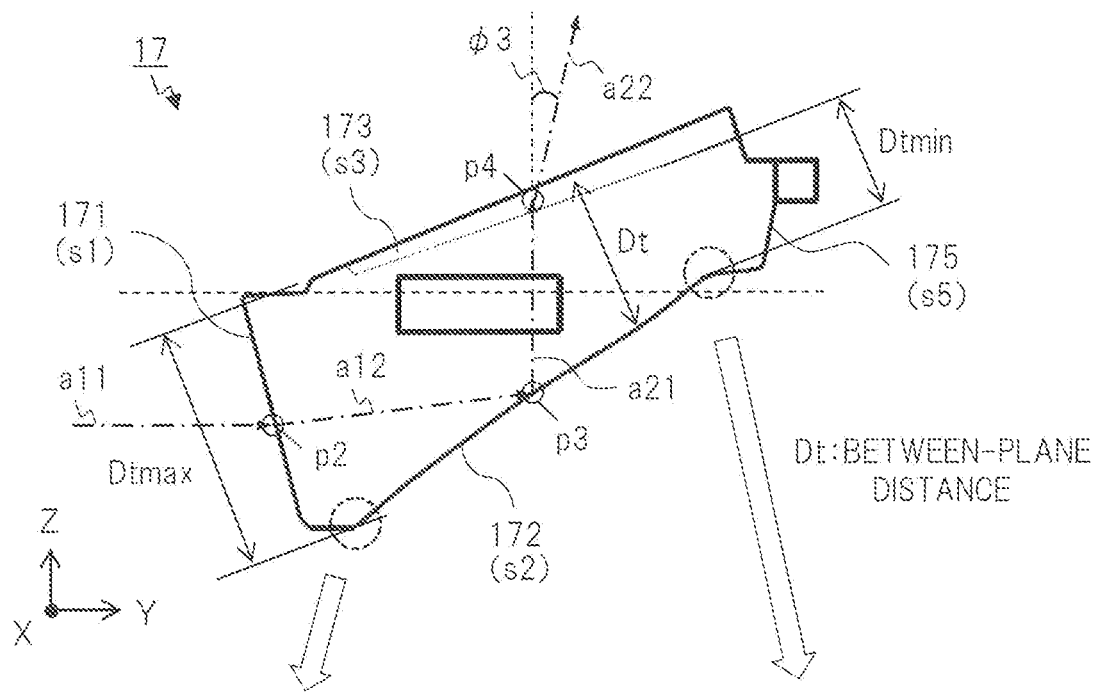
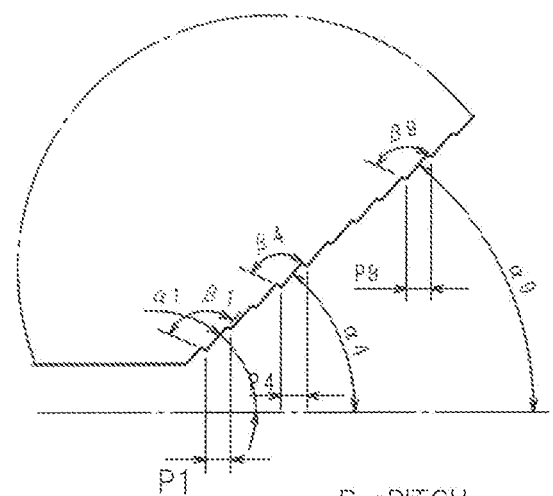
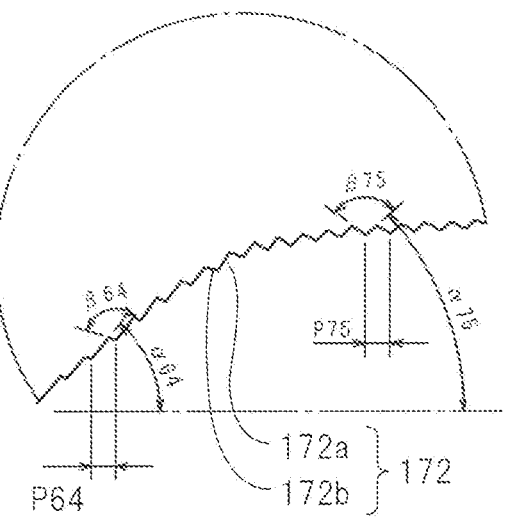
Pn: PITCH
αn: ANGLE
βn: ANGLE

FIG. 43
(a)　　　　　　　(b)
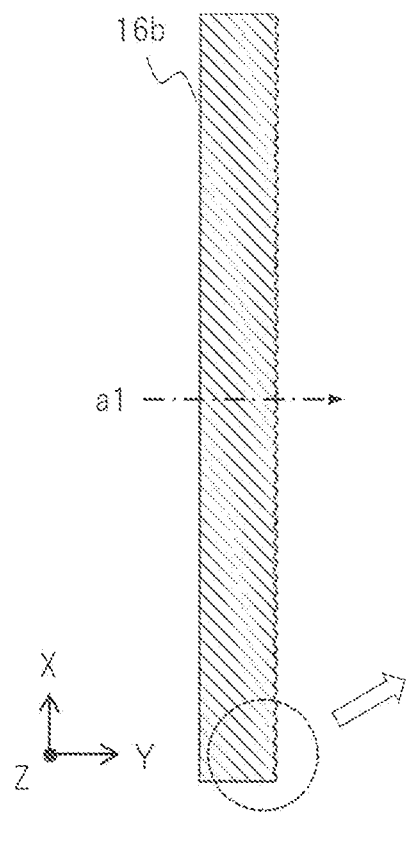
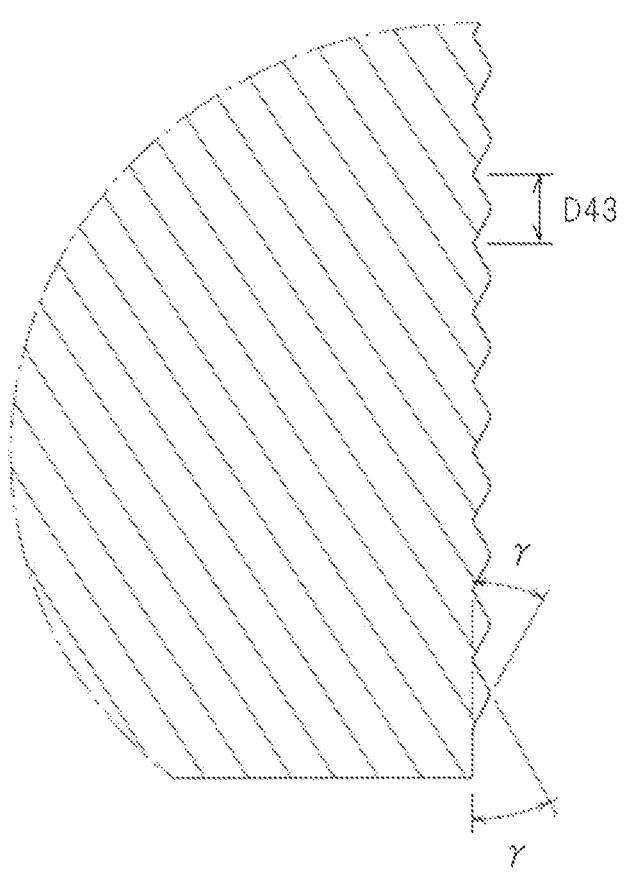

FIG. 44

(a) FREE-FORM SURFACE EQUATION $$z(x,y) = \sum_{14}^{i=0} \{a_i \cdot b_i(x,y)\}$$ ···EQUATION 1

(b) FREE-FORM SURFACE EQUATION COEFFICIENTS

| i | $b_i$ | $a_i$ |
|---|---|---|
| 0 | 1 | 1.02693079 |
| 1 | $x$ | −0.0015583 |
| 2 | $y$ | −0.0032924 |
| 3 | $x^2$ | 0.00527757 |
| 4 | $xy$ | −0.0010518 |
| 5 | $y^2$ | −5.607E−05 |
| 6 | $x^3$ | 9.1022E−06 |
| 7 | $x^2y$ | −0.0002461 |
| 8 | $xy^2$ | 6.1728E−05 |
| 9 | $y^3$ | 3.7869E−05 |
| 10 | $x^4$ | 1.2904E−06 |
| 11 | $x^3y$ | 6.0056E−07 |
| 12 | $x^2y^2$ | 2.3931E−07 |
| 13 | $xy^3$ | 7.4948E−07 |
| 14 | $y^4$ | 5.3049E−06 |

(FIRST MODIFICATION EXAMPLE)

(SECOND MODIFICATION EXAMPLE)

FIG. 47
(THIRD MODIFICATION EXAMPLE)
(a)
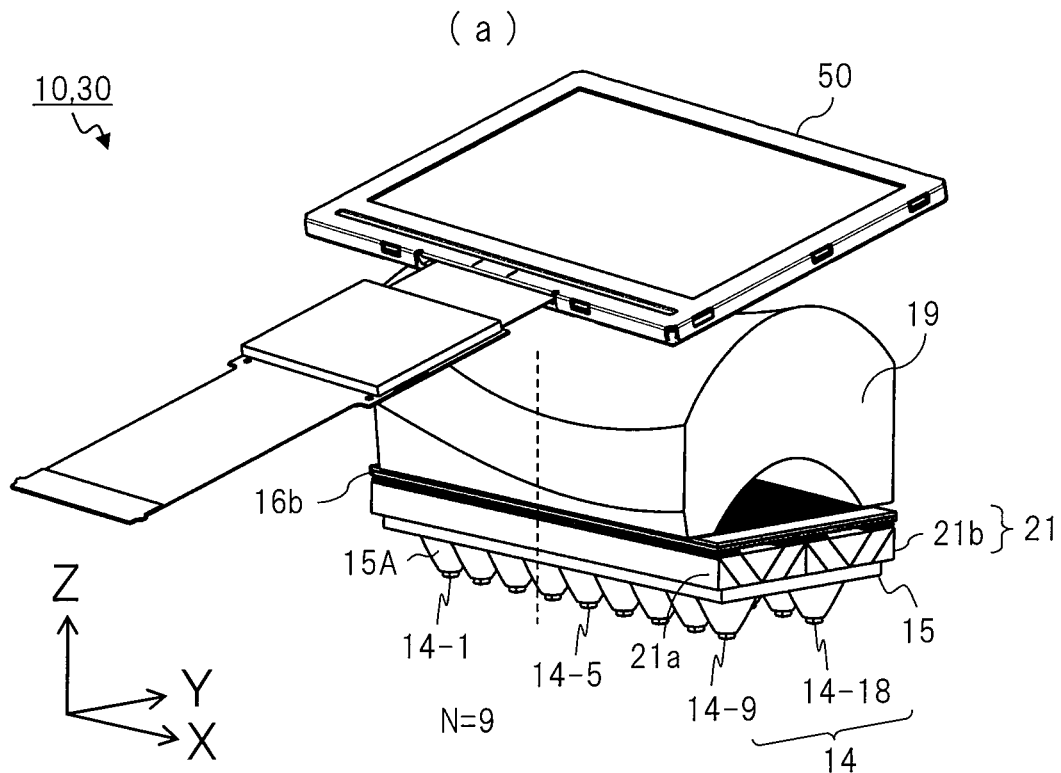
(b)
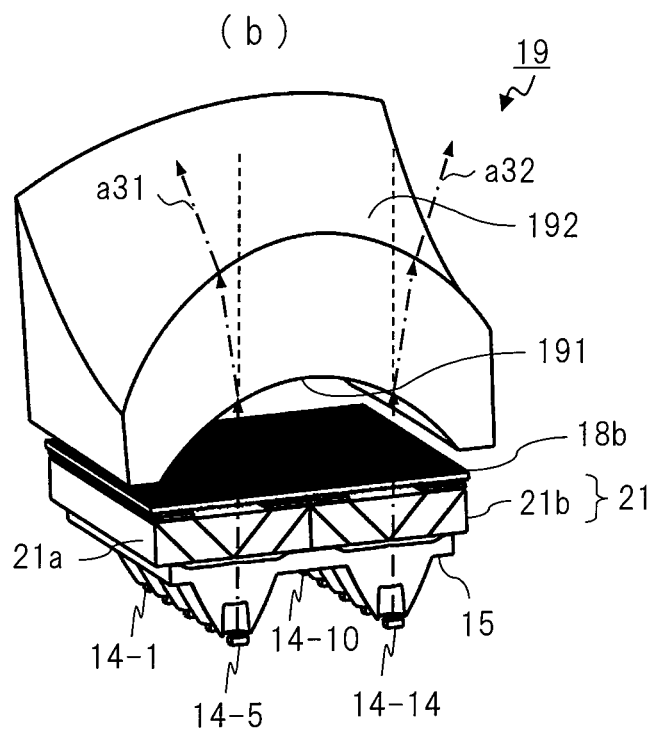

FIG. 49

(a) FREE-FORM SURFACE EQUATION $$z(x,y) = \sum_{14}^{i=0} \{a_i \cdot b_i(x,y)\} \quad \cdots \text{EQUATION 1}$$

(b) EMISSION SURFACE

| i | $b_i$ | $a_i$ |
|---|---|---|
| 0 | 1 | 15.6804159 |
| 1 | x | −0.0023643 |
| 2 | y | 0.01861185 |
| 3 | $x^2$ | 0.00275081 |
| 4 | xy | −0.0005721 |
| 5 | $y^2$ | −0.0252656 |
| 6 | $x^3$ | 2.2912E−05 |
| 7 | $x^2y$ | −6.431E−05 |
| 8 | $xy^2$ | 0.00037308 |
| 9 | $y^3$ | −1.658E−05 |
| 10 | $x^4$ | 8.5303E−07 |
| 11 | $x^3y$ | −2.69E−07 |
| 12 | $x^2y^2$ | 1.0303E−05 |
| 13 | $xy^3$ | −1.202E−06 |
| 14 | $y^4$ | −1.898E−05 |
| | $\theta y$ | 1° |
| | $\delta y$ | −1.2 |

(c) INCIDENCE SURFACE

| i | $b_i$ | $a_i$ |
|---|---|---|
| 0 | 1 | 1.03304396 |
| 1 | x | 0.00440019 |
| 2 | y | −0.0075255 |
| 3 | $x^2$ | −0.001758 |
| 4 | xy | 0.00059955 |
| 5 | $y^2$ | −0.0204652 |
| 6 | $x^3$ | −2.482E−07 |
| 7 | $x^2y$ | 2.0185E−05 |
| 8 | $xy^2$ | 0.00020976 |
| 9 | $y^3$ | 1.7438E−05 |
| 10 | $x^4$ | −4.074E−09 |
| 11 | $x^3y$ | −3.675E−09 |
| 12 | $x^2y^2$ | 2.6495E−06 |
| 13 | $xy^3$ | 5.3343E−07 |
| 14 | $y^4$ | −2.185E−05 |
| | $\theta y$ | 0° |
| | $\delta y$ | 0 |

FIG. 50
(FOURTH MODIFICATION EXAMPLE)
(a)
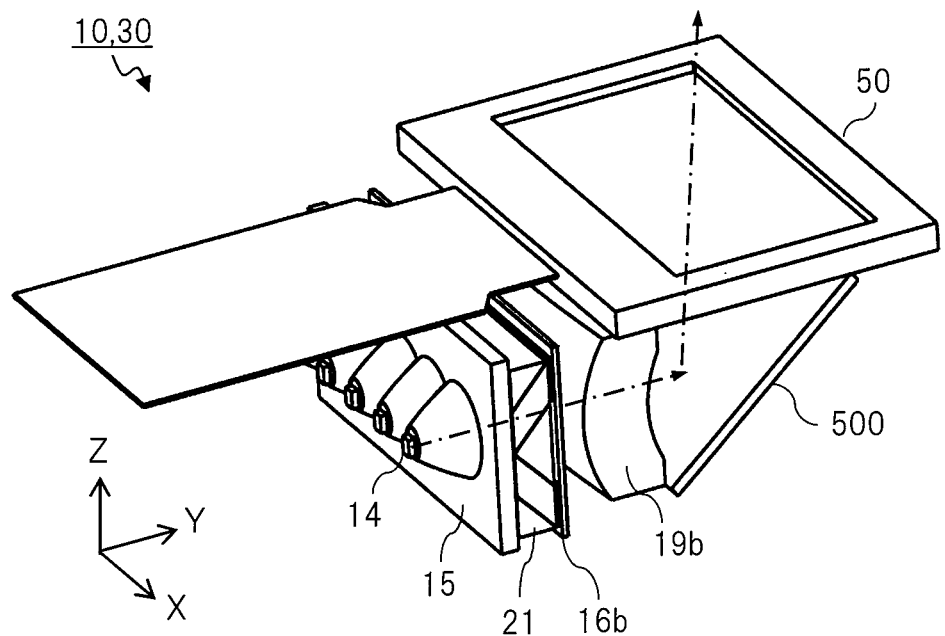
(b)
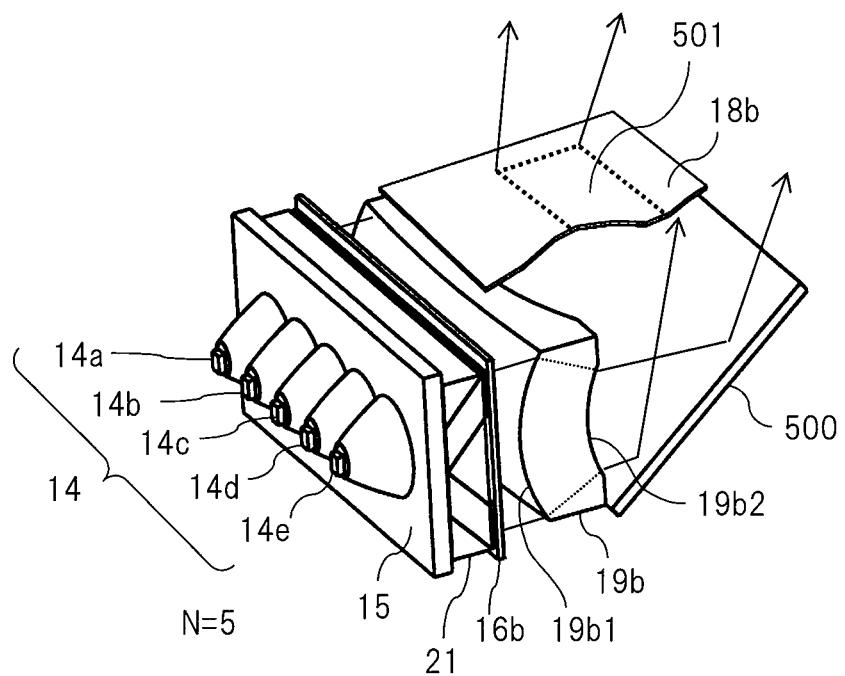

(FIFTH MODIFICATION EXAMPLE)

LIGHT SOURCE APPARATUS AND HEAD UP DISPLAY APPARATUS

TECHNICAL FIELD

The present invention relates to techniques such as a light source apparatus and an image display apparatus. The present invention also relates to a light source apparatus suitable as a light source of an image display apparatus such as an in-vehicle head up display (HUD) apparatus. The present invention also relates to a light source apparatus utilizable as a planar light source and planar lighting which use a solid light-emitting element.

BACKGROUND ART

With remarkable development of solid light-emitting elements such as light emitting diodes (LEDs) in recent years, lighting apparatuses using the elements as light sources have been widely utilized, in various pieces of lighting equipment, as long-life light sources that are small and light-weight and are excellent also in environmental protection with low power consumption.

Conventionally, for example, according to Japanese Patent Application Laid-open No. 2016-33668 (Patent Document 1), a semiconductor light-source apparatus has been known as a lighting apparatus for a projector (projection type display apparatus), the semiconductor light-source apparatus having a simple configuration and efficiently cooling a semiconductor light-emitting element(s) to emit light brightly.

RELATED ART DOCUMENTS

Patent Documents

Patent Document 1: Japanese Patent Application Laid-open No. 2016-33668

SUMMARY OF THE INVENTION

Problems to be Solved by the Invention

However, the semiconductor light-source apparatus disclosed in the above-mentioned conventional technique (Patent Document 1) mainly cools efficiently the semiconductor light-emitting element to prevent the element from short-circuiting and failing to function, thereby providing a semiconductor-element light-source apparatus that efficiently and brightly emits light. Also, emitted light from the element has been condensed by utilizing one or plural lenses provided opposite the element. This configuration makes it possible for the conventional technique to improve luminous efficiency due to an LED which is a semiconductor light source. However, sufficiently condensing and utilizing emission light are difficult, particularly, characteristics of light utilization efficiency and/or uniform lighting of the emission light have not yet been sufficient in a projector requiring light-emitting performance with high light quantity and further in an HUD apparatus, and an on-vehicle headlight apparatus, etc. Therefore, there has been room for improvement in various ways.

Thus, an object of the present invention is to provide a light source apparatus which is small in size and light in weight with high utilization efficiency of emission light.

Means for Solving the Problems

A representative embodiment of the present invention is a light source apparatus etc., and is characterized by having the following configuration. A light source apparatus according to one embodiment includes a light source apparatus includes: a light source unit including a plurality of semiconductor light source elements generating light; a collimator including a plurality of collimator elements each arranged on a light-emitting axis of each of the plural semiconductor light source elements; and a light guide disposed on an emission side of the collimator, in which the light guide includes: an incidence portion having an incidence surface on which light on the light-emitting axis from the semiconductor light source element is incident; and an emission portion having an emission surface that emits the light, and the light guide has a free-form surface shape for realizing predetermined light distribution control on at least one of the incidence surface and the emission surface.

Effects of the Invention

According to a representative embodiment of the present invention, provided can be a light source apparatus that is small in size and light in weight with high utilization efficiency of emission light.

BRIEF DESCRIPTION OF THE DRAWINGS

FIG. 2 is an exploded perspective view showing an overview of an internal configuration of the image display apparatus;

FIG. 7 is a side view showing an optical composite block of the light source apparatus, and a partially enlarged sectional view enlarging its part;

FIG. 8 is an overall perspective view showing details of a light guide constituting the light source apparatus, a sectional view thereof, and a partially enlarged sectional view showing details of its cross-section;

FIG. 16 is a view including a characteristic curve explaining the functional scattering surface;

FIG. 17 is a diagram for explaining an effect obtained by the functional scattering surface;

FIG. 20 is a top view and a side view showing a modification example of a light guide for a larger liquid crystal display apparatus;

FIG. 22 is a top view showing a specific example of a texture formed on a reflection surface of the light guide;

FIG. 34 is a perspective view showing a configuration of the polarization conversion element;

FIG. 35 is a plan view showing arrangement and configuration examples of a plurality of LED elements etc. with respect to the polarization conversion element;

FIG. 38 is a top view and a side view showing a first example of a plurality of light source elements (in a case of N=5) of the light source apparatus of Embodiment 2;

FIG. 39 is a top view and a side view showing a second example of the plural light source elements (in a case of N=6) of the light source apparatus of Embodiment 2;

FIG. 41 is a side view showing details of a reflection portion of the light guide;

FIG. 43 is a view showing a configuration of a light-distribution control plate of the light source apparatus;

FIG. 44 is an explanatory diagram showing an equation and coefficients of a free-form surface in the light source apparatus of Embodiment 2;

FIG. 47 is a perspective view and a partially sectional view showing configurations of a light source apparatus and an image display apparatus of a third modification example of Embodiment 2;

FIG. 49 is an explanatory diagram showing an equation and coefficients of a free-form surface of the light guide;

FIG. 50 is a perspective view showing configurations of a light source apparatus and an image display apparatus of a fourth modification example of Embodiment 2.

DETAILED DESCRIPTION OF PREFERRED EMBODIMENTS

Figure 1:
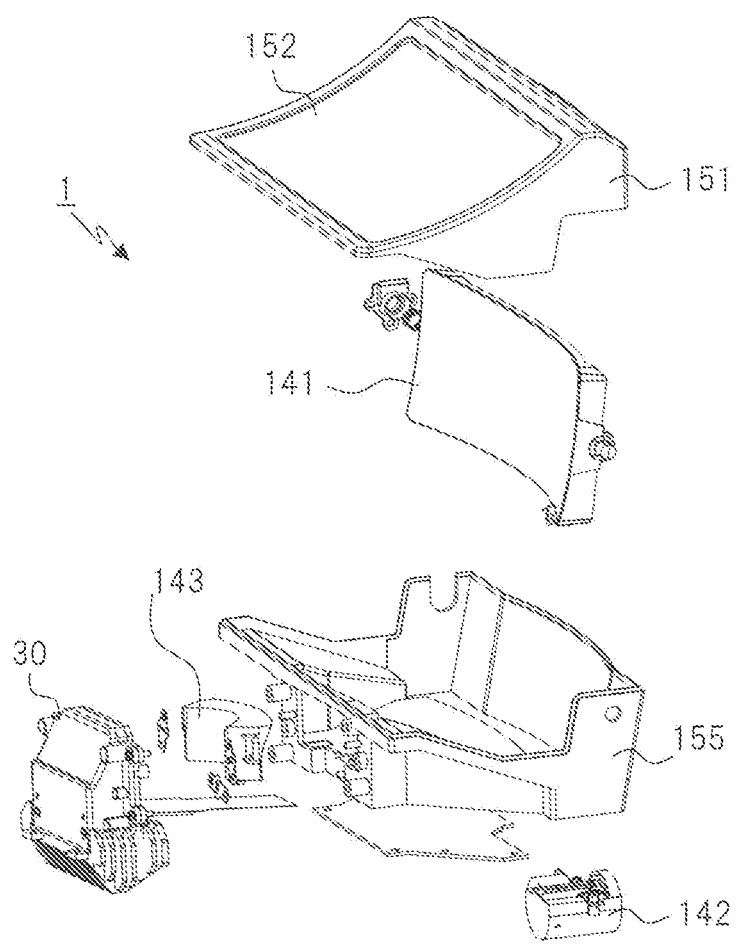
FIG. 1 is an exploded perspective view showing an overall overview of a head up display apparatus including an image display apparatus as an example of applying a light source apparatus according to an embodiment (Embodiment 1) of the present invention.

Hereinafter, embodiments of the present invention will be described in detail with reference to the drawings. Note that components having the same function are denoted by the same reference characters throughout the drawings for describing the embodiments, and the repetitive description thereof will be omitted.

Additionally, portions denoted by reference numerals and explained in some drawings may be mentioned with the same reference numerals without being again referred to in explaining other drawings.

Embodiment 1

Alight source apparatus etc. that is an embodiment (referred to as Embodiment 1) of the present invention will be described With reference to FIGS. 1 to 25.

1-1: HUD Apparatus

FIG. 1 is an exploded perspective view showing an example in which a light source apparatus according to an embodiment (Embodiment 1) of the present invention detailed below is applied to a HUD apparatus 1 as an example. An image display apparatus 30 including the light source apparatus according to the embodiment of the present invention is attached to a part of an exterior case 155 serving as its housing. Accommodated inside the case are a concave mirror 141 and a distortion correction lens 143, etc. Formed in an upper surface of an upper exterior case 151 is an opening through which image light is projected toward a windshield (not shown). The opening is covered with an anti-glare plate 152 (glare trap). Further, a concave mirror driver 142 is constituted by an electric motor etc. for adjusting a position of the concave mirror 141.

It will be apparent to those skilled in the art that image light emitted from the above image display apparatus 30 is projected onto the windshield of a vehicle via a display distance adjustment mechanism and a mirror driver in the HUD apparatus 1 having such a configuration. Further, adjustment of an angle of the concave mirror 141 brings adjustment of a position(s) of projecting an image(s) onto the windshield, so that a display position(s) of a virtual image(s) seen by a driver may be adjustable upward and downward. Incidentally, content to be displayed as a virtual image(s) is not particularly limited and, for example, may be appropriately displayed as vehicle information, navigation information, a forward scenic video-image photographed by a not-shown camera image (surveillance camera, around viewer, etc.), and the like.

1-2: Image Display Apparatus

Subsequently, the above-described image display apparatus 30 will be detailed below with reference to FIG. 2. The image display apparatus 30 is configured by accommodating an LED element, a collimator, an optical composite block, and a light guide, etc., which are also detailed later, in a light-source-apparatus case 11 formed of, e.g., plastic or the like. A liquid crystal display (LCD) element 50 is attached to an upper surface of the image display apparatus 30, and an LED substrate 12 on which an LED element as a semiconductor light source and its control circuit are mounted is attached to one side surface thereof. Furthermore, a heat sink (radiation fin) 13 for cooling heat generated by the LED element and control circuit is attached to an outer surface of the LED substrate 12.

In the above-described image display apparatus 30, the liquid crystal display element 50 attached to the upper surface of the light-source-apparatus case 11 includes: a liquid crystal display panel frame 51; a liquid crystal display panel 52 attached to the liquid crystal display panel frame 51; and a flexible printed circuit board (FPC) 53 electrically connected to the liquid crystal display panel 52.

Incidentally, as is apparent also from the above explanation in a case of the HUD apparatus, for example, it is desirable that the image display apparatus 30 including the light source apparatus according to the embodiment of the present invention, which configures the HUD apparatus 1 in view of a condition of its incorporation into a narrow space called a dashboard of a vehicle, is particularly small in size and high efficient by modularization, thereby being preferably usable.

1-3: Optical System

Figure 3:
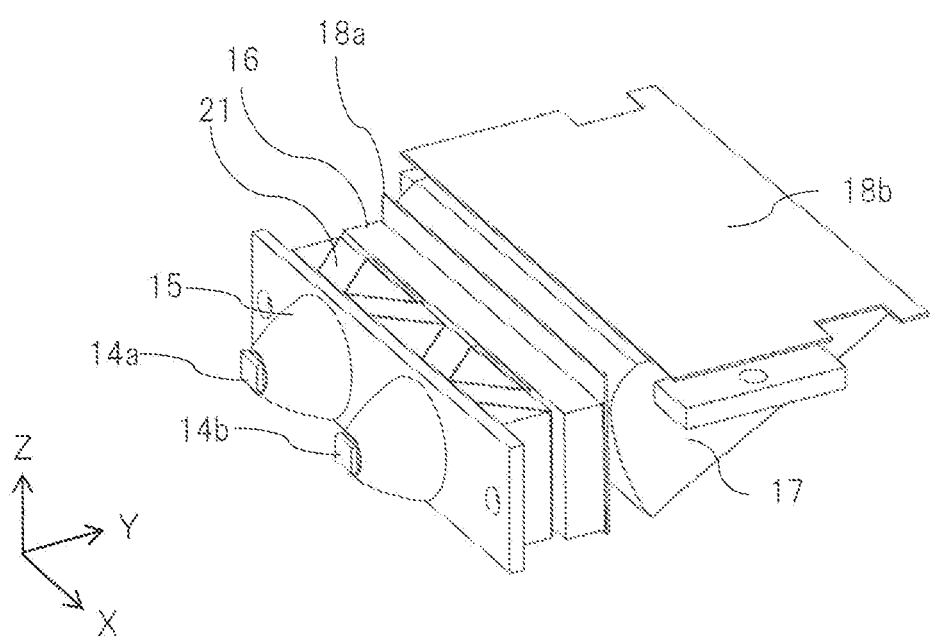
FIG. 3 is a perspective view showing an example of an internal configuration of the light source apparatus.

FIG. 3 shows a configuration of an optical system having a polarization function as an example of an optical system accommodated in the image display apparatus 30, i.e., in the case 11 of the light source apparatus. Namely, a plurality (two in the present example) of LED elements 14*a*, 14*b* constituting a light source according to the embodiment of the present invention are attached to predetermined positions with respect to an LED collimator 15.

Incidentally, although detained below, polarizing beam splitters (PBSs) and polarization conversion elements 21 are provided on a light emission side of the LED collimator 15, the splitters being right-left symmetrically arranged with respect to a central axis of the LED collimator 15, and the conversion elements being made of optical members such as phase plates. Further, an emission side of the polarization conversion element 21 is provided with a rectangular optical composite block 16. Namely, light emitted from the LED element 14*a* or 14*b* is made parallel light by the action of the LED collimator 15, is incident on the polarization conversion element 21, is converted into desired polarized light by the polarization conversion element 21, and then is incident on the optical composite block 16.

Furthermore, as shown as one example in FIG. 3, a light guide 17 having a substantially triangular cross-section is provided via a first diffuser 18*a* on an emission surface side of the optical composite block 16, and a second diffuser 18*b* is attached to its upper surface. This configuration causes horizontal light of the LED collimator 15 to be reflected upward in the drawing by the action of the light guide 17 and to be guided to an incidence surface of the liquid crystal display element 50. Incidentally, at this time, intensity of the guided light is uniformized by the first and second diffusers 18*a*, 18*b*.

Subsequently, main components constituting the above-mentioned light source apparatus according to the embodiment of the present invention will be described below including details of each component.

1-4: LED Element, LED Collimator

Figure 4:
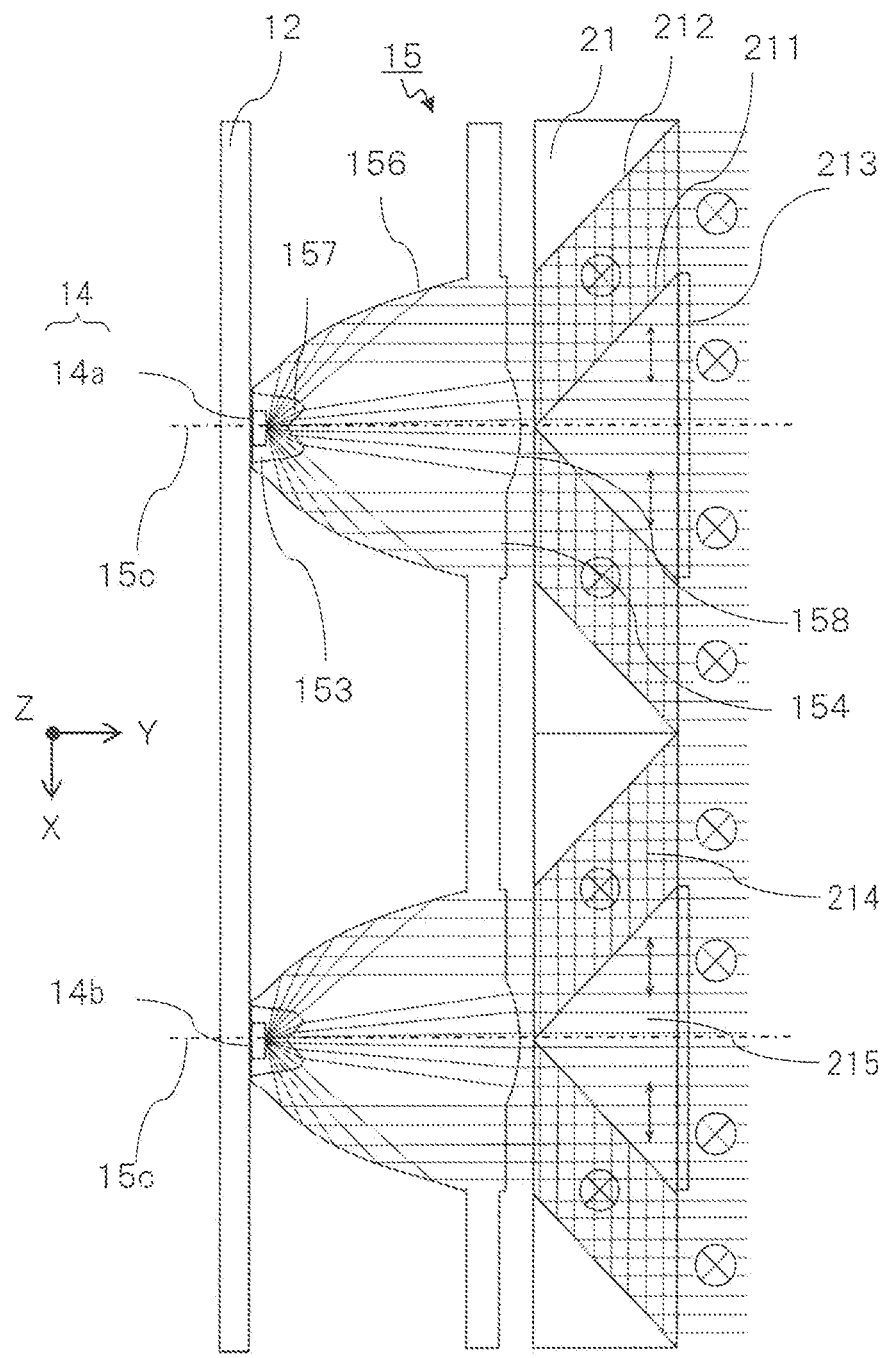
FIG. 4 is a partially enlarged sectional view showing configurations and behaviors of a collimator and a polarization conversion element which constitute the light source apparatus.

As shown also in FIG. 4, the light source apparatus according to the embodiment of the present invention includes: an LED element 14 (14*a*, 14*b*), which is one or more semiconductor light-emitting elements and is formed on the LED substrate 12; and an LED collimator 15 arranged opposite a light emitting surface of the LED element 14. Incidentally, the LED collimator 15 is formed of a resin having excellent heat resistance such as polycarbonate and having translucency and, as shown in FIG. 4, is formed on the LED substrate 12 so as to be centered about the LED element 14 and surround its circumference. More specifically, the LED collimator 15 has a conical, outer circumferential surface 156 obtained by rotating a substantially parabolic cross-section; a concave portion 153 having a predetermined curved surface is formed at its apical portion that is a light incidence side; and the LED element 14 (14*a*, 14*b*) is arranged at a substantially central portion thereof. Incidentally, a parabolic surface (reflector portion) forming the conical, outer circumferential surface 156 of the LED collimator 15 is set, together with a curved surface of the concave portion 153, so that light emitted circumferentially from the LED element 14 (14*a*, 14*b*) and incident on an inside of the LED collimator 15 through air lying in the concave portion 153 is incident within a range of angles capable of total reflection on the parabolic surface. Thus, utilization of the total reflection on the parabolic surface requires no step of forming etc. a metallic reflective film on the outer circumferential surface 156 of the LED collimator 15, thereby making it possible to manufacture the apparatus cheaper.

Further, an incidence surface (lens surface) 157 having a predetermined curved surface is formed at a central portion of the concave portion 153 of the LED collimator 15, and forms a so-called convex lens having a condensing action along with a convex portion (lens surface) 158 formed on an opposing surface (emission surface) 154. Incidentally, the convex portion 158 may be formed as a plane or a concave lens surface inward dented (recessed). Namely, the LED collimator 15 has, at a central portion of an conical outer shape, a condensing lens function of condensing emitted light from the LED collimator 15 on an emission surface side and similarly has, also on its outer circumferential surface 156 (reflector portion), a function of condensing light emitted circumferentially from the LED element 14 (14a, 14b) and guiding it to the emission surface side.

Incidentally, as shown also in FIG. 4, the LED substrate 12 is arranged and fixed to the LED collimator 15 so that each LED element 14 (14a, 14b) on its surface is located at a central portion of its concave portion 153.

According to such a configuration, some light beams particularly radiated toward an emission optical axis (rightward in the drawing) from its central portion among light beams radiated from the LED element 14 (14a, 14b) are condensed, as indicated by arrows in the drawing by the above-mentioned LED collimator 15, through the two convex lens surfaces 157, 158 forming the outer shape of the LED collimator 15 and are made parallel light. Also, some light beams radiated circumferentially from the other portions are reflected by a parabolic surface forming the conical, outer circumferential surface (reflector portion) 156 of the LED collimator 15, and are similarly condensed and made parallel light. In other words, the LED collimator 15 whose central portion forms a convex lens and whose circumferential portion forms a parabolic surface makes it possible to take out, as parallel light, substantially all of light beams generated by the LED element 14 (14a, 14b), and to improve utilization efficiency of the generated light beams.

Further, in the present embodiment, the light emitting side of the LED collimator 15 is provided with a polarization conversion element 21 that includes a polarizing beam splitter and an optical member such as a phase plate. Those elements are arranged right-left symmetrically to the central axis of the LED collimator 15 (see dash-single-dot lines in the drawing) as is apparent also from the drawing. Furthermore, an emission side of the polarization conversion element 21 is provided with the rectangular optical composite block 16. Namely, light beams emitted from the LED element 14a or 14b are made parallel light by the action of the LED collimator 15, and are incident on the optical composite block 16.

1-5: Comparative Example

Figure 5:
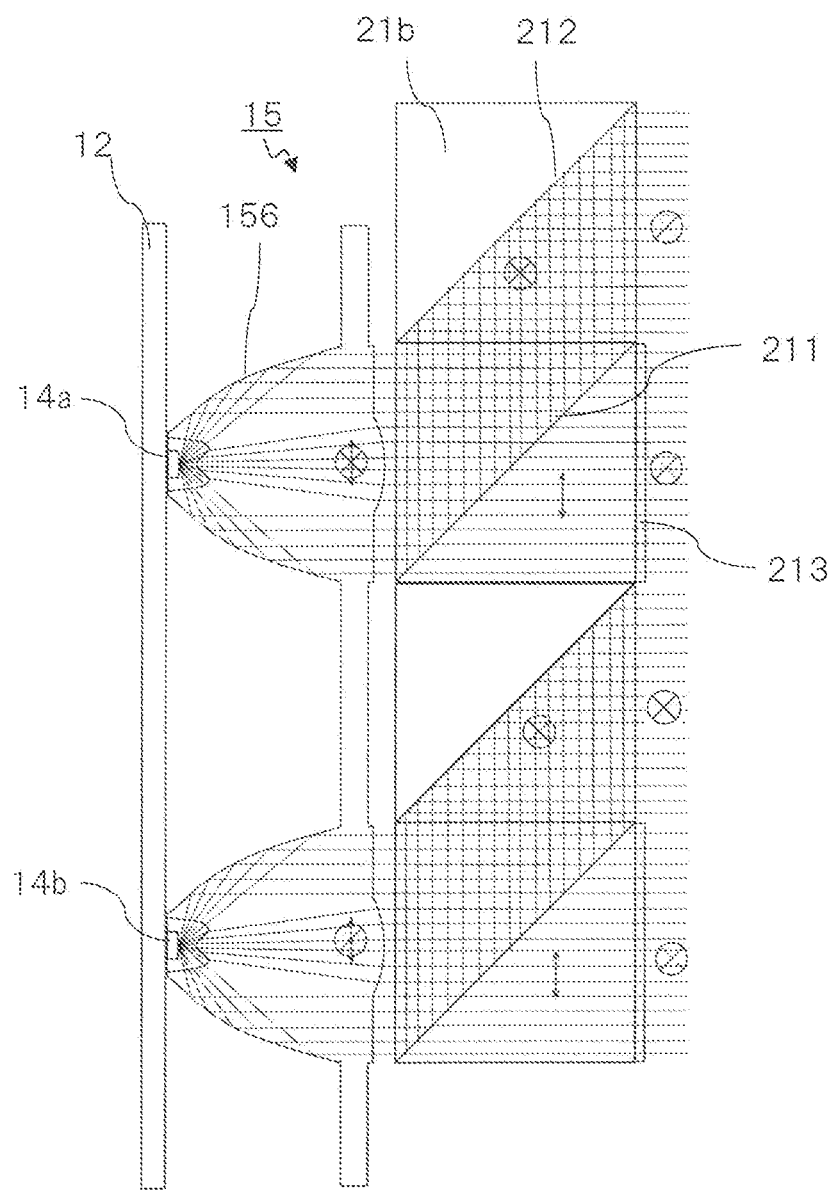
FIG. 5 is a partially enlarged sectional view showing comparative examples of the configurations of the collimator and polarization conversion element.

Thus, as is apparent also from a comparison with a comparative example of FIG. 5, the present configuration makes it possible to realize a thinner structure and lower cost by reducing a used amount of material, and to downside the light source apparatus. A reduction in a thickness of the polarization conversion element prevents an increase in a light path length difference between a light flux reflected by a PBS film and a light flux transmitting it, so that a difference in shapes of the both light fluxes due to the light path length difference hardly occurs. Therefore, a system using a plurality of light sources and LED collimators is particularly effective in elimination of nonuniformity of a luminance distribution caused by a difference between the light flux shapes.

1-6: Optical System

Figure 6:
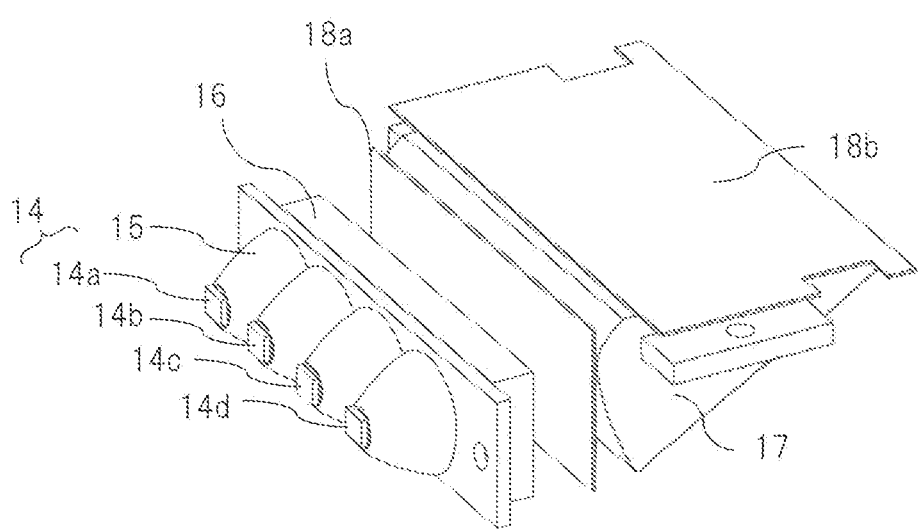
FIG. 6 is a perspective view showing another configuration example of the internal configuration of the light source apparatus.

Further, FIG. 6 shows another configuration example of the optical system accommodated inside the image display apparatus 30, i.e., in the light-source-apparatus case 11. Namely, a plurality of LED elements 14a, 14b, 14c, 14d (four in the present example) constituting the light source according to the embodiment of the present invention are attached to predetermined positions of the LED collimator 15.

Incidentally, the present example provides a rectangular optical composite block 16 on the light emitting sides of the LED collimators 15, but does not provide the polarization conversion element 21. Therefore, it has a configuration in which the light beams emitted from the LED elements 14 (14a, 14b, 14c, 14d) are not polarized, and are made parallel light by the action of the LED collimators 15 to be incident on the optical composite block 16.

Further, as shown as one example in FIG. 6, the emission surface side of the optical composite block 16 is provided, via a first diffuser 18a, with a light guide 17 having a substantially triangular cross-section. A second diffuser 18b is attached to its upper surface. This causes horizontal light of the LED collimator 15 to be reflected upward in the drawing by the action of the light guide 17 and to be guided to an incidence surface of the liquid crystal display element 50. Incidentally, at that time, its intensity is uniformized by the diffusers 18a, 18b similarly to the above example.

1-7: Optical Composite Block

Subsequently, the optical composite block 16, which is another component of the image display apparatus 30, will be described with reference to FIG. 7. Incidentally, FIG. 7(a) shows a side surface of the optical composite block 16, and FIG. 7(b) shows a partially enlarged cross-section enlarging a part of the optical composite block 16.

As is apparent also from FIG. 7 in the optical composite block 16 formed of a translucent resin such as acrylic, many textures 161 each having a substantially triangular cross-section are formed at a pitch S on its emission surface. The light beams emitted from the LED collimator 15 are diffused in a vertical direction of a light-guide light-incidence portion (surface) 171 of the light guide 17 to be described below by the action of the textures 161. Then, interaction between each of the substantially triangular textures 161 and each of the below-described diffusers 18a, 18b makes it possible to uniformize an intensity distribution of light emitted from the light-guide light-emission portion 173 of the light guide 17 even if the LED collimators 15 are discretely arranged. Further, regarding a display position of the virtual image seen by the driver, the HUD apparatus can adjust an angle of the concave mirror 141, but has generally no adjustment function of right and left positions, and premises binocular vision about confirmation of the virtual image. Therefore, it is desirable that an area in which the virtual image can be viewed is wider in a right-left direction than in an up-down direction. In order to realize the above configuration, it is effective to make a direction corresponding to the right-left direction of the virtual image of a light distribution angle of the light source apparatus wider than its forward-backward direction. The present configuration sets, as a right-left direction of the virtual-image display, a direction which is diffused by the textures 161 of the above optical composite block and in which the light distribution angle is wide, so that an area capable of recognizing the virtual image has been widened in the right-left direction.

Particularly, the above textures 161 can limit a diffusion direction of light to a light-guide side direction and further control diffusibility in the side direction, thereby making it possible to weaken isotropic diffusibility of the first and second diffusers 18a, 18b and consequently improve light utilization efficiency and realize a light source apparatus with good characteristics. Incidentally, this example shows, as one example of the substantially triangular texture 161, that an angle γ=30 degrees and its forming pitch S=0.5 mm.

1-8: Light Guide

Next, the light guide 17 constituting the image display apparatus 30 will be detailed below with reference to FIG. 8. Incidentally, the light guide 17 has a function of: reflecting and refracting, as parallel light, light taken out through the incidence surface from the above light source apparatus to guide it in a desired direction; and taking out it as planar light having a desired area.

FIG. 8(*a*) is a perspective view showing the entire light guide 17; FIG. 8(*b*) is its cross-section; and FIGS. 8(*c*) and 8(*d*) are partially enlarged sectional views. The light guide 17 is a member formed in a substantially triangular cross-section (FIG. 8(*b*)) by a translucent resin such as acrylic. As is apparent also from FIG. 8(*a*), the light guide includes: a light-guide light-incidence portion (surface) 171 facing the emission surface of the optical composite block 16 via the first diffuser 18a; a light-guide light-reflection portion (surface) 172 forming an incline; and a light-guide light-emission portion (surface) 173 opposing the liquid crystal display panel 52 of the liquid crystal display element 50 via the diffuser 18b. Incidentally, they may be abbreviated as an incidence portion 171 (incidence surface), a reflection portion 172 (reflection surface), and an emission portion 173 (emission surface), etc., respectively.

On (In) the reflection portion 172 of the light guide 17, as shown in details in FIGS. 8(*c*) and 8(*d*) each of which is a partially enlarged view thereof, many reflection surfaces 172a and connection surfaces 172b are alternately formed in a serrate shape. The reflection surface 172a (right-rising line segment in the drawing) forms an angle αn (n: natural number, which is 1 to 130 in this example) with respect to a horizontal plane indicated by a dash-single-dot line in the drawing and, as one example thereof, sets the angle αn of 43 degrees or less (however, 0 degree or more) here.

On the other hand, the connection surface 172b (right-falling line segment in the drawing) forms an angle βn (n: natural number, which is 1 to 130 in this example) with respect to the reflection surface 172a. Namely, the connection surface 172b of the reflection portion 172 is inclined with respect to incident light at such an angle as to become a shadow within a range of a half-value angle of a scattering body to be described later. Although detailed below, the angle αn (α1, α2, α3, α4, . . . ) forms an elevation angle of the reflection surface, and the angle βn (β1, β2, β3, β4, . . . ) is a relative angle between the reflection surface 172a and the connection surface 172b and is set, as one example thereof, to 90 degrees or more (however, 180 degrees or less). Incidentally, in this example, angles (β1=β2=β3=β4= . . . =β22= . . . β130.

1-9: Light Guide (2)

Figure 9:
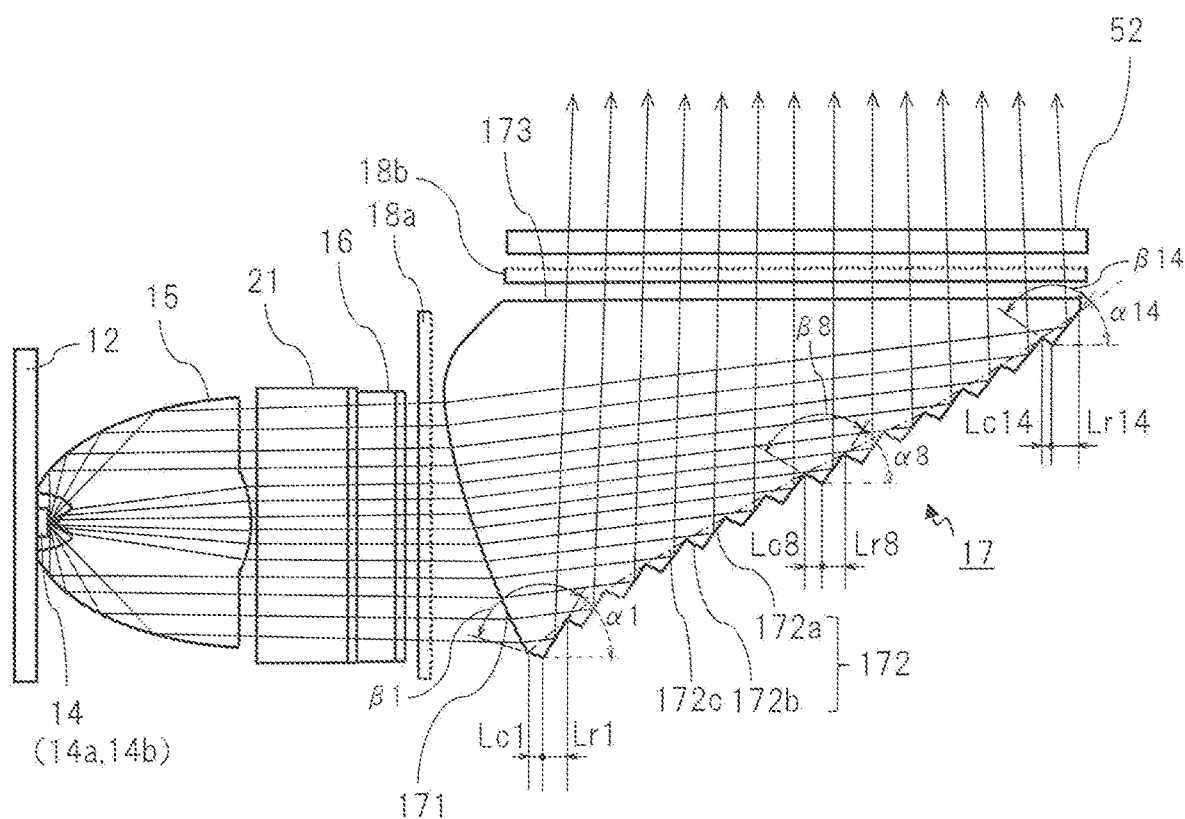
FIG. 9 is a schematic view enlargedly showing a reflection surface and a connection surface to explain the light guide.
Figure 10:
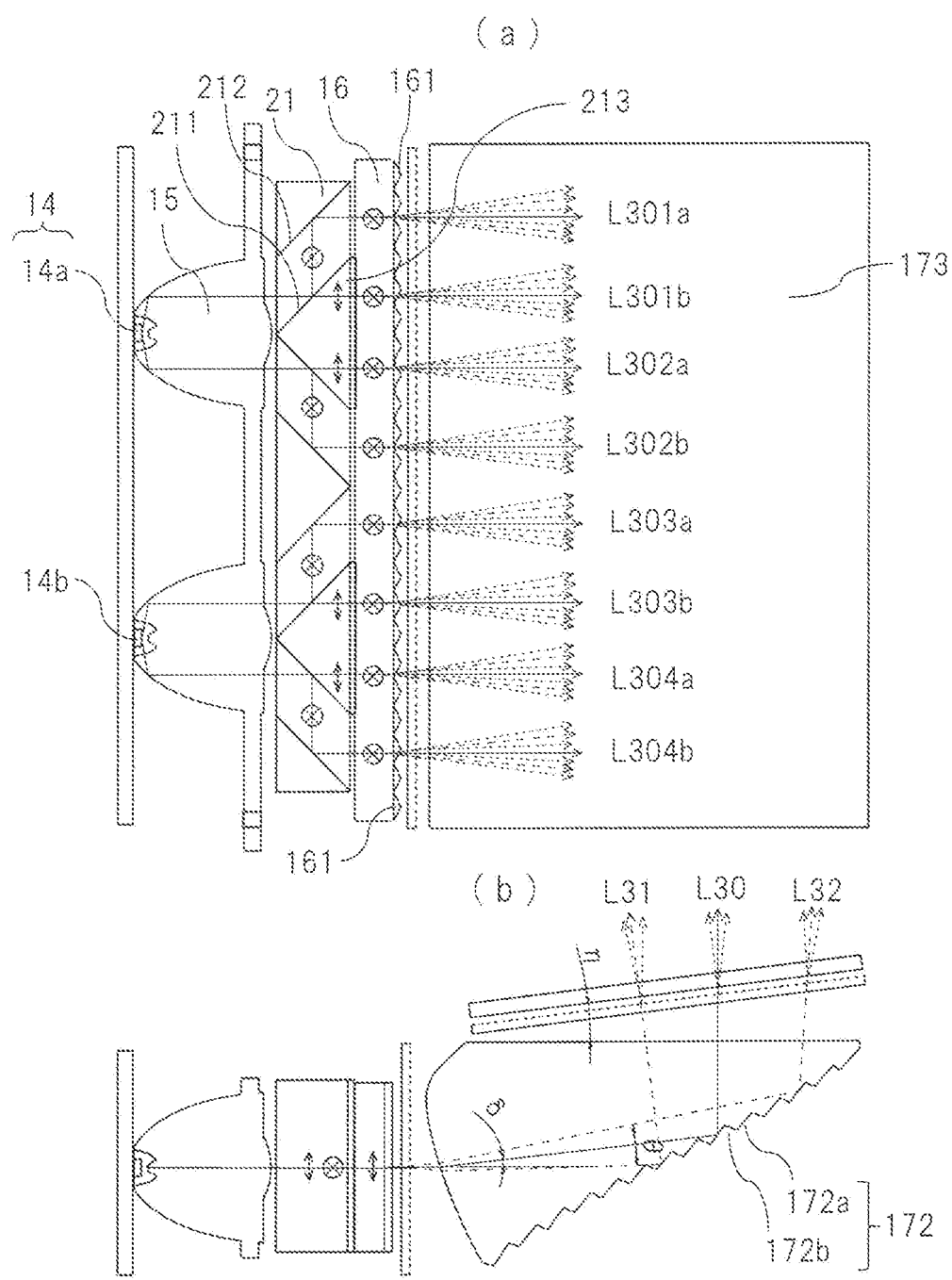
FIG. 10 is a top view and a side view enlargedly showing the reflection and connection surfaces to explain the light guide.

For explanation, FIGS. 9 and 10 are schematic views in which sizes of the reflection surface 172a and the connection surface 172b with respect to the light guide 17 are enlarged relatively. At the incidence portion 171 of the light guide 17, the main light beam is deflected by an angle δ in a direction of increasing the incident angle with respect to the reflection surface 172a (FIG. 10(*b*)). Namely, the incidence portion 171 is formed in a convex shape inclined and curved on a light-source side. Such a shape causes parallel light from the emission surface of the optical composite block 16 to be diffused through the first diffuser 18a and be incident thereon and, as is apparent also from the drawing, the parallel light to reach the reflection portion 172 while being slightly bent (deflected) upward by the incidence portion 171 (compared with an example of FIG. 11).

Incidentally, a number of reflection surfaces 172a and connection surfaces 172b are alternately formed in a serrate shape in the reflection portion 172, and diffused light is totally reflected on each reflection surface 172a and verges upward, and is further incident, as parallel diffused light, on the liquid crystal display panel 52 via the emission portion 173 and the second diffuser 18b. Therefore, the angle αn (α1, α2, . . . ) which is the reflection-surface elevation angle is set so that each reflection surface 172a is set at such an angle as to have a critical angle or more with respect to the diffused light, while the angle βn (β1, β2, . . . ) which is the relative angle between the reflection surface 172a and the connection surface 172b is set at a constant angle as described above, more preferably at an angle of 90 degrees or more ((βn≥90°) although its reason is described below.

1-10: Comparative Example

Figure 11:
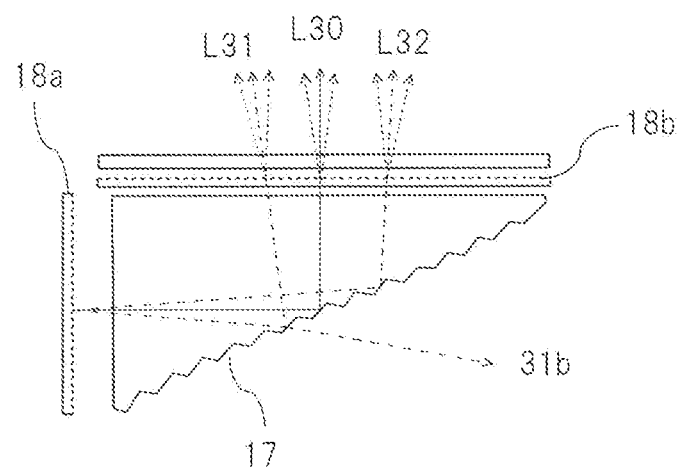
FIG. 11 is a side view showing a comparative example of the light guide.

By the above configuration, since each reflection surface 172a is configured to always have an angle of the critical angle or more with respect to the above diffused light. Therefore, realized can be a light source apparatus provided with the light guide, in which the total reflection is possible without forming a reflective film such as metal at the reflection portion 172 and which has functions of guiding light in a desired direction at low cost and taking out it as planar light having a desired area. Meanwhile, as shown in FIG. 11 which is a comparative example, when no bend (polarization) of the main light beam exists at the incidence portion of the light guide 17, apart of diffused light beams has an angle of the critical angle or less with respect to the reflection surface 172a and sufficient reflectance cannot be ensured, so that a light source apparatus with good characteristics (brightness), i.e., an image display apparatus cannot be realized.

Therefore, the shape of the reflection portion 172 of the above-mentioned light guide 17 makes it possible to: satisfy the total reflection condition of the main light beams; provide no reflective film such as aluminum at the reflection portion 172; reflect light efficiently; do no vapor-deposition work etc. for an aluminum thin film with an increase in manufacturing cost; and realize a brighter light source (s) at lower cost. Further, the angle βn, which is each relative angle, has been set at such an angle that the connection surface 172b is shadowed with respect to light of a main light beam L30 diffused by the optical composite block 16 and the diffuser 18a. The setting brings suppression of unwanted light incident on the connection surface 172b, thereby making it possible to reduce unnecessary reflection of light and realize a light source apparatus having good characteristics.

Further, according to the above-described light guide 17, as shown in FIG. 9, appropriately setting lengths and ratios of the connection surfaces 172b (Lc1, Lc2, Lc3, . . . ) and the reflection surfaces 172a (Lr1, Lr2, Lr3, ...) makes it possible to freely vary a length of the emission portion 173 in an optical-axis direction. Therefore, realized can be a light source apparatus which can change a size (surface size) of the emission portion 173 to an appropriately necessary size (surface size) with respect to the incidence portion 171 so as to be adaptable to an apparatus such as the above liquid crystal display panel 52. This also means to be capable of forming the emission portion 173 in a desired shape without depending on an arrangement shape of the LED elements 14 (14a, 14b) constituting the light source, i.e., leads to obtaining a planar light-emitting source having a desired shape. Further, this also leads to securing a degree of freedom in design including an arrangement of the LED element 14 (14a, 14b) constituting the light source, which is advantageous for downsizing of the entire apparatus.

1-11: Modification Example

Figure 12:
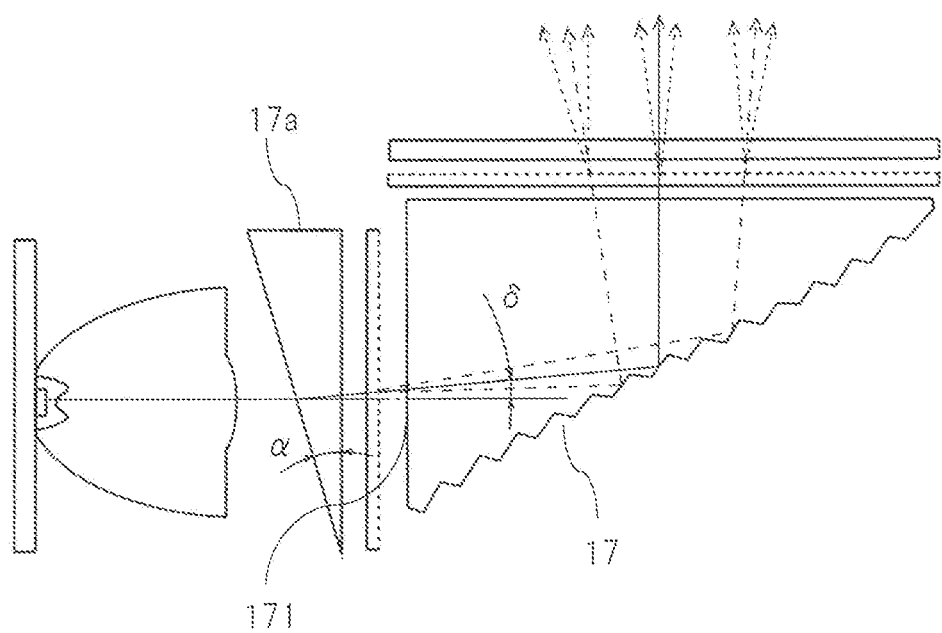
FIG. 12 is a side view showing a modification example of the light guide.

FIG. 12 shows the above modification example. In this modification example as is apparent also from the drawing, the incidence portion 171 of the light guide 17 is made a plane perpendicular to light emitted from the LED collimator 15 unlike the above-described curved surface, and the incidence surface is provided with an auxiliary light guide 17a having a perpendicular triangle cross-section for slightly bending (deflecting) incident light upward.

Figure 13:
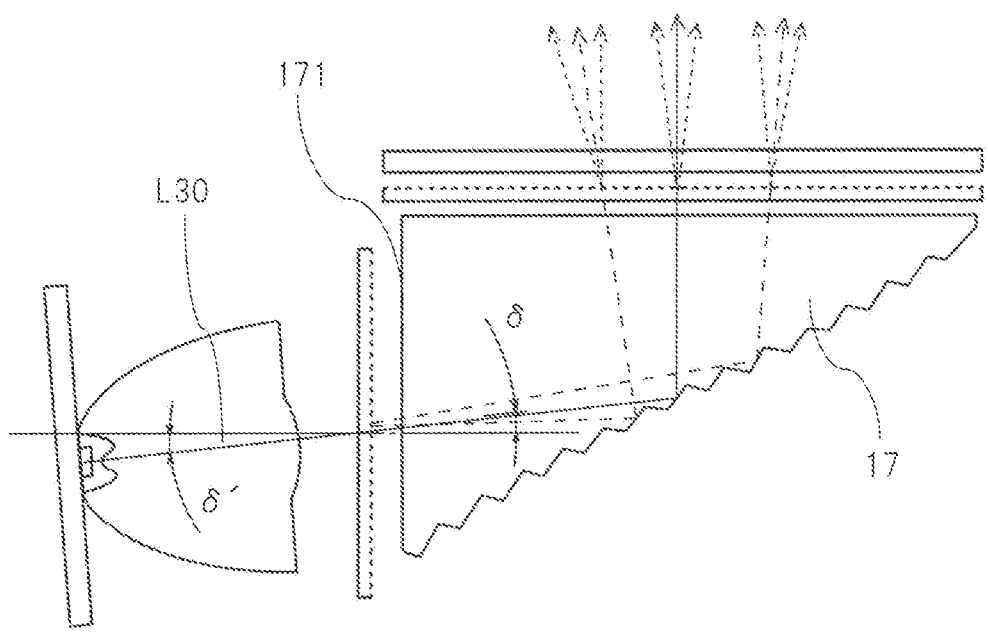
FIG. 13 is a side view showing another modification example of the light guide.

Further, FIG. 13 shows, as another modification example, a configuration in which: the incidence portion 171 of the light guide 17 is made a perpendicular plane; the LED collimator 15 is slightly inclined; and consequently incident light is slightly bent (deflected) upward. Namely, even by these modification examples, the same effect as that of the above can be obtained.

1-12: Modification Example

Figure 14:
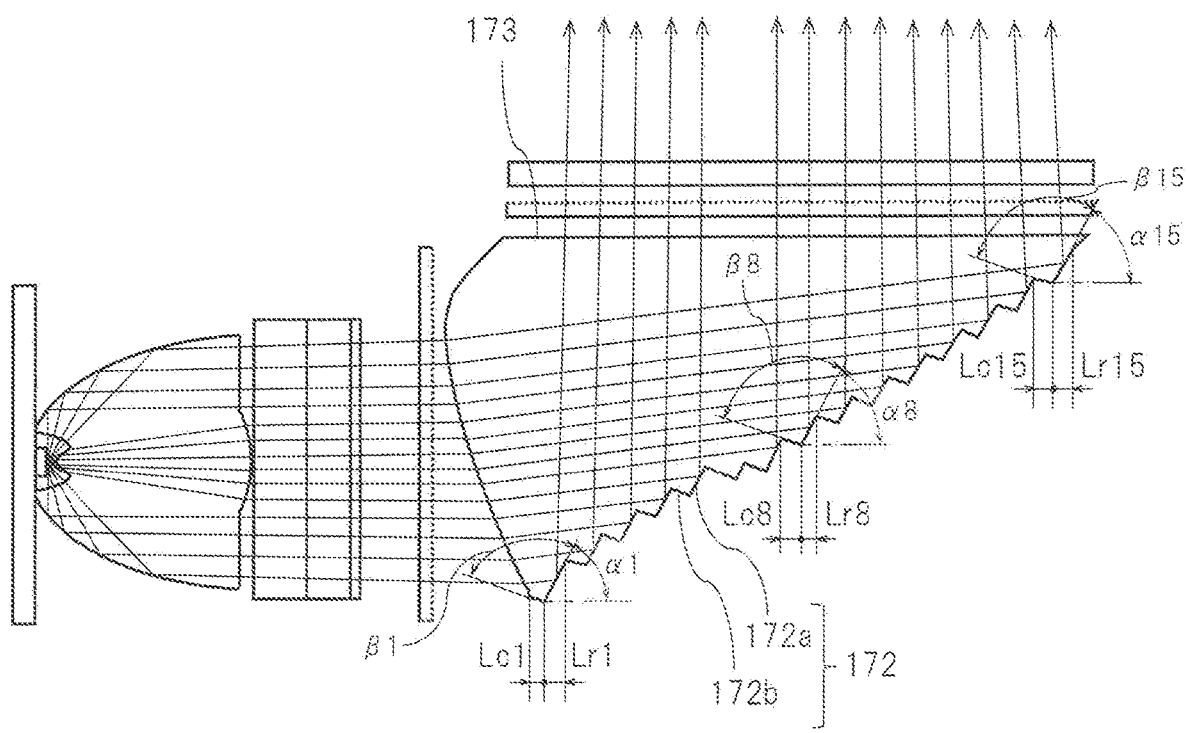
FIG. 14 is a side view showing still another modification example of the light guide.

Further, as shown also in FIG. 14, appropriately setting the connection surface 172b constituting the reflection portion 172 (in this example, the reflection surface 172a of a part of a central portion thereof reflects no light) makes it possible to greatly vary a ratio (Lr/Lc) of the reflection surface 172a and the connection surface 172b depending on a location in the emission portion 173 of the light guide 17. Thus, the illustrated example shows a state in which light emitted from the emission portion 173 of the light guide 17 is divided into right and left in the direction of the optical axis. Such a configuration may be preferable, for example, in a case etc. of separating, upward-downward or rightward-leftward without loss, illumination light from the HUD apparatus. Further, appropriately adjusting the ratio (Lr/Lc) also makes it possible to partially strengthen or weaken an intensity of reflected light.

1-13: Modification Example

Figure 15:
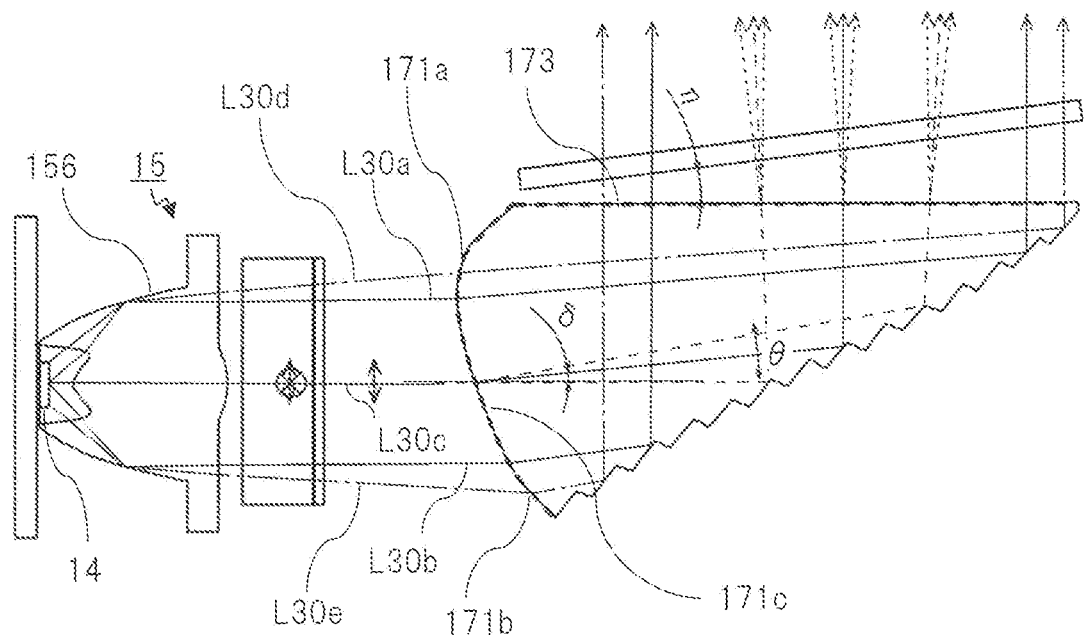
FIG. 15 is a side view showing a modification example of a light guide using a functional scattering surface.

Additionally, as shown in FIG. 15, a functional scattering surface as described below is given to and/or formed at at least one of the incidence portion 171 and the emission portion 173 in the above-described light guide 17, so that one or both of the diffusers 18a, 18b shown also in FIG. 6 can be also omitted.

This functional scattering surface is intended to reduce an unnecessary divergent-light component(s) by reducing surface roughness of a component (fine component) having a high spatial frequency. FIG. 16(b) shows surface-roughness spatial-frequency components of a normal scattering surface, and FIG. 16(a) shows surface-roughness spatial-frequency components of a scattering surface having more preferable scattering characteristics. A Solid line in the same drawings shows surface-roughness spatial-frequency components vertically measured with respect to the drawing indicating the incident or emission surface of the light guide in FIG. 15, and a broken line shows surface-roughness spatial-frequency components parallel measured with respect to the drawing indicating the incident or emission surface of the light guide in FIG. 15.

A surface-roughness spatial-frequency distribution of the normal scattering surface indicates a distribution along a reciprocal (1/f) of the spatial frequency, as shown in FIG. 16(b). In contrast, a more preferable spatial-frequency distribution of the surface roughness has low values within a low frequency region of a spatial frequency of 10/mm or less and within a high frequency region of 100/mm or more as shown in FIG. 16(a), has small low frequency components of the surface-roughness spatial frequency, and moderately has a medium frequency component(s), so that a light source with little scattering unevenness can be realized. Additionally, since the high frequency component of the surface-roughness spatial frequency is small, a scattering angle of scattered light does not increase and the unnecessary light component decreases, so that a light source having a bright and uniform luminance distribution can be realized. In order to realize such characteristics, it has been experimentally confirmed that the above functional scattering surface can prevent occurrence of the unnecessary scattering components within a range (wavelength of 400 nm or more) of visible light when the spatial-frequency components in the high frequency region of 100/mm or more are particularly set to 10 nm or less. In contrast, as shown in FIG. 16(b), the normal scattering surface scatters light also in a direction other than a direction usable as a light source, so that a bright light source cannot be realized.

Additionally, as shown by the solid and broken lines in FIG. 16(a) within the above range, adjustment of the spatial-frequency components makes it possible to adjust the scattering angle. In the HUD apparatus, since the area in which the virtual image can be viewed as described above is desirably wider in the right-left direction than in the up-down direction, the scattering angle is adjusted so that an orientation angle of the light source apparatus becomes wide about a direction corresponding thereto. Specifically, the spatial frequency distribution of the surface roughness measured in a direction vertical to the drawing illustrating the incidence and emission surfaces of the light guide shown in FIG. 15 is a distribution indicated by the solid line in FIG. 16(a). The spatial frequency distribution of the surface roughness measured in a direction along the drawing and orthogonal thereto is a distribution having further relatively less the high frequency components with respect to the solid line as shown by the broken line in the same drawing.

Adopting the above-described functional scattering surface brings an increase of a degree of freedom of control about incidence and emission of light on and from the incidence and emission surfaces of the light guide 17, reduces luminance unevenness of light from the light source apparatus, and makes it possible to perform fine control in accordance with characteristics of an optical system apparatus (in the present example, liquid crystal display element 50 as one example) arranged on its downstream side, and will further be advantageous of reducing cost of the apparatus.

Additionally, as shown in FIG. 15, a shape of the incidence surface of the light guide 17 has, in a cross-section at a surface to be parallel to incident and emitting light on and from the light guide 17, an upper end portion 171a and a lower end portion 171b whose curvatures become large with respect to a central portion 171c. This configuration is effective in using the LED element 14 whose light emitting portion is relatively large in size as shown in FIG. 15. Namely, light emitted from a central portion of the LED element 14 is converted into parallel light by the LED collimator 15 like light beams L30c, L30a, L30b indicated by the solid lines, but light emitted from upper and lower ends of the LED element 14 is not parallel light but diffused light unlike the light beams L30d, L30e indicated by dash-single-dot lines. Therefore, converting the light into parallel light needs to increase the curvature of the incidence surface of the light guide 17 with the central portion 171c as shown by the upper end portion 171a and the lower end portion 171b. Adopting the above configuration makes it possible to realize a light source apparatus with good characteristics even when an LED with a relatively large size is used.

1-14: Manufacturing Method of Light Guide

Figure 18:
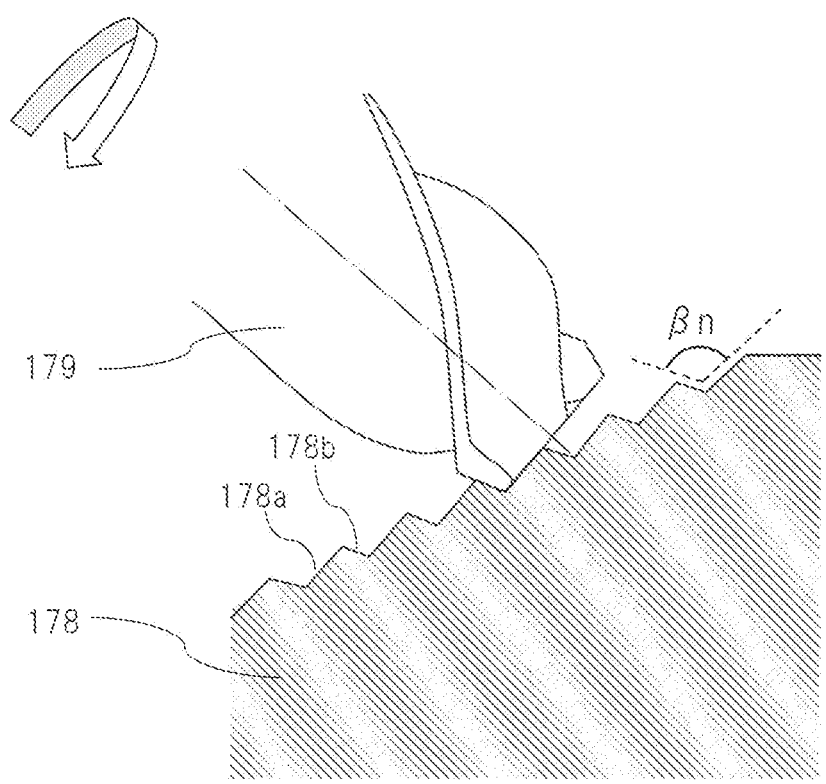
FIG. 18 is a diagram for explaining an example of machining of the light guide.

Although the angle β1=β2=β3=β4 . . . Pn 90° are set as described above, this reason is as follows. As shown in FIG. 18, in machining (processing) of a mold 178 for manufacturing the light guide 17 by injection molding, a relative angle between bottom and side surfaces is machined by an end mill having the angle β, and a reflection surface 178a corresponding to the reflection surface 172b and a connection surface 178b corresponding to the connection surface 172b can be machined simultaneously therewith. Further, since the reflection surface 178a and the connection surface 178b can be machined with a relatively thick tool, machining time can be greatly shortened, which makes it possible to greatly reduce machining cost. Also, a boundary edge between the reflection surface 178a and the connection surface 178b can be machined with high accuracy, which makes it possible to improve light guiding characteristics of the light guide 17.

1-15: Image Display Apparatus (Another Embodiment)

Figure 19:
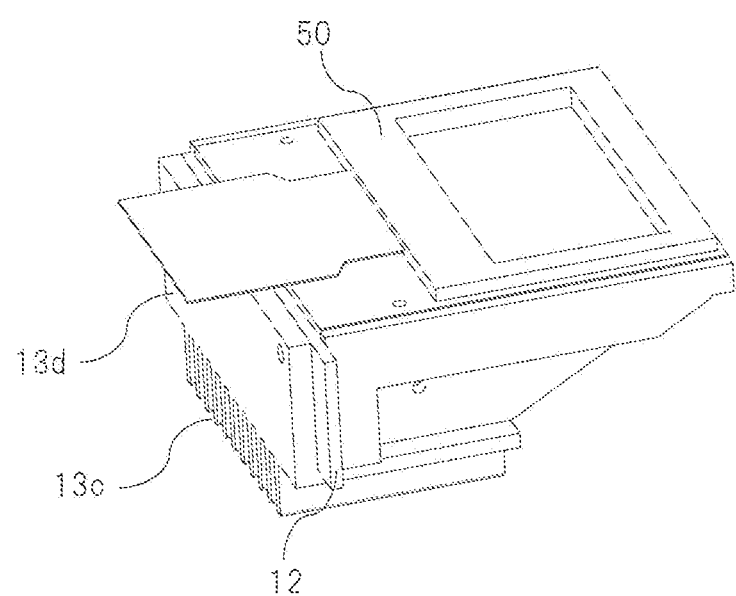
FIG. 19 is a perspective view of an overall appearance of an image display apparatus showing another example of the image display apparatus applying the light source apparatus.

FIG. 19 is a perspective view of an overall appearance of an image display apparatus 30 showing another example of an image display apparatus 30 applying the above light source apparatus. In this embodiment, although not shown in detail, heat generated in the LED substrate 12 is structurally cooled by a heat sink 13c disposed in a lower portion of the apparatus through a heat transfer plate 13d. This configuration brings realization of a light source apparatus whose overall length is short.

1-16: Light Source Apparatus (Other Embodiment)

Further, still another embodiment of the light source apparatus according to the above-described embodiment of the present invention will be described below. FIG. 20 shows a light source apparatus for a larger liquid crystal display apparatus in which arrangement of the LED elements 14 as solid light sources is 3×2 rows in comparison with the above-described embodiment. In the light source apparatus according to this embodiment, when the light guide 17 is manufactured by the injection molding, the incidence portion 171 becomes thick, so that a part (an upper portion in the drawing) of the incidence portion 171 is removed for preventing the cooling time in a molding die from increasing, a molding tact from become long, and the cost from increasing.

Figure 21:
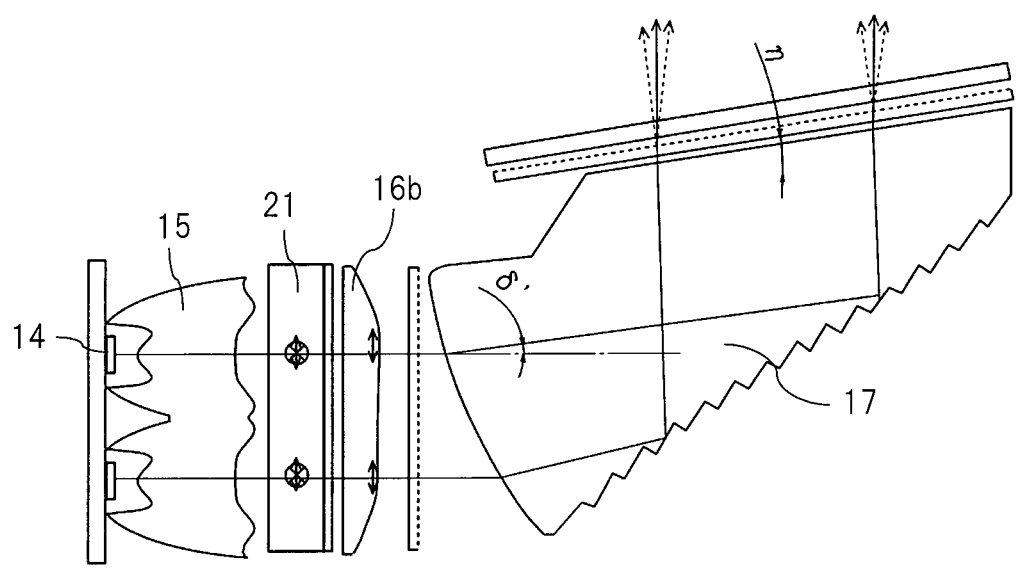
FIG. 21 is a side view showing a modification example of the light guide of FIG. 20.

Further, FIG. 21 shows a light source apparatus for a larger liquid crystal display apparatus in which arrangement of the LED elements 14 as solid light sources is 3×2 rows similarly to the light source apparatus of the above embodiment. In this example, the part of the incidence portion 171 is removed, and a tip portion (right-side portion in the drawing) of the light guide 17 is made thick, so that cooling rates at a molding time are made uniform and molding can be performed with higher accuracy. Incidentally, in this example, the light guide 17 is configured so as to incline an angle incident on the liquid crystal display panel up to a predetermined angle η by thickening its tip portion and cause the main light beam to be incident thereon. This is because it is preferable that an inclination of the main light beam incident on the liquid crystal display panel is generally close to perpendicular. However, some of commercially available liquid crystal display panels may have good characteristics by tilting an incident angle by about 5° to 15° depending on the characteristics. In this case, the incident light is incident on the liquid crystal display panel by tilting only its angle η=5° to 15° in accordance with the characteristics.

1-17: Texture of Light Guide

Further, FIG. 22 is a top view showing a specific example of the above-described textures formed on the reflection surface of the light guide 17 shown also in FIG. 15. In this schematic view, FIG. 22(a) shows an example in which a boundary between the reflection and connection surfaces is linearly arranged and formed, and FIG. 22(b) shows another example in which the boundary is curvedly arranged and formed as necessary like, for example, mutual separation, dispersion, and arrangement etc. of the LED elements 14 (14a, 14b) serving as light sources.

1-18: Image Display Apparatus (Other Embodiment)

Although the light source apparatus according to the embodiment of the present invention, particularly, the light source apparatus applied to the HUD apparatus 1 has been described above, an example including yet another configuration of the light source apparatus will be described below.

Figure 23:
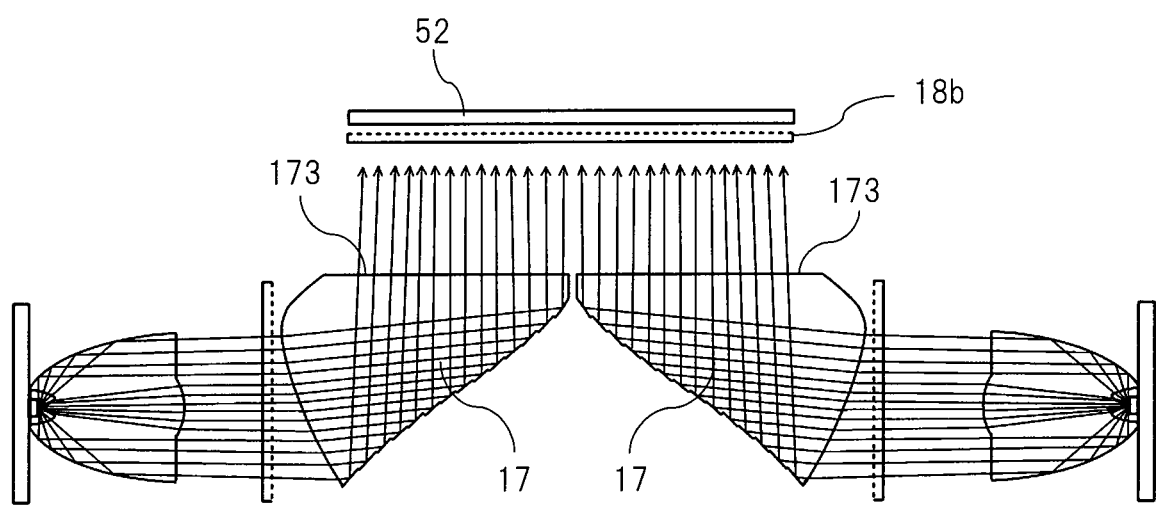
FIG. 23 is an overall side view showing an example of a configuration of a larger light source apparatus obtained by combining light guides.

FIG. 23 shows an example corresponding to a larger-size liquid crystal display panel 52 in which a plurality of (two in the present example) light source apparatuses each including the above LED element 14 (14a, 14b) and light guide 17, etc. are combined so that their emission portions 173 are in the same plane. Incidentally, adopting such a combined configuration makes it possible to realize an image display apparatus further including emission portions 173 having more kinds of surface sizes and light quantities.

1-19: Image Display Apparatus (Other Embodiment)

Figure 24:
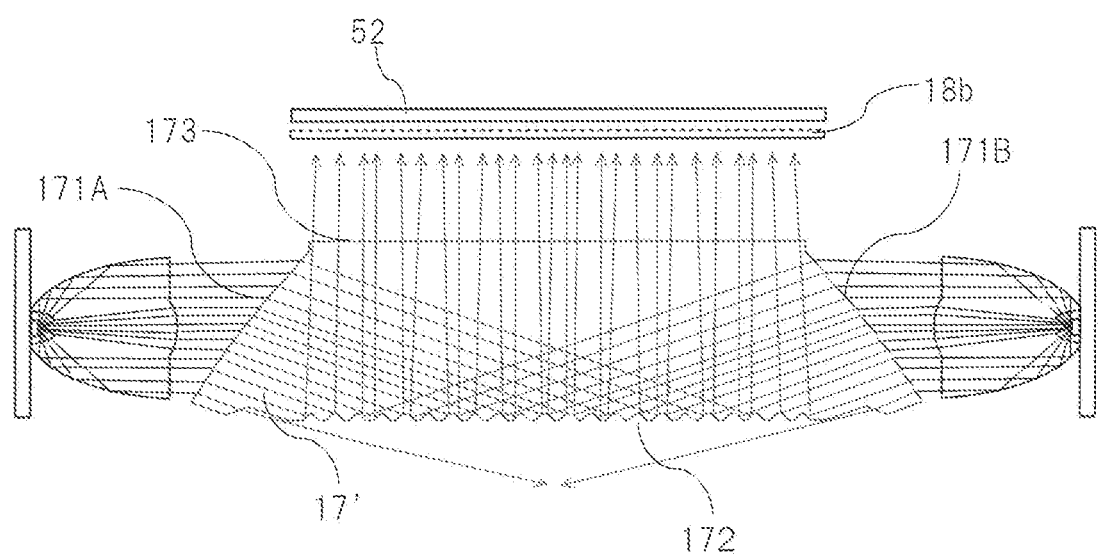
FIG. 24 is an overall side view showing an example of a configuration of a light source apparatus composed of a light guide having a plurality of light incidence portions.

FIG. 24 shows a light source apparatus constituted by a light guide 17' having a plurality of (two in this example) incidence portions 171A, 171B. As is apparent also from the drawing, formed on both side surfaces of the light guide 17' are incidence portions 171A, 171B on which light from a light source composed of the LED elements 14 (14a, 14b) and LED collimators 15, etc. is incident. Parallel light incident from the incidence portions 171A, 171B is refracted and is guided to a reflection portion 172 formed in a bottom portion of the light guide 17' in this example. On this surface of the reflection portion 172, irregularity (convex-concave) having a wave-like cross-section is formed, and further a reflective film (aluminum film) for reflecting light is formed. By such a configuration, the parallel light incident from the incidence portions 171A, 171B is reflected by the reflection portion 172 as indicated by arrows in the drawing, verges above the light guide 17', and is emitted from the emission portion 173 toward, for example, an apparatus such as the liquid crystal display panel 52.

The light source apparatus having such a configuration makes it possible to relatively easily cope with an increase in size of the liquid crystal display apparatus irradiating light, i.e., realize the light source apparatus whose emission surface is increased in size. Incidentally, as is apparent also from the above, the light source apparatus can be realized by the relatively thin light guide 17', so that the apparatus can be made thinner. Also, the thickness of the light guide 17' is substantially uniform, and its moldability (formability) is good.

Additionally, in the light guide 17' in which the light incident from its incidence portions 171A, 171B is reflected and refracted and is emitted from its emission portion 173 toward an external apparatus (the liquid crystal display panel 52 which is the subsequent optical apparatus in this example), an area SIN of the light incidence surface is generally set to be larger than an area SOUT of the light emission surface (SIN> SOUT), and the light guide 17' can be further formed in a shape adaptable to a size and/or shape of the LED element 14 as a light emitting element.

1-20: Light Source Apparatus (Other Embodiment)

Figure 25:
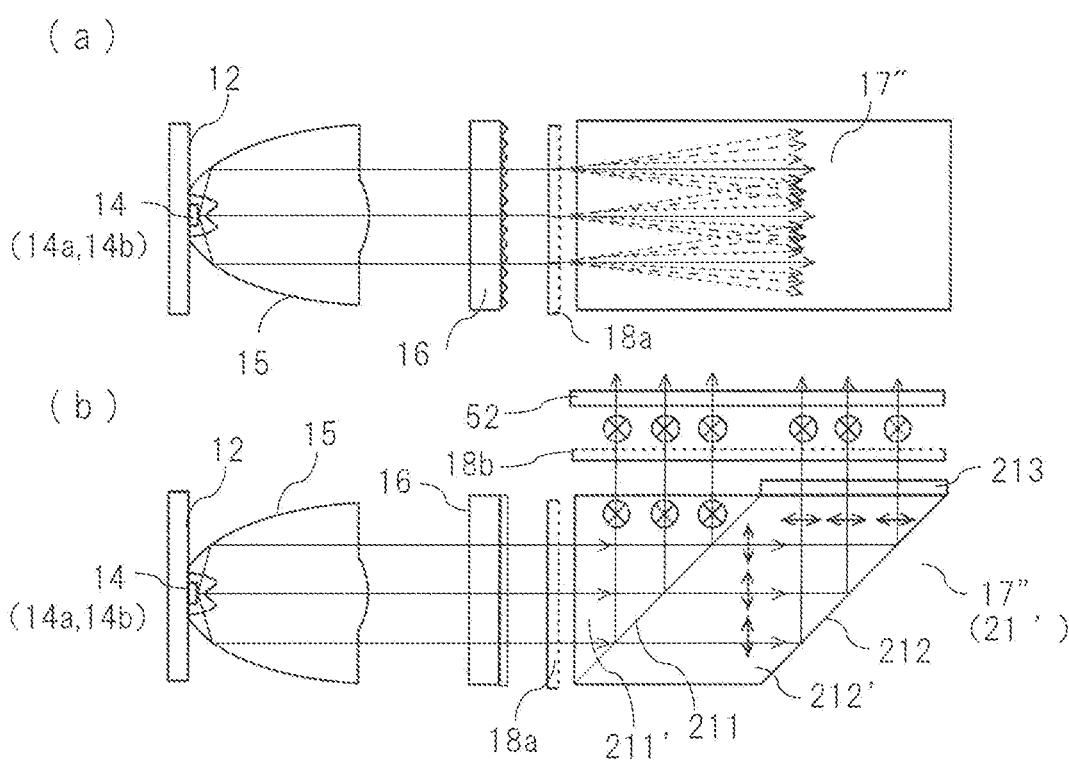
FIG. 25 is a top view and a side view showing an example of a configuration in which a light guide is formed by a polarization conversion element.

Further, as shown in FIG. 25, a light guide 17" disposed behind the optical composite block 16 can be also configured by a polarization conversion element 21'. Incidentally, as is apparent also from the drawing in this configuration, a triangular prismatic translucent member 211' and a parallelepiped translucent member 212' constituting the polarization conversion element 21' are combined. Formed on a boundary surface between their members is a PBS film 211: reflecting S-polarization waves (refer to the symbol (x) in the drawing) of incident light that is emitted from the LED elements 14 (14a, 14b) and becomes parallel light by the LED collimator 15; and transmitting P-polarization (see up-down arrows in the drawing). Simultaneously therewith, a half wave plate 213 is formed on an upper surface of the parallelepiped translucent member 212', and a reflective film 212 is formed on its side surface.

According to the above configuration, as is apparent also from the drawing, the incident light which is emitted from the LED element 14 and becomes parallel light by the LED collimator 15 is polarized into S-polarization by the action of the polarization conversion element 21' configuring the light guide 17", and leads to being emitted upward from the upper surface of the element. Namely, in the above configuration, the light guide 17" is particularly configured by the polarization conversion element 21', thereby making it possible to realize a significant reduction in size of the apparatus and a significant reduction in manufacturing cost of the apparatus.

Embodiment 2

With reference to FIGS. 26 to 51, a light source apparatus etc. according to another embodiment (referred to as Embodiment 2) of the present invention will be described. A light source apparatus according to Embodiment 2 has a unique light-guide configuration and includes the following constitutional points. The light source apparatus of Embodiment 2 has an arrangement configuration including a unique (particular) light guide different from that of Embodiment 1 (FIG. 30 etc. described later). This light guide has a free-form surface shape on at least one of the incidence and emission surfaces. The free-form surface shape realizes characteristics of predetermined light-distribution control in the light guide. Further, it has a predetermined angle so that axes (normal-line inclination) of the liquid crystal display element 50 and a refraction element 43 becomes oblique to an optical axis of light emitted from the light guide. The characteristics of the orientation control of the light guide are constituted by: an arrangement angle of the incidence surface and a refraction angle due to the surface shape, etc.; a reflection angle of the reflection surface etc.; and an arrangement angle of the emission surface and a refraction angle due to the free-form surface shape, etc. The characteristics of the light distribution control of the light source apparatus according to Embodiment 2 are configured by a combination of light-distribution control characteristics of the light guide and light-distribution control characteristics of the light source unit and other optical elements of lighting optical systems.

2-1: HUD Apparatus

Figure 26:
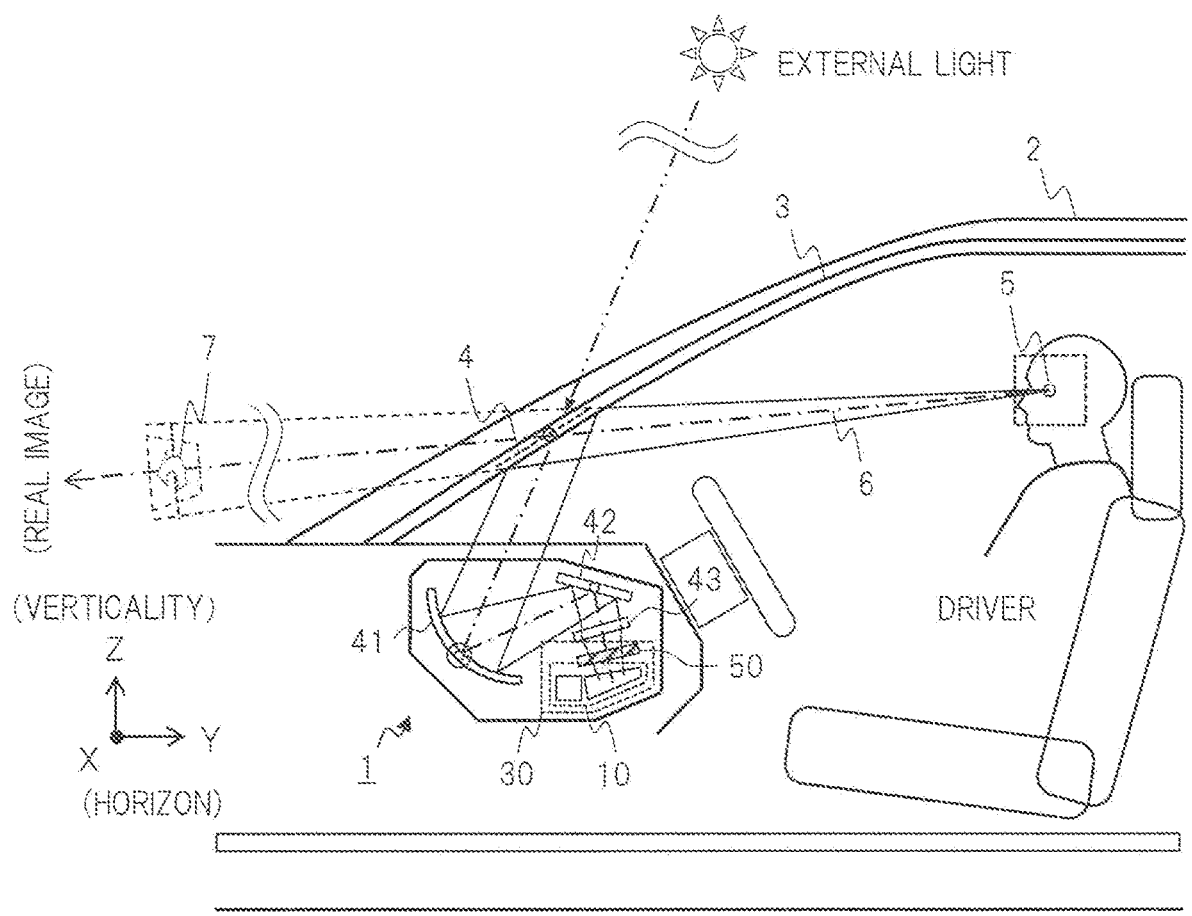
FIG. 26 is a view showing a schematic configuration when a vicinity of a driver seat in a vehicle mounting a HUD apparatus is viewed from laterally, the HUD apparatus being configured by including a light source apparatus and an image display apparatus according to Embodiment 2 of the present invention.

FIG. 26 shows a conceptual configuration of an in-vehicle HUD apparatus 1 configured by using the image display apparatus 30 including the light source apparatus 10 according to Embodiment 2, vicinity of a driver's seat in a vehicle 2 mounting the HUD apparatus 1 being viewed laterally in the conceptual configuration. Shown are states of viewing: a real image(s) (e.g., a landscape such as a road), which is transmitted through a display area 4 of a forward windshield 3 from driver's eyes 5 (also referred to as a viewpoint) sitting in the driver's seat; and a virtual image(s) 7 (e.g., an arrow image) superimposed and displayed on the real image by the HUD apparatus 1. In FIG. 26, directions in the description are set as an X direction, a Y direction, and a Z direction. The X direction (direction perpendicular to the drawing) corresponds to a first horizontal direction, a right-left direction of the vehicle 2, and a lateral direction of the display area 4. The Y direction (lateral direction in the drawing) corresponds to a second horizontal direction, a front-back direction of the vehicle 2, and a front-back direction of the display area 4. The Z direction (longitudinal direction in the drawing) corresponds to a vertical direction, a up-down direction of the vehicle 2, and a longitudinal direction of the display area 4.

The windshield 3 is made of glass etc., and has a light-permeability visible region. The visible region is a region where an image(s) can be visually recognized from a driver's side. The display area 4 of the HUD apparatus 1 is formed within the visible region of the windshield 3. The display area 4 is an area onto which image light is projected by the HUD apparatus 1 and that corresponds to a range capable of displaying the virtual image 7.

The HUD apparatus 1 is mounted on the vehicle 2, and is provided, for example, as a part of an in-vehicle system. The HUD apparatus 1 is installed, for example, in a part of a dashboard of the vehicle 2. The HUD apparatus 1 is configured by including an image display apparatus 30 and an optical system(s). The HUD apparatus 1 is an apparatus in which constituent parts (components) of the image display apparatus 30 and constituent parts (components) of the optical system are arranged and accommodated in an outer case serving as a housing. A part of the housing, e.g., a part of its upper surface has an opening. The opening is covered with an antiglare plate (glare trap) etc. The components of the optical system include reflection mirrors 41, 42 and a refraction element 43, etc. as described later.

The image display apparatus 30 is configured by including a light source apparatus (light source module) 10, and a liquid crystal display element 50 serving as a display element. The image display apparatus 30 is a projector that generates and emits image light based on image data to perform projection display for the windshield (or a not-shown combiner etc.). The combiner is a dedicated display plate provided just in front of the windshield 3. The light source apparatus 10 includes an LED element and a lighting optical system as shown also in Embodiment 1, and generates and irradiates illumination light to the liquid crystal display element 50.

The liquid crystal display element 50 generates image light based on a display signal (s) and on the illumination light from the light source apparatus 10, and emits the image light to an optical system (particularly, referred to as an adjustment optical system). The adjustment optical system has, as optical components, a refraction element 43 and reflection mirrors 42, 41. These optical components realize a function (display distance adjustment mechanism) of adjusting a projection position and a display distance, etc. of the image light with respect to the windshield 3. The HUD apparatus 1 reflects and enlarges, via the optical element such as the refraction element 43 by the reflection mirrors 41, 42, the image light emitted from the liquid crystal display element 50 of the image display apparatus 30, and projects it onto a partial area of the windshield 3.

The refraction element 43 is composed of a lens etc. for refracting the image light. Connected to the refraction element 43 may be a driver such as a motor for varying an arrangement angle etc. so as to be capable of adjusting an optical axis and a refraction direction. The reflection mirror 42 is, for example, a planar mirror and causes light emitted, for example, roughly vertically (Z direction) from the liquid crystal display element 50 to be reflected toward the reflection mirror 41 located roughly frontward (left in Y direction). The reflection mirror 41 is, for example, a concave mirror and causes the image light incident roughly from the Y direction to be reflected toward the windshield 3 located roughly above the vertical direction (Z direction). Connected to the reflection mirrors 41, 42 may be a driver such as a motor for adjusting an arrangement angle etc. so as to be capable of adjusting the direction of the optical axis.

The image light emitted from the HUD apparatus 1 (reflection mirror 42) is reflected roughly right in the Y direction by a surface of the partial area (display area 4) of the windshield 3, is incident on the driver's eyes 5, and forms an image(s) on a retina. Consequently, the driver sees the image light, thereby visually recognizing, as the virtual image 7, a video-image or an image superimposed on the real image transmitted in the display area 4 of the windshield 3 in front of a field of view.

An optical axis of the image light and a sightline 6 in seeing the virtual image 7 from the driver's eye 5 are indicated by dash-single-dot lines. Further, an optical axis of external light such as sunlight incident on an outside of the vehicle 2, for example, insides of the windshield 3 and the HUD apparatus 1 from above is by a dash-double-dot line.

2-2: HUD Apparatus—Function Block

Figure 27:
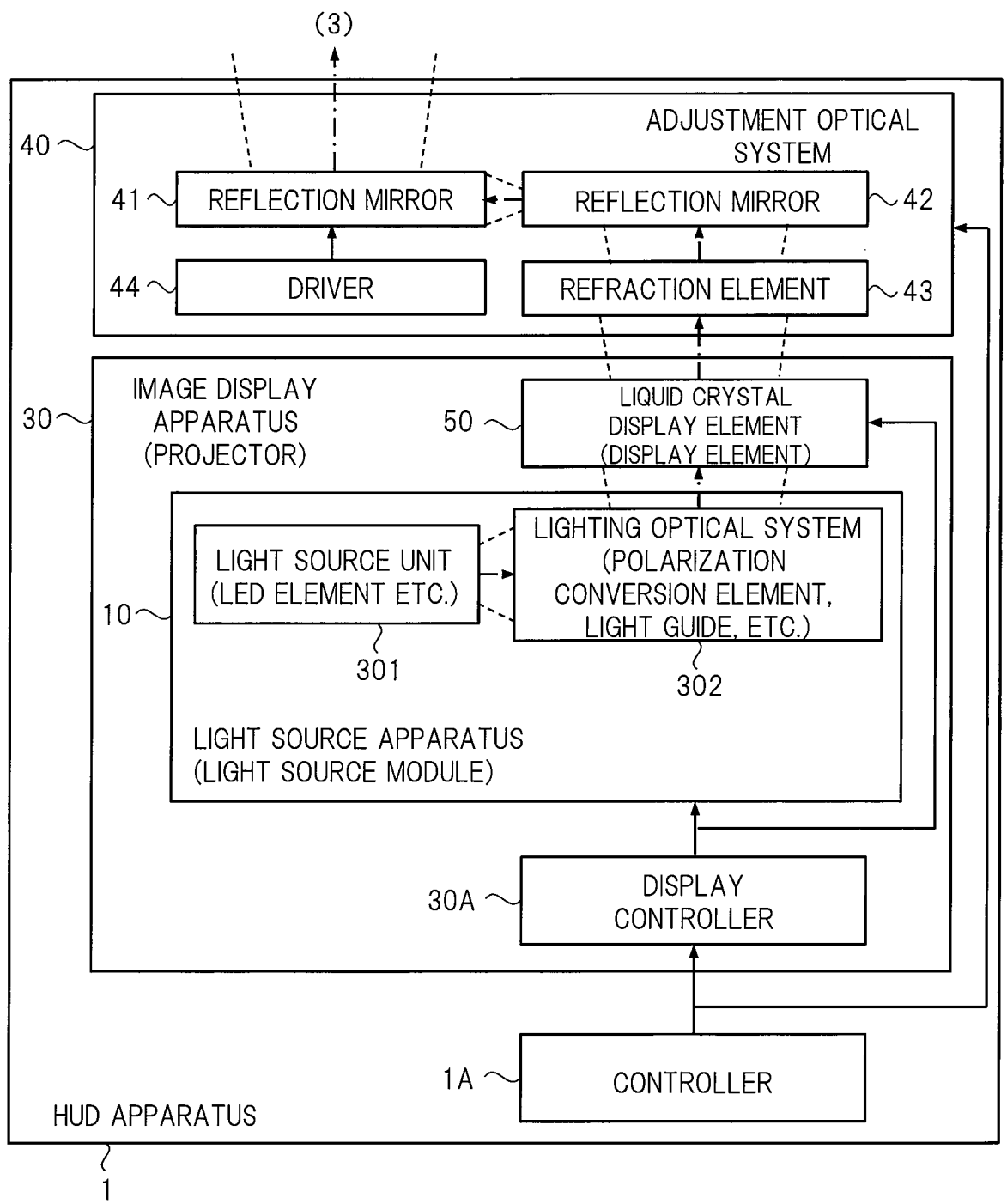
FIG. 27 is a view showing a functional block configuration of the HUD apparatus.

FIG. 27 shows a functional block configuration inside the HUD apparatus 1 of FIG. 26. The HUD apparatus 1 includes a controller 1A, an image display apparatus 30, and an adjustment optical system 40. The image display apparatus 30 includes a display controller 30A, a light source apparatus 10, and a liquid crystal display element 50 as a display element. The liquid crystal display element 50 is a transmissive or reflective liquid crystal display apparatus.

The light source apparatus 10 includes the light source unit 301 and lighting optical system 302 as described above. The light source unit 301 is configured by the LED element 14 etc. as described also in Embodiment 1. The lighting optical system 302 is configured by the LED collimator 15, polarization conversion element 21, and light guide 17, etc. as described also in Embodiment 1. As described above, the polarization conversion element 21 is configured by a translucent member (prism), a PBS film, and a phase plate, etc. The adjustment optical system 40 is configured by a refraction element 43, and reflection mirrors 42, 41, etc. Connected to at least the reflection mirror 43 is a driver 44 for variably adjusting an arrangement angle.

When being connected to an in-vehicle system, the HUD apparatus 1 is operable based on control from a not-shown engine controller (ECU) etc. The controller 1A of the HUD apparatus 1 controls the display controller 30A of the image display apparatus 30, the driver 44 of the adjustment optical system 40, and the like, thereby controlling display of the virtual image 7 into the display area 4. Based on the control of the controller 1A, the display controller 31 generates image data for displaying the virtual image 7, and gives a drive control signal(s) and a display signal(s) to the light source apparatus 10 and liquid crystal display apparatus 50. The light source apparatus 10 controls on/off etc. of light emission of the LED element 14 based on the drive control signal, thereby generating and emitting illumination light. Light beams generated from the light source unit 301 are condensed and uniformized by the lighting optical system 302, and are irradiated, as planar illumination light, on a surface of the liquid crystal display apparatus 50. The liquid crystal display element 50 includes a display drive circuit(s), and generates and emits image light based on the display signal and the illumination light. In the lighting optical system 302, the optical component(s) performs predetermined characteristic oriental control for generating illumination light suitable for the liquid crystal display element 50 and HUD apparatus 1.

Incidentally, as the display element, not only the liquid crystal display element 50 but also other kinds of elements are applicable. In that case, characteristics including the light distribution control of the adjustment optical system 40 and light source apparatus 10 are mounted to be adapted to the characteristics of the display element.

2-3: Comparative Example, and Problems, Etc.

Figure 28:
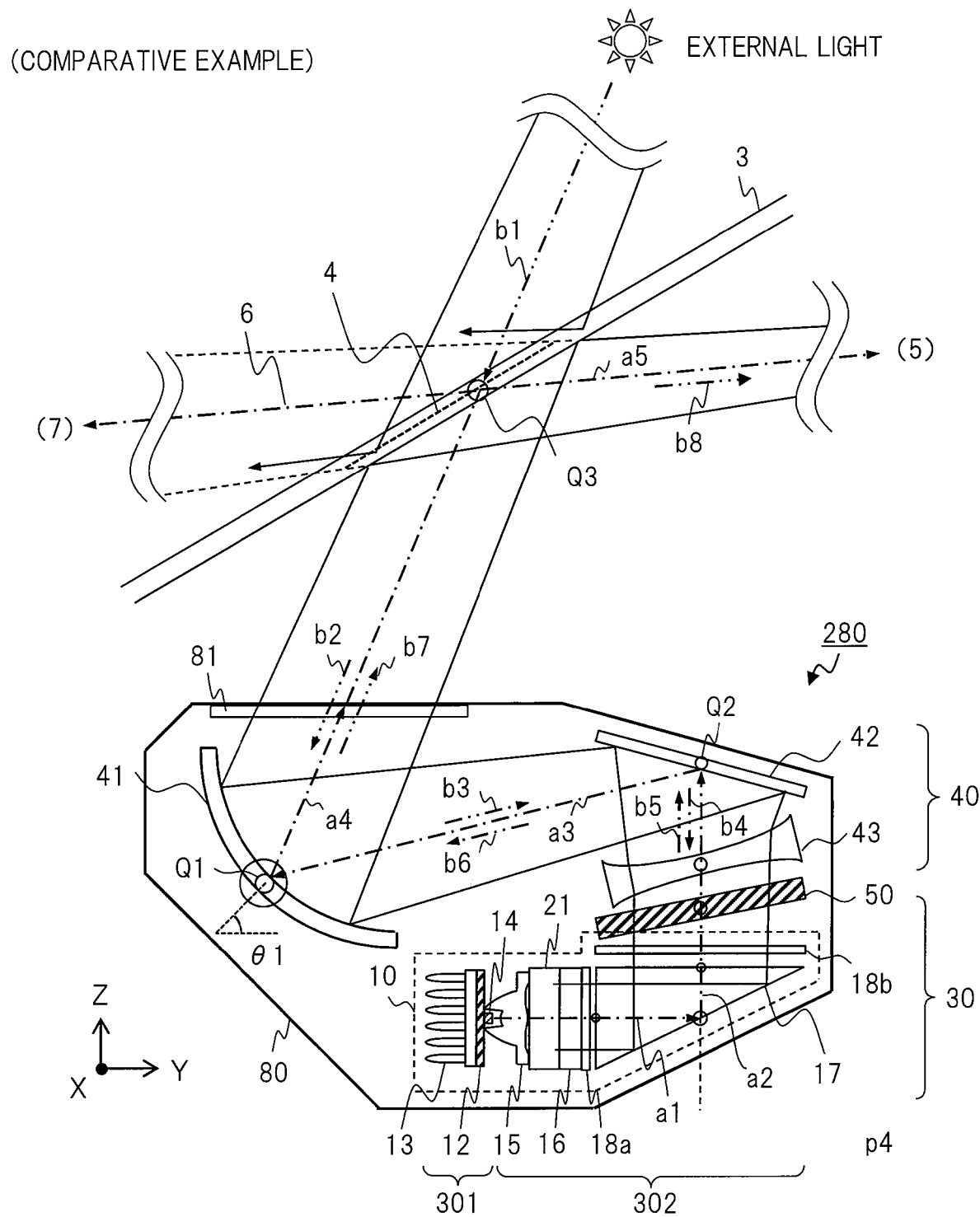
FIG. 28 is an explanatory diagram showing a configuration outline of a HUD apparatus of a comparative example, and showing a behavior and a problem, etc. brought when external (natural) light is incident thereon.

FIG. 28 shows a schematic configuration of a HUD apparatus 280 of a comparative example with respect to Embodiment 2, and is an explanatory diagram about a problem etc. of an influence of external light. An outline of component arrangement of a HUD apparatus 280 of FIG. 28 is similar to that of FIG. 26. The HUD apparatus 280 of the comparative example has almost the same constituent elements as those of the above-described embodiment. In the light source apparatus 10, a heat sink 13, an LED substrate 12, an LED element 14, an LED collimator 15, a polarization conversion element 21, an optical composite block 16, a diffuser 18a, and a light guide 17 are arranged in order backward (right in the drawing) from forward (left in the drawing) in the Y direction. A light-emitting axis of the LED element 14 is the Y direction, and is denoted by an optical axis a1. The light guide 17 has a columnar shape whose cross-section is triangular. A diffuser 18b, a liquid crystal display element 50, a refraction element 43, and a reflection mirror 42 are arranged in order upward in the Z direction from the light guide 17. The reflection mirror 41 is disposed forward (left) in the Y direction from the reflection mirror 42. An opening 81 of a housing 80 is present upward in the Z direction from the reflection mirror 41.

A light-emitting axis extending in the Y direction from a light emitting point of the LED element 14 is indicated by the optical axis a1. The optical axis a1 is converted into an optical axis a2 in the Z direction by a reflection portion of the light guide 17. The incidence and emission surfaces of the light guide 17 are planar. The emission surface of the light guide 17 and the diffuser 18b are arranged in a horizontal X-Y plane. In the Z direction, a panel surface of the liquid crystal display element 50 is disposed above the emission surface of the light guide 17 and the diffuser 18b in a state inclined to some extent in the horizontal X-Y plane. On the optical axis a2, the refraction element 43 is disposed above the liquid crystal display element 50 in a state inclined similarly.

On the optical axis a2, image light serving as emitted light from the liquid crystal display element 50 is incident on a point Q2 of the reflection mirror 42 via the refraction element 43. The optical axis a2 is reflected at the point Q2 of the reflection mirror 42, thereby becoming an optical axis a3 extending roughly left in the Y direction. The optical axis a3 is incident on a point Q1 of the reflection mirror 41. The optical axis a3 is reflected at the point Q1 of the reflection mirror 41, thereby becoming an optical axis a4 extending roughly upward in the Z direction. The optical axis a4 is incident on a point Q3 of the display area 4 of the windshield 3 and is reflected thereat, thereby becoming an optical axis a5 extending roughly right in the Y direction to be incident on the driver's eyes 5.

An angle of the reflection mirror 41 is indicated by an angle θ1. This angle θ1 corresponds to, for example, a rotation angle (in this example, an angle with the horizontal plane set at 0° as a reference) centered about a rotational axis in the X direction, and is variable through the driver 44.

When a size in a height direction (Z direction) of the HUD apparatus 280 is reduced, the optical axis has a form of being bent in the Y and Z directions by using the light guide 17 similarly to this comparative example, and components such as the heat sink 13, LED substrate 12, LED collimator 15, polarization conversion element 21 are arranged therein. This arrangement suppresses the size in the Z direction, but relatively increases the size in the Y direction. Particularly, incases of using the plural LED elements 14 for increasing light quantities and using the large heat sink 13 etc. for enhancing heat radiation performance, the size in the Y direction increases. This is disadvantageous to miniaturization of the HUD apparatus 1.

Since the HUD apparatus is installed in a limited space such as a dashboard in the vehicle, a smaller apparatus with high efficiency is demanded. It is desirable that the image display apparatus 30 and light source apparatus 10 are realized as smaller modules with high efficiency so as to be suitable for mounting of the HUD apparatus etc. Also, generating etc. of preferable image light for the virtual image is demanded while the HUD apparatus is miniaturized. In order to generate the preferable image light, preferable illumination light from the light source apparatus 10 is demanded. Also, cooling performance etc. of the light source unit is also demanded. The light source apparatus 10 needs to generate preferable planar illumination light adapted to the characteristics of the HUD apparatus 280 and liquid crystal display element 50, etc. The illumination light needs to have, for example, a predetermined light quantity, a surface size, uniformity of a light intensity distribution in its plane, and the like. Miniaturization etc. of the apparatus are also demanded while those characteristics are ensured.

The image light from the image display apparatus 30 is subjected to the refraction, reflection, and enlargement, etc. via the adjustment optical system 40, is projected on the display area 4 of the windshield 3, and is incident onto the driver's eyes 5 at a predetermined convergence angle. When viewed from the driver, the virtual image 7 corresponding to the predetermined convergence angle is observed through the display area 4. Although the predetermined convergence angle varies depending on a HUD optical system, it is about 4° to 10° in the horizontal direction (horizontal light) and about 1.5° to 5° in the vertical direction (vertical light) roughly with respect to the driver. In order to obtain a predetermined convergence angle preferable as the image light of the HUD, the image light needs sufficient enlargement before being incident on the reflection mirror 41. Particularly, in order to realize 4° to 10° as a convergence angle of horizontal light, the image light needs to be enlarged about 200 mm or more. To do so, required are measures such as enlargement of emitting light by the light source apparatus 10 and enlargement of emitting light by the refraction element 43 and the reflection mirror 42 of the adjustment optical system 40.

Further, in a configuration including an optical system of the comparative example in FIG. 28, the optical axis a2 in the Z direction of the emitting light from the light source apparatus 10 (the light guide 17) and an axis (normal-line direction) of the liquid crystal display element 50 and the refraction element 43 are arranged at a predetermined angle therebetween. In such a configuration, there also arises a problem of an influence of external light as follows. In FIG. 28, an optical path when external light is incident on an inside of the HUD apparatus 280 is indicated by optical axes b1 to b4 etc. having dash-double-dot lines. A direction of the optical axes b1 to b4 travels in a direction inverse to an emission optical path (optical axes a1 to a5) of the image light. Incidentally, since the optical axis b2 etc. overlap with the optical axis a4 etc., they are slightly shifted and shown.

When being incident on the inside of the HUD apparatus 280, external light is incident on the refraction element 43 and liquid crystal display element 50 through the reflection mirrors 41, 42 of the adjustment optical system 40. Further, the external light is reflected by the refraction element 43 etc. and returns the optical path in a reverse direction, and part of the external light goes out of the HUD apparatus 280. Then, the external light is reflected by the windshield 3, and may be incident on (enter) the driver's eyes 5. Consequently, the driver visually recognizes the virtual image 7 in a state in which the external light is reflected as noise on the image light of the virtual image 7 in the display area 4. Therefore, the driver may have difficulty in visually recognizing the virtual image 7. Namely, display quality of the virtual image deteriorates.

First, the optical axis b1 of external light from above the vehicle 2 is incident on the point Q3 in the display area 4 of the windshield 3. Part of the external light is reflected etc. on the surface of the windshield 3. The optical axis b2 of the external light incident on the inside of the windshield 3 is incident on the point Q1 of the reflection mirror 41 via the opening 81. The optical axis b3 of the external light reflected at the point Q1 is incident on the point Q2 of the reflection mirror 42. The optical axis b4 of the external light reflected at the point Q2 is incident on the refraction element 43 and liquid crystal display element 50. The external light reflected by the refraction element 43 etc. returns to a direction reverse (opposite) to an incident direction similarly to the optical axes b5, b6, and b7. These external light beams go out of the HUD apparatus 280, are reflected at the point Q3 in the display area 4 of the windshield 3, and are incident on the driver's eyes 5 similarly to the optical axis b8.

The light source apparatus 10 and adjustment optical system 40 of the HUD apparatus 280 need the light distribution control for realizing a predetermined convergence angle in order to obtain preferable image light for forming the virtual image 7 in the preferable display area 4. For such light distribution control, for example, a configuration as shown in FIG. 28 is adopted. In this configuration, as described above, an external light component(s) returning outside the HUD apparatus 280 (sometimes referred to as return external light) occurs due to reflection etc. of the external light incident on the inside of the HUD apparatus 280. Namely, the external light to be incident is excluded by reflection and absorption etc. to some extent due to functions of the windshield 3 and the opening 81 of the HUD apparatus 1 by tilting the refraction element 43 and liquid crystal display element 50 to some extent. Since the surface of the refraction element 43 is concave, however, part of the reflected light moves backward in an incident light path and the external light cannot be completely excluded. This brings deterioration in the display quality of the virtual image 7 when the return external light is incident on the driver's eyes 5.

Therefore, the light source apparatus etc. according to Embodiment 2 provide a function capable of preventing or reducing the influence of the external light as described above in order to enhance the display quality of the HUD. The light source apparatus etc. according to Embodiment 2 are structurally different from those of the comparative example (FIG. 29 etc. described below) in an optical-axis direction with respect to the liquid crystal display element 50 and refraction element 43, etc. by devising structures of the light source unit 301 and lighting optical system 302. From considering the above, it has been found effective to make a tilt angle of a normal line of an effective surface (surface transmitted and reflected by image light) of the refraction element 43 etc. at least 10° or more with respect to the optical axis of the illumination light and image light. The devising makes it possible for the light source apparatus etc. according to Embodiment 2 to realize characteristics of predetermined light distribution control so as to satisfy both of generation of suitable image light and prevention etc. of the return external light. The illumination light generated based on the predetermined light distribution control in the light source apparatus is supplied to the liquid crystal display element. Then, the image light having predetermined suitable characteristics for the display area of the HUD apparatus is generated and emitted. The image light is projected onto the display area of the windshield via the adjustment optical system including the refraction element 43 etc. Here, since the predetermined light distribution control is performed by the light source apparatus as described above, a distribution of refraction angles in the refraction element 43 does not need to be as wide as the comparative example. Namely, a surface shape of the refraction element 43 does not need to make an inclination (curvature) of the concave surface as steep as that of the comparative example. In the light source apparatus etc. of Embodiment 2 by the above, when the external light is incident on the inside of the HUD apparatus, tilting the refraction element 43 and the liquid crystal display element 50 to some extent causes the external light to hardly return outside the HUD apparatus, i.e., to bring no return external light even if the external light is reflected by the adjustment optical system and liquid crystal display element. Therefore, prevented or reduced is deterioration of the display quality of the virtual image due to incidence of the return external light on the driver's eyes. Namely, Embodiment 2 makes it possible to prevent or reduce the return external light while securing suitable image light, and to obtain an effect of suppressing deterioration of visibility of the virtual image due to the influence of the external light.

Incidentally, in the comparative example, when the optical element etc. are installed so that the external light is deviated by the adjustment optical system 40 in the HUD apparatus 280 and is not reflected inside the display area 4 in order to reduce the influence of external light (e.g., when the liquid crystal display element 50 and refraction element 43 are aslant arranged to the horizontal plane as shown in FIG. 28), the installation inevitably influences characteristics of the image light. Therefore, the characteristics of the light distribution control need to be devised and controlled by all of the light source apparatus 10, liquid crystal display element 50, and refraction element 43, etc. so that the predetermined preferable image-light characteristics is ensured while reducing the influence of the return external light.

By adopting a configuration of providing the tilt angle of the normal line in Embodiment 2, some light beams reflected by the refraction element 43 etc. among external light beams incident on the optical path of the image light in a reversed manner deviate in a direction of at least twice the tilt angle (e.g., 10°) of the normal line, e.g., a direction of 20° with respect to the incident light. Therefore, it can be prevented or reduced that the reflected light goes out of the HUD apparatus 1 (opening 81), is again reflected as return external light by the windshield 3, and is incident on the driver's eyes 5. However, in order to satisfy a condition for avoiding such external light, a structure of the adjustment optical system 40 such as the refraction element 43 and reflection mirrors 41, 42 is naturally restricted.

Due to the above restriction, suitable image light (light sufficiently expanded for the display area 4) cannot be realized only by a method of expanding light with the adjustment optical system 40 such as the above-described refraction element 43. Therefore, in order to realize the preferable image light, a configuration of enlarging the emitting light by the adjustment optical system. 40 and a configuration of enlarging the illumination light by the light source apparatus 10 need to be devised for concurrent use. As a result of various studies, it has been found effective to have a configuration in which: making the light source apparatus small, thin, and highly efficient is realizable simultaneously with enlargement and control of the illumination light; and the orientation control is performed by making at least one of the incidence or emission surface of the light guide a free-form surface shape.

2-4: HUD Apparatus—Light Distribution Control

Figure 29:
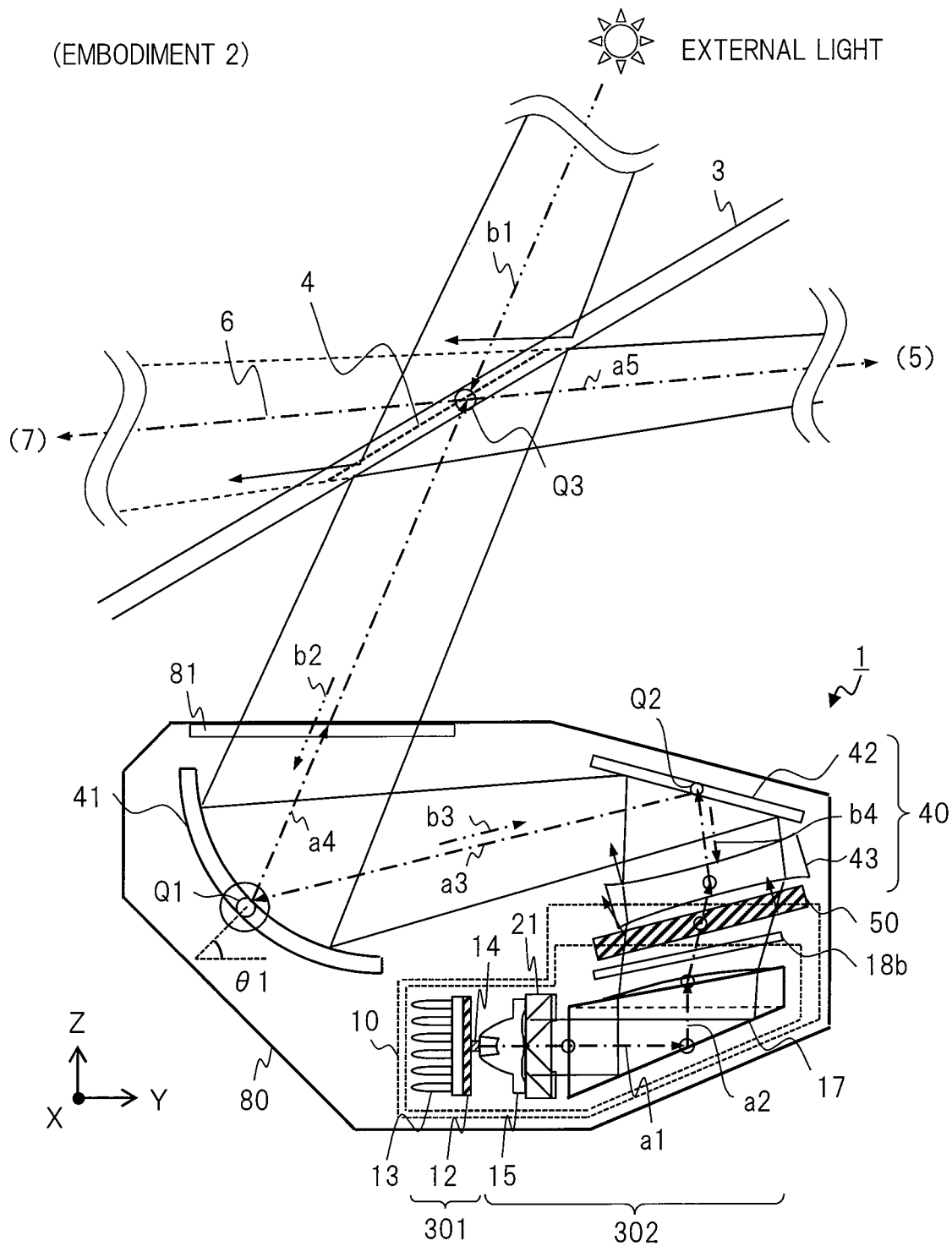
FIG. 29 is an explanatory diagram showing a configuration outline of the HUD apparatus according to Embodiment 2, and showing a behavior etc. brought when external light is incident thereon.
Figure 30:
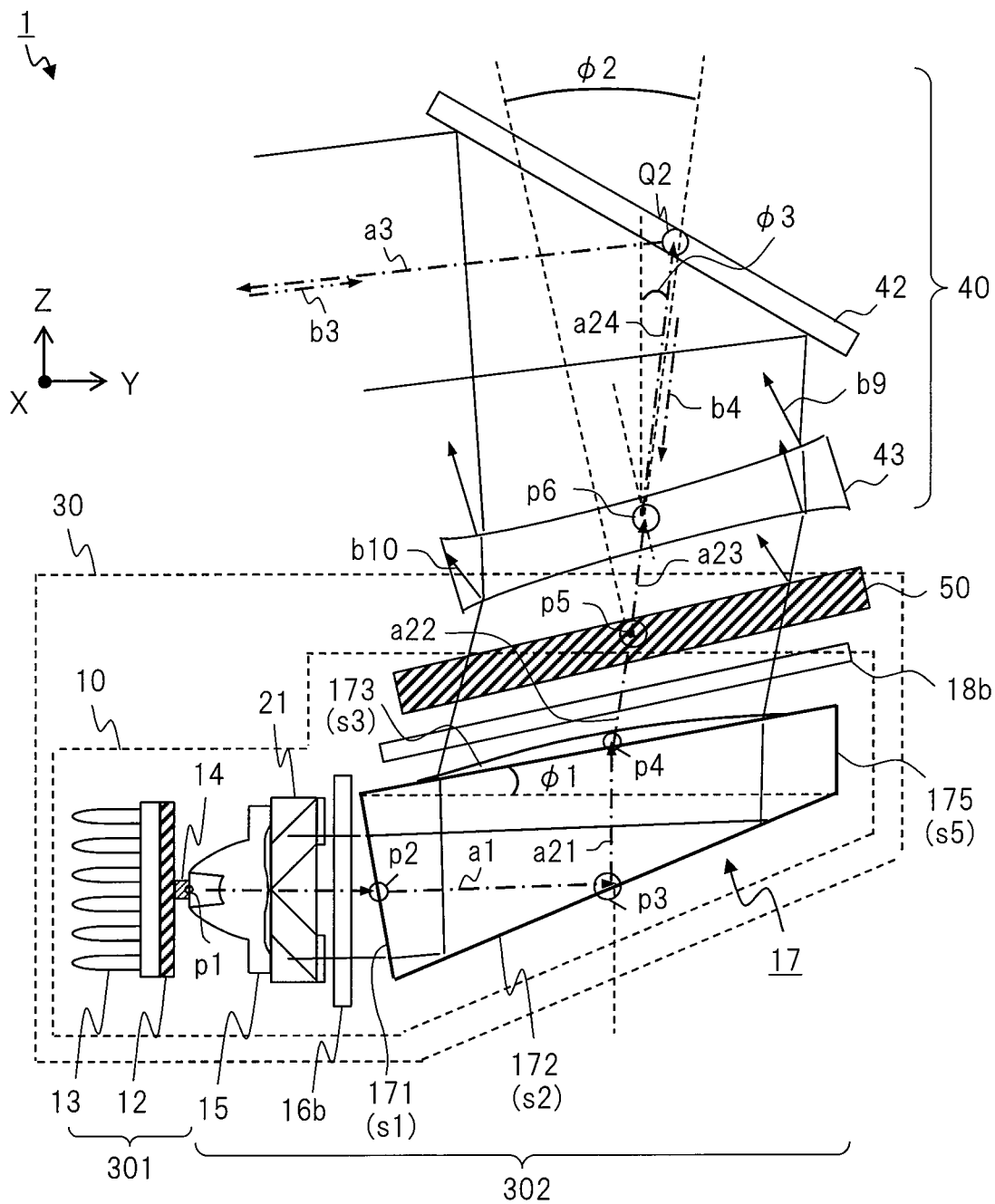
FIG. 30 is a diagram showing configuration outlines of the above-mentioned image display apparatus and an adjustment optical system, etc.

FIG. 29 shows a schematic configuration, and orientation control, etc. of the HUD apparatus 1 including the light source apparatus 10 and image display apparatus 30 according to Embodiment 2 in comparison with the comparative example of FIG. 28. It also shows an optical path etc. when external light is incident on the inside of the HUD apparatus 1. The light source apparatus 10 and image display apparatus 30 according to Embodiment 2 have characteristics of light distribution control different from that of the comparative example. Incidentally, FIG. 29 etc. are schematic configurations, and a mounting size(s) etc. are not limited to that of FIG. 29 etc.

In FIG. 29, a light source unit 301 includes an LED substrate 12 mounting a plurality of LED elements 14 and a control circuit (s). A heat sink 13 is provided on a back side of the LED substrate 12. A lighting optical system 302 includes: an LED collimator 15, a polarization conversion element 21, a light guide 17 arranged in the Y direction; a diffuser 18b arranged in the Z direction; and the like. The LED collimator 15 condenses light of an optical axis a1 in the Y direction from the LED element 14, and converts it into parallel light. The polarization conversion element 21 performs optical conversion of the incident light from the LED collimator 15 so as to polarize its light flux direction and widen a light flux width, and then emits the converted light. The light guide 17 guides light so that a direction of the optical axis a1 in the Y direction from the LED element 14 is converted to a direction of the optical axis a2 in the Z direction of irradiating the liquid crystal display element 50. In Embodiment 2, the light guide 17 has a columnar shape whose cross-section is roughly trapezoidal, and roughly converts a direction of light from the Y direction (horizontal direction) to the Z direction (vertical direction). Specifically, the emitted light from the light guide 17 passes through a free-form surface shape of the emission surface (a slope having a predetermined angle to the horizontal plane) of the light guide 17, and becomes an optical axis inclined at a predetermined angle to the Z direction.

An optical axis of the illumination light and image light and an axis (tilt angle of normal line) of the liquid crystal display element 50 and refraction element 43 have a predetermined angle (e.g., 10°) as described above. Illumination light, which is emitted light from the light guide 17, is incident on the liquid crystal display element 50 arranged at a predetermined angle in the horizontal plane (X-Y plane), and image light is generated. The image light from the liquid crystal display element 50 has an optical axis tilted at a predetermined angle to the Z direction. The image light is incident on a refraction element 43 arranged at a predetermined angle in the horizontal plane (X-Y plane). After passing through the refraction element 43 and being refracted, the image light is incident on the point Q2 of the reflection mirror 42 and is reflected. The light having the optical axis a3 after reflection is incident on the point Q1 of the reflection mirror 41 and is reflected. The optical axis a4 of the reflected light is incident on the point Q3 in the display area 4 of the windshield 3 via the opening 81, and is reflected. The optical axis a5 of the reflected light is incident on the driver's eyes 5.

Connected to the adjustment optical system 40 is, for example, a driver 44 for changing an angle of the reflection mirror 42. The driver 44 varies an angle θ1 (having a predetermined correspondence relationship with the optical-axis direction) of the reflection mirror 41 by driving a motor etc. The driver 44 changes the angle θ1 of the reflection mirror 41 based on control from the controller 1A of the HUD apparatus 1 or on a manual input operation by the driver. Change of the angle θ1 of the reflection mirror 41 brings change of a projection direction (optical axis a4) of the image light from the HUD apparatus 1. This changes a projection position of the image light onto the windshield 3, and changes a position of the display area 4. Therefore, the position in the display area 4 of the windshield 3 as viewed from the driver can be adjusted so as to move upward and downward in the Z direction, for example. The position of the display area 4 can be preferably adjusted depending on a position etc. of the driver's eyes 5.

The light source apparatus 10 according to Embodiment 2 achieves ensuring of light utilization efficiency and downsizing of the apparatus by devising the LED substrate 12, LED collimator 15, and polarization conversion element 21, etc., thereby making its size in the Y direction smaller. The light source apparatus 10 and the adjustment optical system 40 in the HUD apparatus 1 according to Embodiment 2 require the light distribution control for realizing a predetermined convergence angle in order to generate preferable image light. Then, the HUD apparatus 1 according to Embodiment 2 also needs predetermined light-distribution control for a function of preventing return external light. In order to realize the light distribution control satisfying both of them, the HUD apparatus 1 of Embodiment 2 adopts a configuration shown in FIG. 29 and including a specific light guide 17. This configuration is different in that an optical axis (tilt angle of normal line) of an optical element such as the refraction element 43 has a predetermined angle (10° or more) with respect to the optical axes of the illumination light from the light source apparatus 10 and the image light from the liquid crystal display element 50 (see an angle φ2 etc. in FIG. 30 as described later).

In FIG. 29, an optical path(s) when external light is incident on the inside of the HUD apparatus 1 is as follows. Similarly to the comparative example, the optical axes at a time of incidence of external light are shown as b1 to b4. The optical axis b4 indicates light that is reflected at the point Q2 of the reflection mirror 42 and is incident on the refraction element 43 etc. The optical axis b4 is different in having an angle to the axis (tilt angle of normal line) of the refraction element 43 and liquid crystal display element 50. Therefore, the light reflected by the refraction element 43 and liquid crystal display element 50 on the optical axis b4 travels in a direction different from the above-mentioned optical axis b5. Since the reflected external light strikes the housing 80 and attenuates etc., it is prevented or reduced that the reflected external light goes out through the opening 81. This causes the return external light to prevent or reduce incidence on the driver's eyes 5.

2-5: HUD Apparatus—Light Distribution Control (2)

Figure 32:
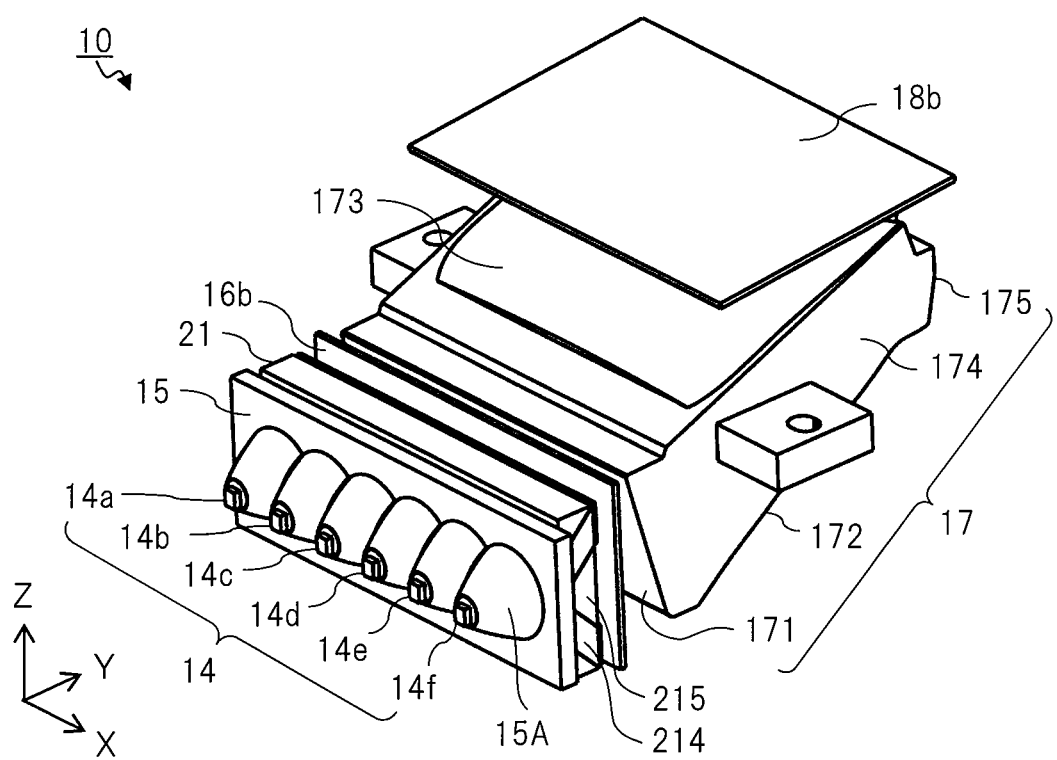
FIG. 32 is a perspective view showing an example of an internal configuration of the light source apparatus.
Figure 33:
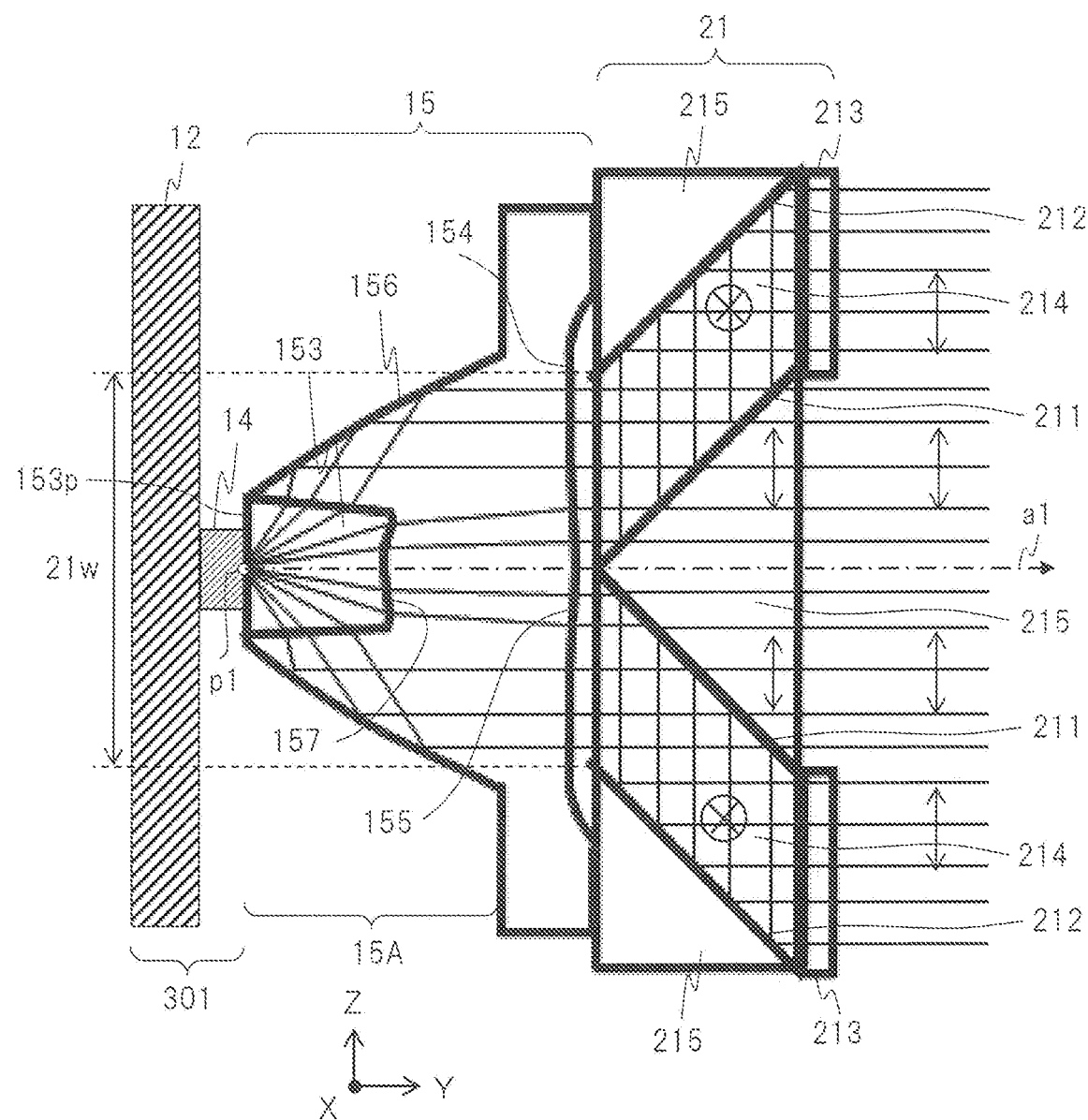
FIG. 33 is a partially enlarged sectional view showing a configuration and a light distribution of a light source unit, an LED collimator, and a polarization conversion element, etc. of the light source apparatus.

FIG. 30 shows configuration outlines of the light source apparatus 10, image display apparatus 30, and adjustment optical system 40, etc. according to Embodiment 2. FIG. 30 shows a more detailed configuration example than that of FIG. 29. In the light source apparatus 10 in FIG. 30, the heat sink 13, the LED substrate (LED element 14), the LED collimator 15, the polarization conversion element 21, a light-distribution control plate 16b, and the light guide 17 are arranged in order from left to right in the Y direction. A plurality of LED elements 14 are arranged in the X direction of the LED substrate 14 (FIG. 32 etc. described later). A light emitting surface of the LED element 14 is arranged so as to be tangent to a top surface of a concave (recess) portion of the LED collimator 15 and be exposed outside (go out) (FIG. 33 etc. described later). In the X direction of the LED collimator 15, a plurality of collimator elements 15A are arranged correspondingly to positions of the plural LED elements 14. In the polarization conversion element 21, an extension direction of a member such as a PBS film is the X direction, and each arrangement direction of a plurality of members is the Z direction (FIG. 35 etc. described later and the like). A plurality of members each having a position and a shape vertically symmetrical in the Z direction are arranged with respect to the optical axis a1 in the Y direction from the LED element 14. An incidence portion 171 (incidence surface s1) of the light guide 17 is disposed on an emission side of the light-distribution control plate 16b.

This makes it possible to compactly arrange a plurality of components in the X direction, reduce a size of the apparatus in the X direction, and contribute to miniaturization etc. in a case of a form of arranging components such as the plural LED elements 14 in parallel in the X direction. Alternatively, the above makes it possible to arrange more components within a predetermined size of the apparatus in the X direction, for example, secure larger light quantities by arrangement of many LED elements 14. Additionally, an increase in a degree of freedom of arrangement of components in the X direction makes it easier to deal with various mounting forms of the HUD apparatus 1. For example, such an increase makes it easy to mount the apparatuses in accordance with sizes of the various display areas 4.

The light guide 17 is substantially trapezoidal in a Y-Z cross-section as shown in the drawing. The light guide 17 includes an incidence portion 171 (including an incidence surface s1), a reflection portion 172 (including a reflection surface s2), an emission portion 173 (including an emission surface s3), and a vertex portion 175 (including a vertex surface s5). In this example, the incidence surface s1 of the incidence portion 171 is disposed at a predetermined angle to the vertical Z direction, but may be disposed as a plane in the Z direction. Similarly to Embodiment 1, the reflection surface s2 of the reflection portion 172 has a structure in which a plurality of reflection and connection surfaces are alternately repeated. Located on an opposite side of the incidence surface s1 in the Y direction is the vertex surface s5. By providing the vertex portion 175, the emission surface s3 of the emission portion 173 is basically configured as an incline (slope) having a predetermined angle $\phi 1$ to the horizontal Y direction. Further, the emission surface s3 has a free-form surface shape. This free-form surface shape is a shape for realizing predetermined light distribution control. Incidentally, although the free-form surface shape of the emission surface s3 is shown as a convex shape, it is not limited to this, and its details will be described later.

The refraction element 43 is constituted by an optical element such as a lens having a predetermined refractive index, and has concave shapes on incidence and emission sides, for example, as shown in FIG. 30 as a detailed shape. An incline of the concave surface of the refraction element 43 is gentler than that of the refraction element 43 of the comparative example. In other words, a difference in height (curvature) between a center and a periphery of the concave surface is relatively small. The shape of the refraction element 43 is not limited thereto, and may have a concave surface on the incidence side and a convex surface on the emission side as shown in FIG. 1.

An optical path etc. of image light are as follows. The optical axis a1 in the Y direction from the LED element 14 roughly becomes the optical axis a2 in the Z direction through reflection due to the light guide 17. The optical axis a2 of emitted light from the light guide 17 is converted into such a direction (optical axes a22, a23) as to have a predetermined angle $\phi 3$ to the Z direction through the action of the emission surface s3. The axes of the liquid crystal display element 50 and the refraction element 43 form a predetermined angle $\phi 2$ to its optical axis a2. In this example, the panel surface of the liquid crystal display element 50 and the refraction element 43 are arranged at a predetermined angle (angle $\phi 5$ in FIG. 42 described later) to the X-Y plane. As described above, the optical axes a23, a24, and a25 are non-orthogonal to the axes of the liquid crystal display element 50 and refraction element 43, and have an angle $\phi 2$ therebetween.

A light emitting point of the LED element 14 is indicated by a point p1. Shown is the optical axis a1 in the Y direction from the point p1. Shown is a point p2 through which the optical axis a1 passes in the incidence surface s1 of the light guide 17. Shown is a point p3 at which the optical axis a1 strikes the reflection surface s2 of the light guide 17. Reflection at the point p3 brings conversion from the optical axis a1 to the optical axis a21 in the Z direction. Shown is a point p4 through which the optical axis a21 passes in the emission surface s3. Shown is an optical axis a22 which passes through and is reflected at the point p4 in the emission surface s3. The optical axis a22 is incident on a point p5 of the liquid crystal display element 50 via the diffuser 18b. Shown is the optical axis a23 of the image light from the point p5 of the liquid crystal display element 50. The optical axes a22 and a23 each have an angle $\phi 3$ to the Z direction. The image light of the optical axis a23 is incident on a point p6 of the refraction element 43, and becomes the optical axis a24 due to the action of refraction. The optical axis a24 has a predetermined angle $\phi 3$ to the Z direction, and has a predetermined angle $\phi 2$ to the axes of the liquid crystal display element 50 and refraction element 43. The image light of the optical axis a24 is incident on and reflected at a point Q2 of the reflection mirror 42, and becomes the above-mentioned optical axis a3.

Additionally, when the above-mentioned external light is incident on the inside of the HUD apparatus 1, the optical axis b3 of the external light from the reflection mirror 41 is reflected at a point Q2 of the reflection mirror 42 and becomes an optical axis b4 (direction opposite to the optical axis a24). The external light of the optical axis b4 is incident on a point p6 of the refraction element 43. In Embodiment 2, a configuration in which the optical axis has the angle $\phi 2$ brings characteristics of causing return external light to hardly occur. Some external light beams reflected by the refraction element 43 among external light beams of the optical axis b4 travels in a direction different from that of the comparative example. A reflected external light beam corresponding to the outermost portion of an area corresponding to the display area 4 among external light beams of the optical axis b4 is indicated by a light beam b9. The light beam b9 deviates from the optical axis b4 by an angle corresponding to twice the angle $\phi 2$. The light beam b9 of the reflected external light hits against (strikes) the housing 80 etc., attenuates, and is difficult to return to the outside from the opening 81. Similarly, a reflected exterior light beam, which passes through the refraction element 43 and is incident on the liquid crystal display element 50, among external light beams of the optical axis b4 is indicated by a light beam b10. Similarly, the light beam b10 travels along an optical axis different from that of the image light, and is difficult to return to the outside from the opening 81 due to attenuation etc. No return external light component almost exists on the optical axis a5 of the sightline 6. Thus, it is prevented and reduced that the return exterior light is incident on the driver's eyes 5. This preferably makes it possible to visually recognize the virtual image 7 when the driver sees the virtual image 7 through the point Q3 in the display area 4 by the sightline 6.

As described above, Embodiment 2 can also prevent or reduce the return external light and suppress a degradation in quality of the virtual image 7 due to the external light while miniaturizing the apparatus and securing the preferable image light of the HUD. Incidentally, its configuration is not limited to the axes etc. of FIG. 30, and is possible as long as the incidence surface s1 or emission surface s3 has the free-form surface shape and the optical axis has the predetermined angle φ2. Another embodiment may have a configuration in which the optical axis a22 of the emitted light from the light guide 17 has the predetermined angle φ2 so as to be inclined left in the Y direction from the Z direction. By providing the free-from surface shape onto the incidence surface s1 or emission surface s3 of the light guide 17, such a design can be also performed that positions in a surface corresponding to the panel surface of the liquid crystal display element 50 or light distribution characteristics for each area are caused to differ. This makes it possible to realize characteristics of efficiently suppressing the return external light.

2-6: Light Source Module

Figure 31:
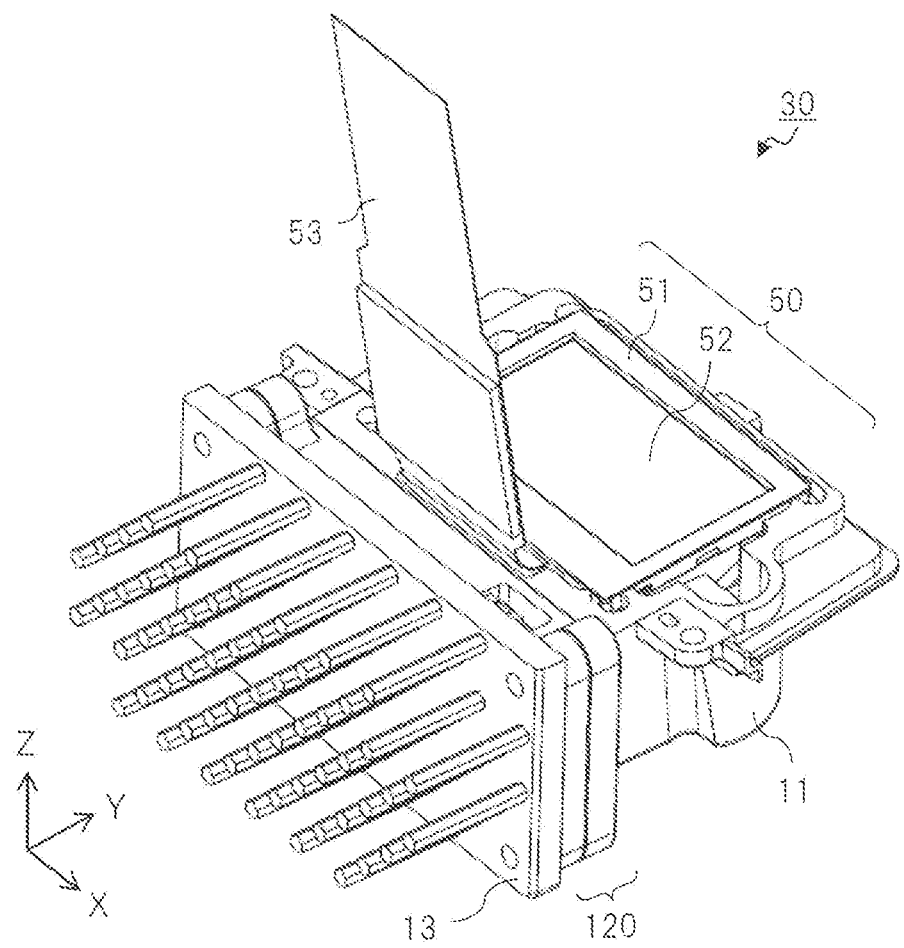
FIG. 31 is a perspective view showing an appearance of the image display apparatus.

FIG. 31 is a perspective view showing an appearance of a mounting configuration example as a light source module of the light source apparatus 10 according to Embodiment 2. In this mounting configuration example, the LED substrate 12 provided with the LED elements 14 etc. is mounted as an LED module 120. A heat sink 13 is fixed on a back side of the LED module 120 in the Y direction. The heat sink 13 is disposed in a state in which a plurality of radiation fins are exposed outside (go out) from the light-source-apparatus case 11. The above-described light-source-apparatus case 11 is fixed on a front side of the LED module 120 in the Y direction, and its inside accommodates the LED collimator 15, polarization conversion element 21, and light guide 17, etc. The liquid crystal display element 50 is attached to an upper surface of the light-source-apparatus case 11 in the Z direction. The liquid crystal display element 50 includes a liquid crystal display panel frame 51, a liquid crystal display panel 52, and an FPC 53. Thus, the image display apparatus 30 is configured as a module. Incidentally, a panel surface of the liquid crystal display element 50 and the display area 4 of the HUD apparatus 1 constitute a laterally elongated screen that is relatively long in the X direction and short in the Z direction in this example. Therefore, the light source apparatus 10 has a mounting structure corresponding to its shape.

In the light source apparatus 10, each of components such as the LED substrate 12 and LED collimator 15 is positioned at and mutually fixed to a position such as an outer circumference by a means such as a screw, positioning pin, or concavo-convex shape, thereby being configured as a module. The LED substrate 12 and the LED collimator 15 are fixed by, for example, fitting a positioning pin and a positioning hole and sandwiching them between their front and back parts. The respective components of the above light source apparatus 10 and image display apparatus 30 are fixed to the housing 80 of the HUD apparatus 1.

2-7: Light Source Module—Housing Interior

FIG. 32 shows an internal configuration of the light source apparatus case 11 of the above light source apparatus 10. FIG. 32 omits the LED substrate 12 therein and has a plurality (six in the present example) of LED elements 14 (14a, 14b, 14c, 14d, 14e, 14f) in the X direction, and they are spaced a predetermined pitch apart. The LED collimator 15 having a corresponding plurality (six) of collimator elements 15A is arranged at back stages of the plural LED elements 14 in the Y direction. Individual collimator portions having the above-mentioned concave portion 153 and outer peripheral surface 156 are referred to as collimator elements 15A. The LED element 14 is arranged in a central portion of a top surface of each collimator element 15A. The plural collimator elements 15A are integrally formed with a common substrate portion by, for example, a translucent resin. A polarization conversion element 21 is arranged at the back stage of the LED collimator 15.

The polarization conversion element 21 has a plate shape that is relatively long in the X direction and short in the Z direction as a whole. In the polarization conversion element 21, parts such as a PBS film 211 and a translucent member 214 as described above extend in the X direction, and the plural parts are arranged symmetrically in the Z direction. The polarization conversion element 21 may be accommodated inside a not-shown polarization-conversion-element holder. An orientation control plate 16b is disposed at a back stage of a phase plate of the polarization conversion element 21. An incidence portion 171 of the light guide 17 is disposed at a back stage of the orientation control plate 16b. Attachment portions to the housing 80 are provided to a side portion 174 and a top portion 175 of the light guide 171 in the X direction. As shown in the figure, the emission surface s3 of the emission portion 173, which is an upper surface of the light guide 171, has a free-form surface shape. A diffuser 18b is disposed above the emission portion 173 in the Z direction. Incidentally, also adopted can be a configuration of not providing the light distribution control plate 16b and diffuser 18b. The present embodiment does not provide the optical composite block 16, thereby making it possible to reduce a Y-directional size of the apparatus.

2-8: Light Source Unit, LED Collimator, Polarization Conversion Element

FIG. 33 shows schematic enlargement of: structures of the LED substrate 12 and LED element 14 of the light source unit 301, the LED collimator 15, and the polarization conversion element 21; a light beam(s); and the like, and is a Y-Z sectional view viewed from an apparatus side direction (X direction). A concave portion 153 of the LED collimator 15 is disposed at a position opposed to a light emitting surface including the point p1 of the LED element 14 that protrudes in the Y direction from a main surface (surface of a substrate on which the LED element 14 is mounted) of the LED substrate 12. A top surface of the concave portion 153 is disposed so as to be tangent to the light emitting surface of the LED element 14. As described above, the collimator element 15A includes: a concave portion 153 which is a lens portion on an incidence side; an outer peripheral surface 156 which is a reflector portion; and an emission surface 154 which is a lens portion on an emission side. The concave portion 153 has an incidence surface 157 on a bottom surface side in the Y direction, and has a convex curved surface on the incidence side. A convex portion 155 that is convex on the emission side is formed on the emission surface 154 and at a portion opposing the incidence surface 157 of the concave portion 153. The incidence surface 157 and convex portion 155 constitute a convex lens function having a light condensing operation.

The emitted light from the point p1 of the LED element 14 passes through air lying in the concave portion 153 of the collimator element 15A, travels like an example of light beams as shown in the drawing, and is emitted outside the concave portion 153. Light beams emitted from the concave portion 153 are condensed while some light beams of them are reflected by the outer peripheral surface 156 (reflector portion) having a substantially conical shape. Light beams traveling in a peripheral direction of the optical axis a1 are totally reflected by a parabolic surface of the outer peripheral surface 156. Those light beams pass through the emission surface 154, and are emitted as parallel light in the Y direction. An incidence surface of the polarization conversion element 21 is disposed so as to be tangent to the emission surface 154.

Parallel light beams from the plural (six) LED elements 14 and the collimator element 15A in the X direction are incident on the polarization conversion element 21. A cross-section about the optical axis a1 of each LED element 14 is the same as that as shown in FIG. 33. Similarly to the above, the polarization conversion element 21 is composed of a parallelepiped translucent member 214, a triangular prismatic translucent member 215, a PBS film 211, a reflective film 212, and a half wave plate 213, etc. The translucent member 214 has a parallelogram in the Y-Z cross-section, and the translucent member 215 has a triangular shape in the Y-Z cross-section. The respective components are arranged vertically symmetrically to the optical axis a1 in the Y direction. The PBS film 211 is provided at an interface between the translucent member 215 disposed on the optical axis a1 and the translucent member 214 disposed above and below the translucent member 215. The reflective film 212 is provided at an interface between the translucent member 214 and the translucent member 215 further disposed on (at) its outside. The half wave plate 213 is provided in a surface of the translucent member 214 on a Y-directional emission side.

Some light beams (P polarized wave), which have passed through the translucent member 214 and transmitted the PBS film 211, among light beams incident on the polarization conversion element 21 pass through the translucent member 215 and are emitted from the emission surface. Some light beams (S polarization wave), which have passed through the translucent member 214 and reflected by the PBS film 211 in the Z direction, among light beams incident on the polarization conversion element 21 are reflected by the reflection film 212 in the Y direction. Its reflected light beams pass through the half wave plate 213 from the emission surface of the translucent member 214, and are emitted as light beams (P polarization wave) whose phases are adjusted. Namely, in the polarization conversion element 21, all of the light beams from the plural LED elements 14 are emitted as P polarization waves. Therefore, since an optical path length difference is small, surface uniformity of a luminance distribution is high.

As described above, the polarization conversion element 21 in Embodiment 2 is disposed in such a state as to rotate 90 degrees in the X-Z plane with respect to arrangement of the polarization conversion element 21 of Embodiment 1 (a state where longitudinal and lateral directions are transposed). Consequently, Embodiment 2 becomes higher in a tolerance and a degree of freedom of arrangement positions of the plural LED elements 14 and collimator elements 15A to the polarization conversion element 21 than those of Embodiment 1 (described later). Therefore, the light source apparatus 10 can be easily designed and mounted in various ways based on specifications etc. of the HUD apparatus 1, thereby improving a yield of manufacture.

The incidence surface of the polarization conversion element 21 has a limit width 21w of an incident light flux corresponding to the translucent member 214 etc. The collimator element 15A is designed so as to match to the limit width 21w of the incident light flux of the polarization conversion element 21 similarly to Embodiment 1. Diameters (distance D2 in FIG. 36 described later) of the outer peripheral surface 156 and emission surface 154 of the collimator element 15A are made larger than that of the limit width 21w. The convex portion 155 is provided further inside the limit width 21w.

In the light source apparatus 10 according to Embodiment 2, the image display apparatus 30 using the liquid crystal display element 50, and the HUD apparatus 1, the number of LED elements 14 etc. to be arranged per unit area is increased as much as possible in order to realize the LED light source having a predetermined high output(s) with high efficiency, which realize large light quantities and brightness, high light utilization efficiency, and uniformity of light intensities in the plane. Alternatively, even if the number of LED elements 14 is the same as that of the conventional technique, miniaturization about an area, and a size, etc. required for the apparatus is realized.

2-9: Polarization Conversion Element

FIG. 34(a) is a perspective view showing a configuration such as component arrangement of a set of polarization conversion element units of the polarization conversion element 21. Schematic positions of the plural LED elements 14 and plural collimator elements 15A arranged correspondingly to the polarization conversion element 21 are also indicated by broken lines. The number of LED elements 14 etc. arranged in the X direction is assumed as N. Here, a case of N=3 is shown. In the X-Z plane on a front side of the polarization conversion element 21 in the Y direction, each of a plurality of points q indicates a point through which the optical axis a1 passes from the point p1 of each LED element 14. A circle around the point q corresponds to an end of the outer peripheral surface 156. Shown by a broken line is a substantially conical outer peripheral surface 156.

The PBS film 211, reflective film 212, half wave plate 213, and translucent members 214, 215, which are components constituting the polarization conversion element 21, extend in the X direction. These respective components are arranged in parallel to a plane (X-Z plane) orthogonal to the optical axis a1. Each of these components is disposed at a position and a shape that are vertically symmetrical in the Z direction with respect to an imaginary plane, the imaginary plane being an X-Y plane formed by the Y and X directions, the Y direction corresponding to the optical axis a1 and a central axis of the collimator element 15 A. The translucent member 215 disposed at a position on the optical axis a1 in the Z direction has a triangular prismatic shape. Two translucent members 214 arranged vertically symmetrically to the translucent member 215 have quadrangular prismatic shapes. Further, two translucent members 215b further disposed outside them each have a triangular prismatic shape whose cross-section is a right triangle. The PBS film 211 and reflection film 212 are arranged as inclines each having a predetermined positive/negative angle ε to the optical axis a1 in the Y direction. Incidentally, as shown in FIG. 25(b), the polarization conversion element 21 may have a configuration in which an upper component 21u and a lower component 21d are bonded together on bonding surfaces 216. Further, it is desirable that the bonding surfaces 216 are optically transparent after the bonding. In this configuration, each of the upper component 21u and lower component 21d can be formed by the same parts. Namely, if the upper component is rotated 180° around the illustrated Z axis and further rotated 180° around the Y axis, its arrangement becomes an arrangement of the lower component. Commonality of the parts due to this configuration and simplification of the configuration can be achieved, thereby being capable of lower costs.

2-10: Plural LED Elements, Collimators, Polarization Conversion Elements

FIG. 35 shows an X-Z plane viewed from the Y direction, which relates to configuration examples of arranging a plurality (N) of LED elements 14 and a plurality of collimator elements 15A in the X direction with respect to the polarization conversion element 21. Further, FIG. 35 particularly shows, as a modification example, a configuration example of a case of arranging two sets of polarization conversion elements 21 in the Z direction. In FIG. 35(a), a first polarization conversion element unit 21-1 is disposed upward in the Z direction, and a second polarization conversion element unit 21-2 is disposed downward. A structure of each polarization conversion element unit is the same as shown in FIG. 34.

In the X direction, points q corresponding to the plural LED elements 14 and plural collimator elements 15A are spaced a predetermined pitch distance D1 apart. In FIG. 35(a), positions of the respective points p in the upper and lower polarization conversion element units are the same. In the X-Z plane, the point q corresponding to the light-emitting axis of the plural LED elements 14 is arranged in a rectangular shape. Further, a diameter of a circular area corresponding to an outer peripheral surface 156 of the collimator element 15A is denoted by a distance D2. In this example, the plural collimator elements 15A in the X direction are arranged as closely as possible while securing the individual distances D2. Each of them is arranged so that a surface of the LED element 14 falls within a top surface of each concave portion 153.

FIG. 35(b) shows a case where positions of the points q of the plural LED elements 14 etc. are shifted in the upper and lower polarization conversion element units 21-1, 21-2 in the Z direction. Positions of the LED elements 14 etc. in the lower polarization conversion element unit 21-2 are shifted by a distance of half a pitch (distance D2) with respect to the upper polarization conversion element unit 21-1. The points q corresponding to the light-emitting axes of the plural LED elements 14 etc. are arranged in a triangle shape in the X-Z plane. Similarly, if necessary, such a form is possible as to arrange, in the Z direction, a plurality of sets of polarization conversion element units without being limited to two rows.

As described above, Embodiment 2 has low restriction to an arrangement configuration of the polarization conversion element 21 in the X direction when the plural LED elements 14 etc. are arranged, thereby making a degree of freedom of arrangement high. For example, as shown in FIG. 4, in the polarization conversion element 21 in Embodiment 1 described above, a plurality of parts extend in the Z direction and are arranged in the X direction. Therefore, the polarization conversion element 21 is divided into and configured by a plurality of (two) sets of polarization conversion element units, and has a position of the optical axis 15c in the X direction and a limit width 21w correspondingly to each of the sets. The LED element 14 and collimator unit require to be arranged at predetermined positions correspondingly to such a configuration of the polarization conversion element 21. Due to this arrangement, for example, even if a large number of LED elements 14 etc. are intended to be arranged within a predetermined size in the X direction, they can be arranged only at a predetermined distance or more for limitation.

Meanwhile, as shown in FIGS. 34 and 35, Embodiment 2 has lower restriction than Embodiment 1 in restriction relative to arrangement of a part such as the LED element 14 in the X direction, and so has the high degree of freedom of the arrangement. The polarization conversion element 21 is not divided into a plurality of parts (sets) in the X direction, and the components extend continuously. Therefore, the LED elements 14 etc. in the X direction can be arranged in a certain degree of freedom. For example, as shown in FIG. 35(a), the plural (N) LED elements 14 etc. in the X direction can be arranged so as to be closed up with as short a pitch (distance D1) as possible. Arranging a large number of LED elements 14 etc. within a predetermined size in the X direction makes it possible to increase light quantities of the light source and contribute to miniaturization of the apparatus.

2-11: Plural LED Elements (N=5)

Figure 36:
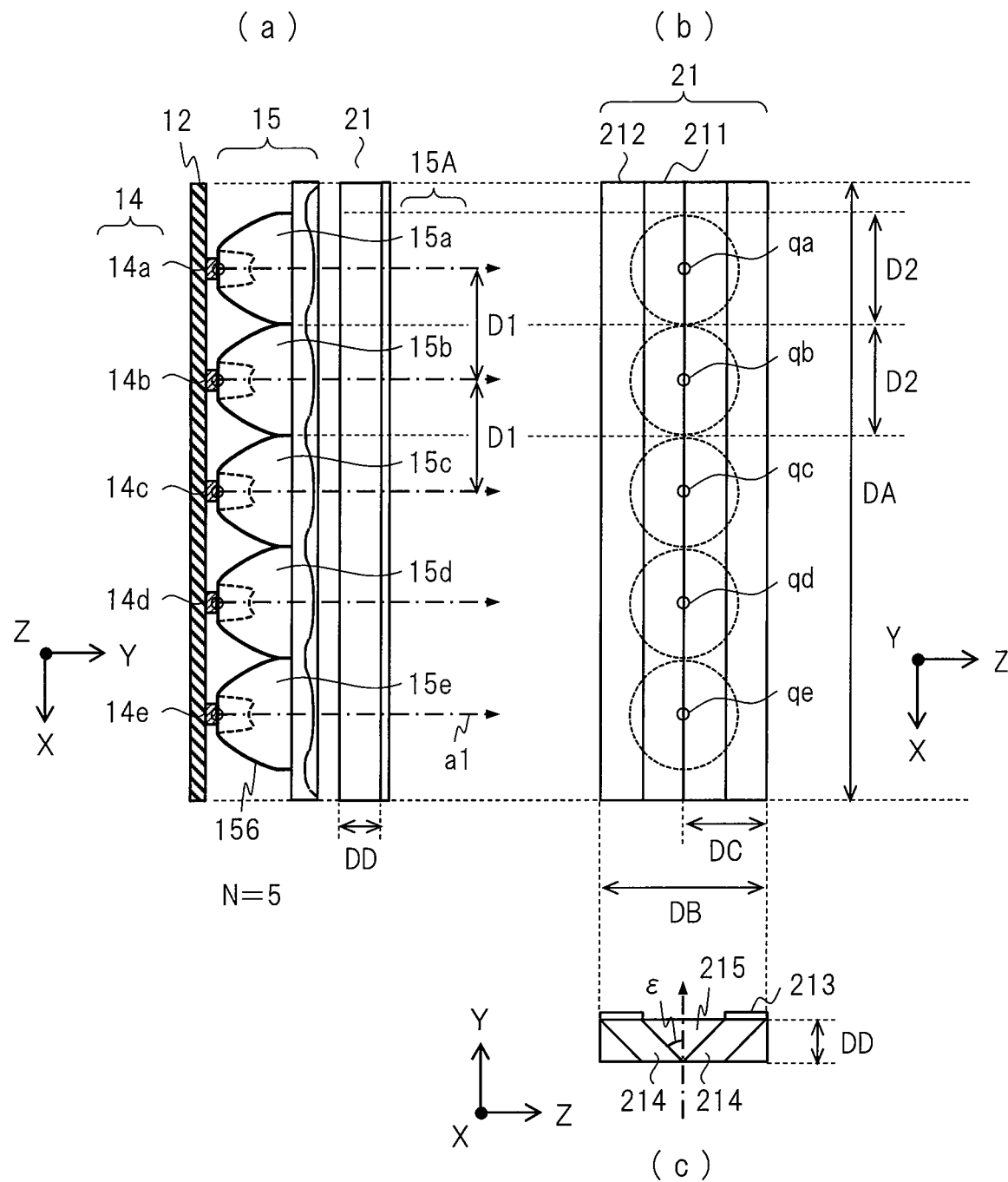
FIG. 36 is a view showing arrangement and configuration examples of a plurality of LED elements etc. of the light source apparatus.

FIG. 36 is an explanatory diagram relating to arrangement configurations etc. of the plural LED elements 14, plural collimator elements 15A, and polarization conversion element 21 in Embodiment 2. The present embodiment shows a case where N=5 as the number of the LED elements 14 etc. arranged in the X direction. FIG. 35(a) shows a configuration in an X-Y plane, FIG. 35(b) shows a configuration of the corresponding polarization conversion element 21 in a X-Z plane, and FIG. 35(c) shows a configuration of the corresponding polarization conversion element 21 in a Y-Z plane. This example has collimator elements 15a to 15e as the collimator element 15A correspondingly to the LED elements 14 (14a to 14e).

Each width of the LED collimator 15 and polarization conversion element 21 in the X direction is denoted by a distance DA. A height of the polarization conversion element 21 in the Z direction is denoted by a distance DB. A width of a vertically symmetric portion to the optical axis a1, which is a half of the distance DB, is denoted by a distance DC. A thickness of the polarization conversion element 21 (excluding a half wave plate 213) in the Y direction is denoted by a distance DD.

In the present embodiment, the distance DB of the polarization conversion element 21 is, e.g., 17.6±0.2 mm, the distance DC is 8.8±0.1 mm, and the distance DD is 4.4±0.1 mm. An angle ε of each incline of the PBS film 211 and reflective film 212 is (45°±20') if it is assumed that the unit is degrees (°) and minutes ('). The half wave plate 213 has a shape that does not depart from its boundary; its length in the X direction is the same as those of the translucent member 214 etc.; and its width in the Z direction is the same as that of the emission surface of the translucent member 214. The distance DA of the polarization conversion element 21 is, e.g., 44±0.2 mm in a first type example in which its size is relatively small, and 74±0.2 mm in a second type example in which its size is relatively large.

2-12: Comparative Example

Figure 37:
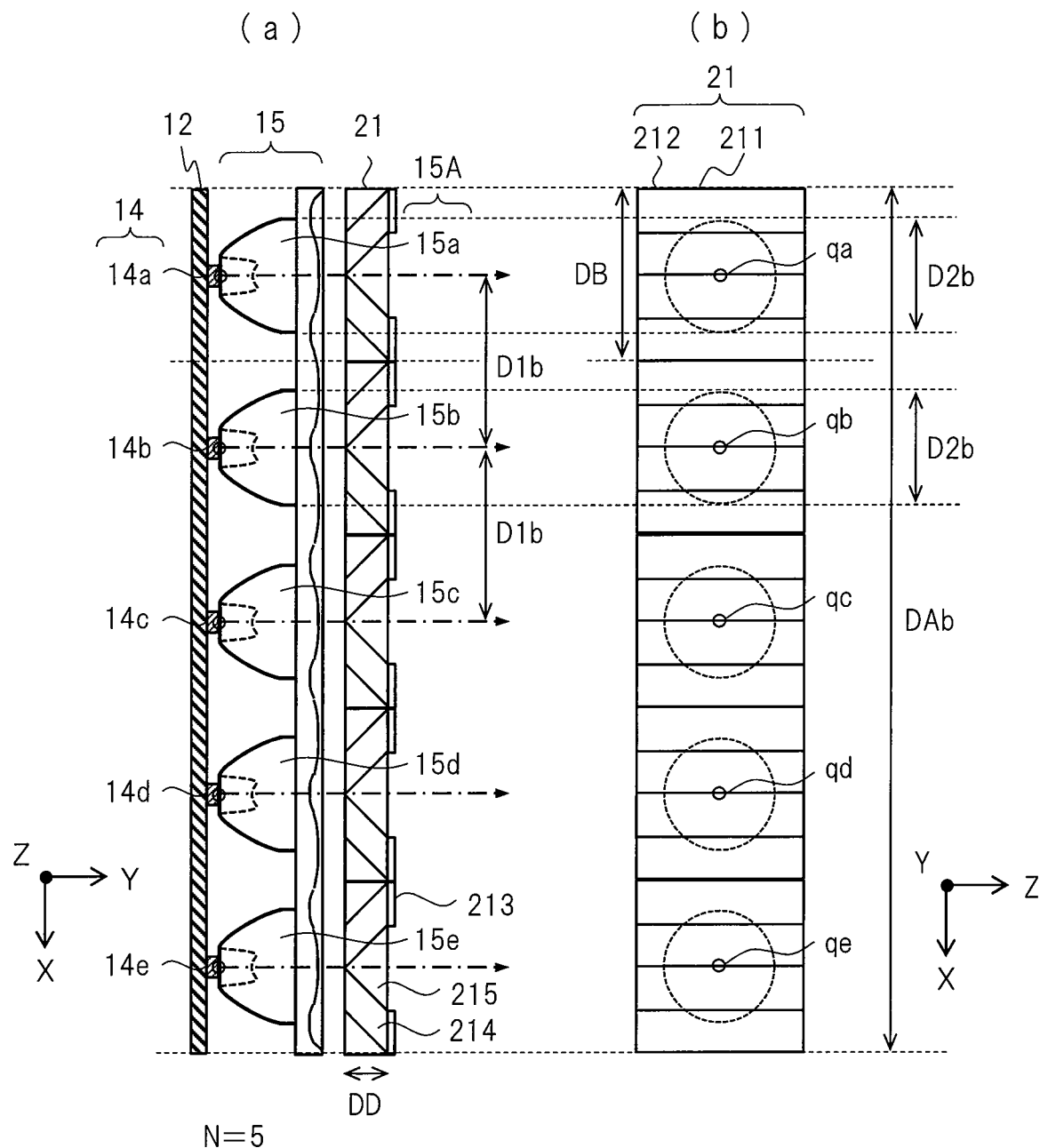
FIG. 37 is a view showing a configuration of a comparative example with respect to the arrangement and configuration examples of the plural LED elements etc. of the light source apparatus.

FIG. 37 shows a configuration of a comparative example corresponding to the configuration in which N=5 in FIG. 36. In this comparative example, the LED elements 14 and collimator elements 15A, each of which satisfies N=5, are arranged in the same X direction. In this comparative example, the polarization conversion element 21 is configured by using five sets of polarization conversion element units in the X direction. A distance DB of a width of one set of polarization conversion element units is the same as that of FIG. 36. Due to limitation corresponding to the configuration of the polarization conversion element 21, this comparative example makes a pitch (distance D1b) of the arrangements of the LED element 14 and collimator element 15A larger than the pitch (distance D1) of FIG. 36, and makes a size (distance DAb) of the entire apparatus in the X direction larger than the size (distance DA) in FIG. 36.

As described above, Embodiment 2 can realize further miniaturization etc. of the apparatus as compared with the comparative example. Alternatively, when adopting the same predetermined size (distance DAb) as that of the comparative example, Embodiment 2 can arrange a larger number of LED elements 14 etc. within its range and increase light quantities. The light source apparatus 10 of Embodiment 2 can increase the number (N) of LED elements 14 capable of being arranged within a predetermined width in the X direction, thereby making it possible to generate brighter illumination light. Alternatively, it can make the X-directional width smaller (narrower) in the light source unit 301 etc. in which the predetermined number of LED elements 14 is provided.

According to Embodiment 2, the plural LED elements 14 etc. in the X direction with respect to the polarization conversion element 21 can be arranged relatively freely within a predetermined condition. The arrangement makes it possible to facilitate, as a mounting structure of the light source apparatus 10, a mounting structure for varying (changing) the number of arrangements of the LED elements 14 etc., their positions, and the like in accordance with specifications etc. of the HUD apparatus 1 (e.g., a size etc. of the display area 4). Various mounting structures can make the configuration of the polarization conversion element 21 common and make its parts common usage, thereby being capable of being manufactured at low cost.

2-13: Mounting Example of Plural (N=5) LED Elements

FIG. 38 shows, as a mounting example including arrangements of the plural LED elements 14 etc. in the light source apparatus 10 of Embodiment 2, a case where N=5 corresponding to FIG. 36. FIG. 38(a) shows a top view in the X-Y plane, and FIG. 38(b) shows a side view in the corresponding Y-Z plane. A rough width of the LED substrate 12, LED collimator 15, polarization conversion element 21, polarization control plate 16b, and light guide 17, etc. in the X direction is denoted by a distance DA1. Within the width of the distance DA1, five LED elements 14 and corresponding five collimator elements 15A (15a to 15e) in the X direction are spaced a predetermined pitch distance D11 apart. For example, when the light source apparatus 10 adopts a mounting structure for having priority to a small size, low cost, and low power consumption, etc., the LED elements 15 etc. satisfying N=5 are arranged within the predetermined distance DA1 similarly to the mounting example of FIG. 38.

2-14: Mounting Example of Plural LED Elements (N=6)

FIG. 39 shows, as a light source apparatus 10 of a modification example, a case where N=6 as a mounting example including arrangements of the plural LED elements 14 etc. similarly to the case of FIG. 38. Rough sizes of the LED substrate 12 etc. in the X direction are denoted by a distance DA2. Within a width of the distance DA2, six LED elements 14 (14a to 14f) and corresponding six collimator elements 15A (15a to 15f) in the X direction are spaced a predetermined pitch (distance D12) apart. For example, in a case of a mounting structure of being intended to increase the number of LEDs in the X direction as much as possible and to increase light quantities of the light source, as shown in FIG. 39, the LED elements 14 etc. satisfying N=6 within the predetermined distance DA2 are spaced apart as short a predetermined pitch D12 as possible.

As described above, Embodiment 2 can easily realize any of the examples of FIGS. 38 and 39 since the degree of freedom of the arrangements of the plural LED elements 14 etc. in the X direction is higher than that of the configuration of the polarization conversion element 21. Namely, the mounting structure of varying the number (N) of LED elements 14 in accordance with specifications etc. of the HUD apparatus 1 can be relatively easily realized. For example, it is easy to decrease the number (N) of LEDs from the configuration of FIG. 39 to change the configuration from FIG. 39 to FIG. 38.

2-15: Light Guide

Figure 40:
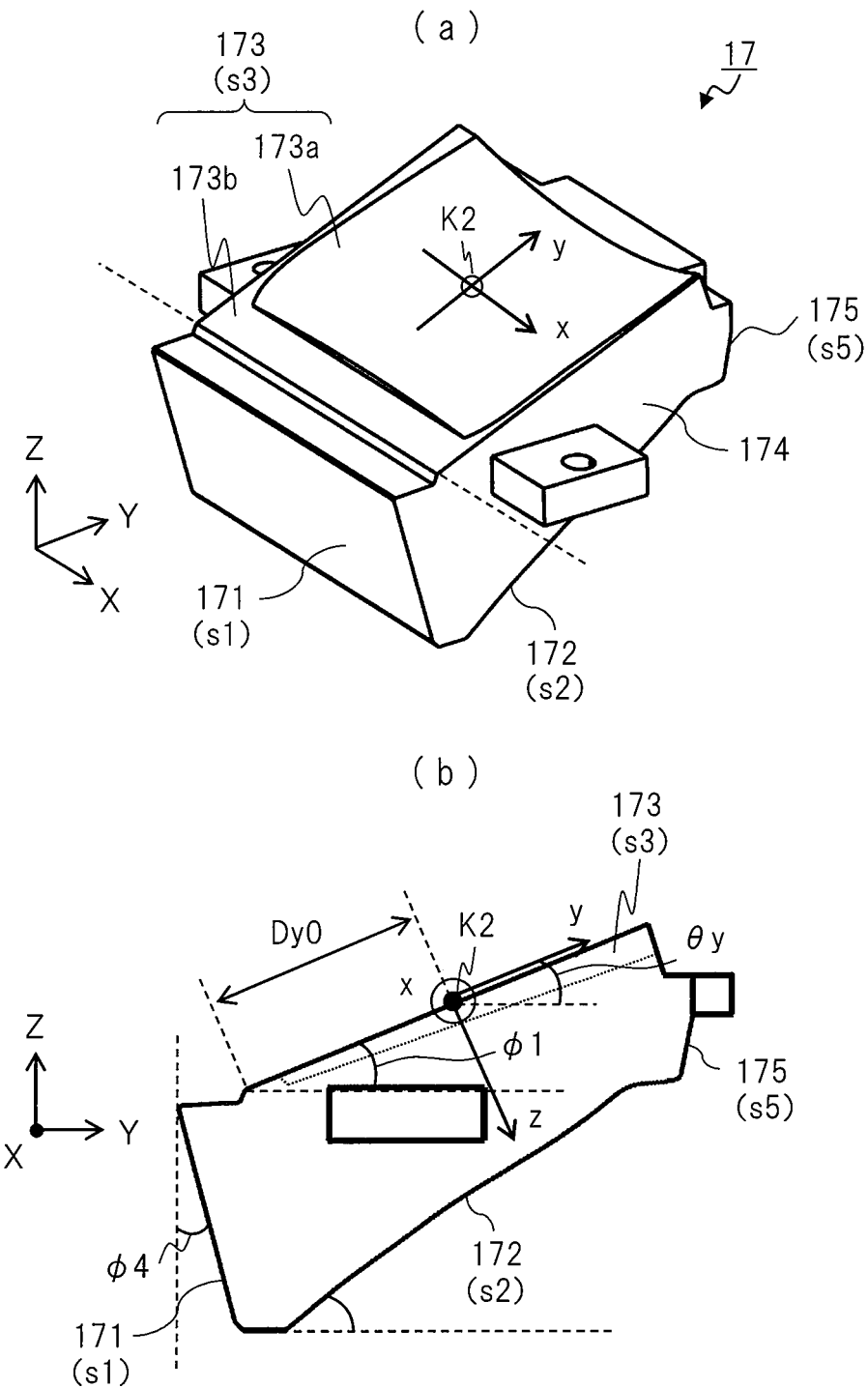
FIG. 40 is a perspective view and a side view showing an overall detailed configuration of a light guide of the light source apparatus.

FIG. 40 is a perspective view showing a free-form surface shape etc. of an emission surface s3 of an emission portion 173 of the light guide 17. FIG. 40(a) is a perspective view, and FIG. 40(b) shows a configuration of a side surface portion 174 viewed from a Y-Z plane. In FIG. 40(a), the emission surface s3 of the emission portion 173 has a free-form surface portion 173a inside its outer-circumferential planar portion 173b. In FIG. 40(b), an incidence surface s1 of an incidence portion 171 is an incline having a tilt angle φ4 to the Z direction that is vertical. A vertex surface s5 of a vertex portion 175 also has an attachment portion to the housing. The emission surface s3 is an incline having an angle φ1 to the horizontal plane. Its incline has the free-form surface portion 173a.

The emission surface s3 of the emission portion 173 of the light guide 17 has a shape corresponding to a panel surface of the liquid crystal display element 50 to be disposed later. The emission surface s3 and incidence surface s1 are different in shape and area. An area of the emission surface s3 is larger than that of the incidence surface s1. In the incidence portion 171, a light distribution angle in one direction (e.g., Z direction) may be wider than that in another direction (e.g., X direction) orthogonal to the one direction. In the emission portion 173, a light distribution angle in one direction (e.g., Y direction) may be wider than that in another direction (e.g., X direction) orthogonal to the one direction. The incidence surface s1 and emission surface s3 may be different in curvature in a plane. For example, the curvature may be larger at a peripheral portion than at a central portion in the plane.

FIG. 41 shows a structure of a reflection portion 172 etc. of the light guide 17. FIG. 41(a) shows its configuration in a Y-Z plane, and FIG. 41(b) shows partial enlargement of a reflection surface s2. In FIG. 41(a), a distance between the emission surface s3 and reflection surface s2 is denoted by a between-plane distance Dt. The between-plane distance Dt has the maximum distance Dtmax near the incidence surface s1, and the minimum distance Dtmin near the vertex surface s5 (Dtmax> Dtmin). A height of the vertex surface s5 corresponding to the distance Dtmin is lower than that of the incidence surface s1 corresponding to the distance Dtmax. The present example is set as Dtmax/Dtmin≈2.

The reflection surface s2 is basically arranged as an incline having a predetermined angle to the horizontal plane. Specifically, similarly to Embodiment 1, the reflection surface s2 has a serrate shape (stepped shape) in which a reflection surface 172a and a connection surface 172b are alternately repeated. FIG. 41(b) shows portions of the reflection surface 172a and connection surface 172b that have about n=1 to 9 near the incidence surface s1. FIG. 41(c) shows portions of the reflection surface 172a and connection surface 172b that have about n=64 to 75 near the vertex surface s5. Incidentally, similarly to the above, a pitch between the plural reflection surfaces 172a in the Y direction is denoted by P1 etc.; an angle of the reflection surface 172a to the horizontal plane is denoted by an angle αn; and an angle of the connection surface 172b to the reflection surface 172a is denoted by an angle βn.

Thus, a configuration of the light guide 17 including the incidence portion 171, reflection portion 172, emission portion 173, and vertex portion 175 brings realization of predetermined orientation control, and forms an axis a22 having a tilt angle ϕ2 to the Z direction about emitting light (corresponding to the configuration of FIG. 30).

Further, a shape of such a light guide 17 is advantageous in that fabrication is easy at a time of manufacture. When a large amount of the light guides 17 is produced at low cost, it is effective to manufacture them by using, for example, a manufacturing method such as injection molding. When the above manufacturing method is used to produce, as a comparative example, the light guide 17 whose cross-section is roughly triangular as shown in FIG. 8, there are problems of making secureness of accuracy of the injection molding relatively different at a side portion corresponding to an apex of a triangular acute angle. Specifically, a cooling rate of a molten resin in molds at the time of the injection molding has nonuniformity depending on (correspondingly to) a difference between respective portions (the incidence surface and the side portion opposite thereto) of the light guide 17, so that the molding with high precision is relatively difficult. Since the shape of the light guide 17 is designed to have predetermined orientation control characteristics, large deviation of the shape of the injection-molded light guide 17 from the design shape leads to deterioration in quality of the light-distribution-control characteristics.

Meanwhile, as shown in FIG. 41, Embodiment 2 has the light guide 17 whose cross-section is substantially trapezoidal and that includes a vertex portion 175. Embodiment 2 has a smaller difference in shape between the incidence portion 171 and vertex portion 175 than that of the comparative example. This small difference suppresses the nonuniformity depending on the difference between the respective portions (the incidence surface 171 and the vertex portion 175) regarding the cooling rate of the molten resin in the molds at the time of the injection molding when the light guide 17 is fabricated by the manufacturing method of the injection molding. Therefore, the light guide 17 can be realized by the molding with higher accuracy, and has advantages of improving the quality of the light distribution control characteristics and being capable of mass production at low cost. A machining example of the molds when the light guide 17 of Embodiment 2, particularly, its reflection portion 172 is fabricated is similar to that of FIG. 18 described above.

2-16: Orientation Control

Figure 42:
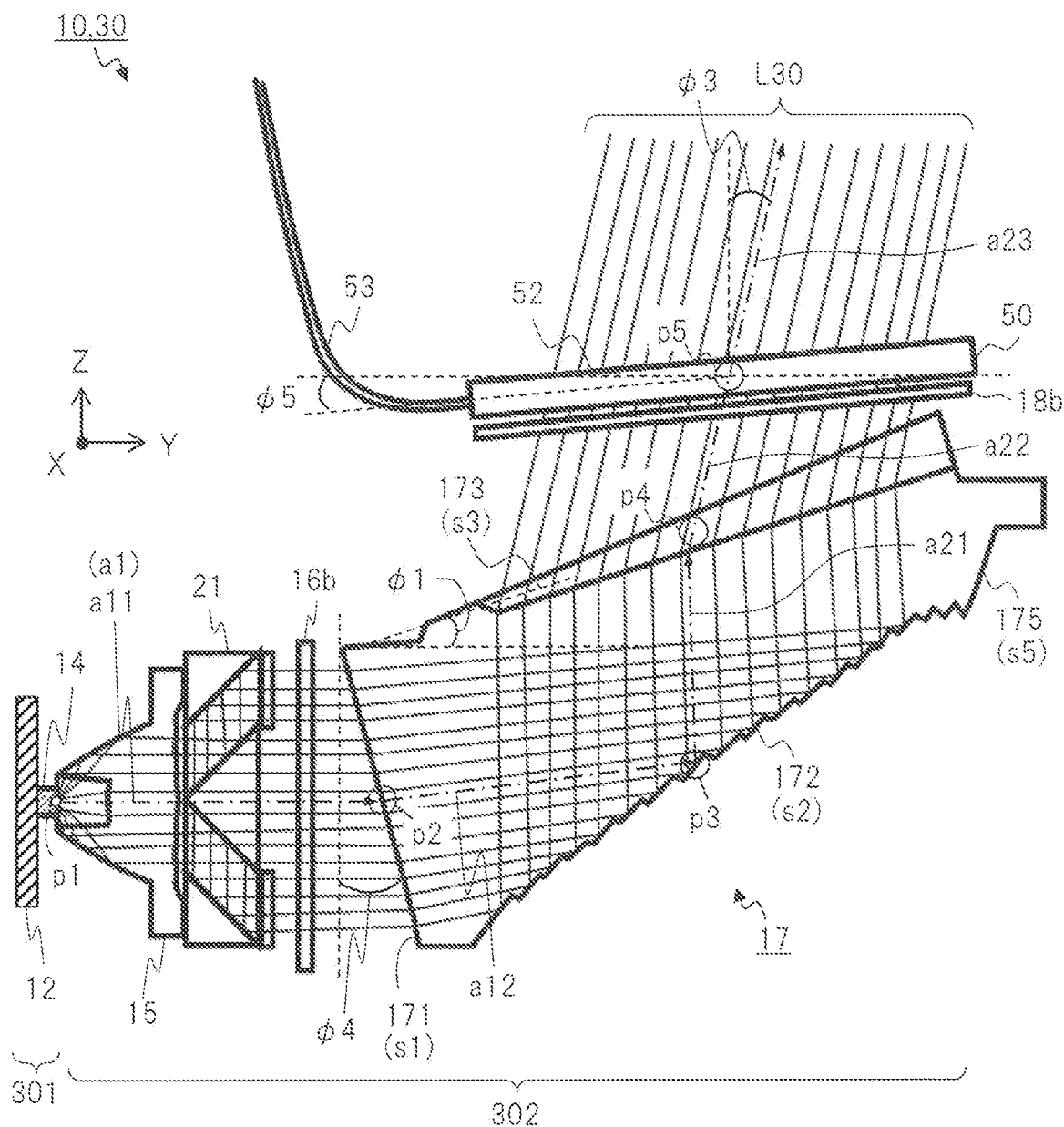
FIG. 42 is a sectional view showing a configuration of orientation control in the light source apparatus of Embodiment 2.

FIG. 42 shows a configuration of orientation control of the light source apparatus 10 and image display apparatus 30 according to Embodiment 2, and optical axes of illumination light of the light source apparatus 10 and image light of the image display apparatus 30 and respective light beams are shown in a Y-Z cross-section viewed from the X direction. Incidentally, the reflection surface 172a and connection surface 172b of the light guide 17 are schematically shown by enlarging their actual views. In this example, the incidence surface s1 of the light guide 17 is a plane obliquely arranged with an angle ϕ4 to the Z direction. The optical axis a11 in the Y direction from the point p1 of the LED element 14 is incident on the point p2 of the incidence surface s1 of the light guide 17, is subjected to predetermined refraction, and becomes the optical axis a12. The optical axis a12 is reflected by the point p3 of the reflection surface s2, and becomes the optical axis a21 in the Z direction. The emission surface s3 has a free-form surface shape obliquely arranged with an angle ϕ1 to the Y direction, and has predetermined refraction characteristics. The optical axis a21 in the Z direction from the reflection surface s3 passes and through the point p4 of the free-form surface of the emission surface s3, is refracted, and becomes the optical axis a22 having an angle ϕ3 to the Z direction. The illumination light of the optical axis a22 is incident on the point p5 on the panel surface of the liquid crystal display element 50. The image light generated by the liquid crystal display element 50 similarly becomes the optical axis a23 having the angle ϕ3. Light beams L30 of the image light of the optical axis a23 are incident on the above-mentioned refraction element 43.

Further, in this example, the diffuser 18a is disposed above the emission portion 173 of the light guide 17 in the Z direction and near a back surface of the liquid crystal display element 50. The diffuser 18a and liquid crystal display element 50 are roughly arranged on the horizontal plane. Specifically, the diffuser 18a and liquid crystal display element 50 are arranged on a plane having an angle ϕ5 to the horizontal plane.

The lighting optical system 302 needs the complicated light distribution control for the above-described preferable illumination light and for realizing prevention of return external light. This light distribution control is realized by orientation control of FIG. 42. The light distribution control along the Y-Z plane of FIG. 42 is represented by the optical axes a11, a12, a21, a22, and a23, etc. This orientation control is realized by a refraction angle of the incidence surface s1, a reflection angle of the reflection surface s2, and a refraction angle of the free-form surface shape of the emission surface s3, etc. of the light guide 17. Further, the light distribution control in the X direction is realized by the refraction angle etc. due to the free-form surface shape of the emission surface s3. Additionally, a light distribution control plate 16b controls light diffusion etc. in the Z direction. Furthermore, the diffuser 18b controls light diffusion etc. in the X and Y directions. Such orientation control characteristics of the light source apparatus 10 according to Embodiment 2 makes it possible to improve a degree of freedom corresponding to the orientation angle of the illumination light more than that of the conventional technique, and to improve favorable image-light characteristics required for the HUD apparatus 1. Mounting the light source apparatus 10 having the predetermined orientation control characteristics is easily performed in accordance with characteristics of the adjustment optical system 40 and liquid crystal display element 50 of the HUD apparatus 1. For example, the illumination-light characteristics can be adjusted based on design of the free-form-surface shape of the emission portion 173 of the light guide 17. Additionally, adjusted can be the characteristics of the light distribution control for the preferable image light and for prevention of the return external light.

2-17: Light Distribution Control Plate

FIG. 43 shows a sectional configuration of a light distribution control plate 16b in the light source apparatus 10 according to Embodiment 2. FIG. 43(a) shows an X-Y cross-section of the light distribution control plate 16b. The light distribution control plate 16b has a plane on its incidence side and a serrate-shaped surface on its emission side in the Y direction. FIG. 43(b) shows partial enlargement of an emission surface of the light distribution control plate 16b. On the emission surface, a plurality of triangular cross-sections are repeated in the Z direction, thereby being formed as a texture. Alternately repeated on a plurality of triangular inclines are a first incline having a positive angle γ to the X direction, and a second incline having a negative angle γ to the X direction. A pitch of arrangement of the triangles in the X direction is denoted by a distance D43. In the present example, the angle γ=30 degrees and the pitch distance D43=0.5 mm are set. The light from the polarization conversion element 21 is diffused in the X direction of the incidence portion 171 by the action of the textures on the emission surface. The light distribution control plate 16b may be, for example, a diffuser whose diffusion angle is an elliptical distribution.

The orientation control plate 16b has light diffuseness in the X direction. The diffuser 18b has light diffuseness in the Y direction. By the action of the orientation control plate 16b and the diffuser 18b, an intensity distribution in a plane of the emitting light from the light guide 17 is made uniform, and preferable planar illumination light can be obtained. Incidentally, in Embodiment 2 in comparison with Embodiment 1, the plural LED elements 14 etc. in the X direction can be arranged at positions close to each other, so that the uniformity in the X direction is further improved in cooperation with the diffuseness of the orientation control plate 16b. Incidentally, the uniformity in the Z direction can be realized by controlling the ratio of the reflection surface 172a and connection portion 172b formed in the reflection portion 172 of the light guide 17 as described in FIG. 10 of Embodiment 1. Consequently, it is possible to realize the required minimum diffuseness, improve the light utilization efficiency, and generate preferable planar illumination light.

2-18: Functional Scattering Surface

As a modification example of Embodiment 2, at least one of the orientation control plate 16b, diffuser 18b, and incidence surface s1 or emission surface s3 of the light guide 17 in the light source apparatus 10 may be provided with a predetermined functional scattering surface. In that case, characteristics of the functional scattering surface are almost the same as those in FIG. 16 described above.

2-19: Light Guide—Light Diffuseness

In Embodiment 2, characteristics of light diffusion in the Z direction may be provided on the incidence surface s1 of the incidence portion 171 of the light guide 17. In that case, the characteristics of the incidence surface s1 are the same as those in FIG. 17 described above.

2-20: Light Guide—Free Curved Surface Shape

Details of the free-form surface shape of the emission portion 173 of the light guide 17 in Embodiment 2 will be described with reference to FIGS. 40 and 44. Incidentally, a free-form surface is one of curved surfaces capable of being treated as a three-dimensional object such as CAD, and is a curved surface capable of being represented with higher-order equations by setting several intersections and curvatures in a space.

Firstly, in FIG. 40(a) mentioned above, an inside of the plane portion 173b, which is an outer frame, out of the emission surface s3 of the emission portion 173 has the free-form surface portion 173a. An example of how to set a reference coordinate system on this free-form surface is denoted by (x, y, z). This example has x and y axes that are orthogonal to and pass through a center point K2 (corresponding to the point p4) of the free-form surface. The x and y axes have correspondence relationships with the X and Y directions, respectively. A reference position of the emission portion 173 of the light guide 17 is denoted by a broken line. In this example, the reference position is set as a position of the beginning of an incline close to an incidence surface s1 side. In FIG. 40(b), a distance from the reference position of the emission portion 173 of the light guide 17 to the x axis (point K2) of the reference coordinate system on the free-form surface is denoted by a distance Dy0. In this example, Dy0=18 mm. A center of the y axis is set as a center of the light guide 17. Additionally, an angle formed by the horizontal plane and the y axis is defined as an angle θy, and θy=17° in the present example. The z axis of the reference coordinate system is perpendicular to the x and y axes from the point K2, and an inward direction of the emission surface s3 is defined as positive.

A range of the free-form surface is set at −21 mm≤x≤21 mm and −15 mm≤y≤16 mm. Generally, a width in the X direction is 42 mm, and a width in the Y direction is 31 mm. Additionally, the present example is forcibly set to 0 (zero) when a value of z (x, y) is negative. In other words, as shown in FIG. 40(b), the emission surface s3 is cut so as to become a plane on its outside and, as shown by a broken line, has a concave portion of a free-form surface inward from the plane. Incidentally, another embodiment may have a structure in which a convex portion of a free-form surface exists outward (in an emission direction) from the emission surface.

FIG. 44 shows an equation and its coefficients, the equation defining the free-form surface shape of the emission portion 173 of the light guide 17 in Embodiment 2. FIG. 44(a) shows Equation 1, which is a generally expressed free-form surface equation. As shown by Equation 1, the free-form surface is expressed by $z(x, y) = \Sigma\{a_i \cdot b_i(x, y)\}$. $\Sigma$ is an addition of subscript i=0 to 14. $a_i \cdot b_i$ denotes a coefficient and a variable. z(x, y) represents a z value corresponding to a value of a position coordinate of (x, y). The unit is mm.

FIG. 44(b) shows the coefficients and variables of Equation 1 in tabular form. For example, for i=0, b0=1 and a0≈1.0269. For i=1, b1=x, a1≈−0.0015. For i=2, b2=y and a2≈−0.0032. For i=3, b3=$x^2$ and a3≈−0.0052. For i=14, b14=$y^4$ and a14=5.3049E−06. E is an exponent and, for example, E-06 indicates 1/10 to the sixth power. The others are shown in a table. $Z(x, y) = a1 \cdot b1 (x, y) + a2 \cdot b2 (x, y) + \ldots + a14 \cdot b14 (x, y) \approx 1.0269 - 0.0015x - 0.0032y - 0.0052x^2 + \ldots + 5.3049/(10^6) x y^4$.

2-21: Effects Etc.

As described above, a main configuration of the light source apparatus 10 according to Embodiment 2 makes it possible to provide, similarly to Embodiment 1, the light source apparatus that is small and lightweight, has high light utilization efficiency, and is modularized to be easily utilizable as a planar light source. More specifically, the main configuration can further improve the light utilization efficiency from the LED light source, and the uniform illumination characteristics. Additionally, provided can be the light source apparatus suitable as a light source for lighting, the light source being manufacturable at low cost. Further, the image display apparatus 30, which generates preferable image light, and the light source apparatus 10, which generates preferable illumination light, can be provided correspondingly to the characteristics of the HUD apparatus 1 and the liquid crystal display apparatus 50. Furthermore, provided can be the HUD apparatus 1 that can prevent the return external light and has good display characteristics of the virtual images. The light distribution control in the light source apparatus 10 also makes it easy to perform such mounting as to enlarge an area of the image light with respect to the illumination light.

(1) In the light source apparatus 10 according to Embodiment 2, the light guide 17 has, on at least one of the incidence surface s1 or emission surface s3, the free-form surface shape for realizing the predetermined light distribution control. This leads to realization of the characteristics of the light distribution control for realizing the preferable illumination light and the return-external-light prevention function.

(2) In the light source apparatus 10, image display apparatus 30, and HUD apparatus 1, the axes (tilt of normal line) of the liquid crystal display element 50 and refraction element 43 are obliquely set with the predetermined angle. The light guide 14 has a trapezoidal cross-section, and its emission surface s3 is disposed as an incline with respect to the horizontal. This leads to realization of the characteristics of the light distribution control for realizing the preferable image light and the return-external-light prevention function.

(3) In the light source apparatus 10, the light guide 17 has a structure of the reflection portion 172 similarly to that in Embodiment 1, thereby realizing the preferable illumination light with high light utilization efficiency.

(4) The light source apparatus 10 has a configuration in which the LED element 14, LED collimator 15, and polarization conversion element 21, etc. are combined in addition to the configuration of the light guide 17, and the above configuration brings realization of the characteristics of the orientation control of the light source apparatus 10. For example, parts of the polarization conversion element 21 extend in the X direction, and the plural LED elements 14 etc. are arranged in the X direction correspondingly thereto. Consequently, the predetermined light distribution control of the light source apparatus 10 makes it possible to reduce a burden of light distribution control required for the liquid crystal display element 50 and adjustment optical system. 40 (the refraction element etc.), which brings easily taking measures against external-light flare.

2-22: First Modification Example

Figure 45:
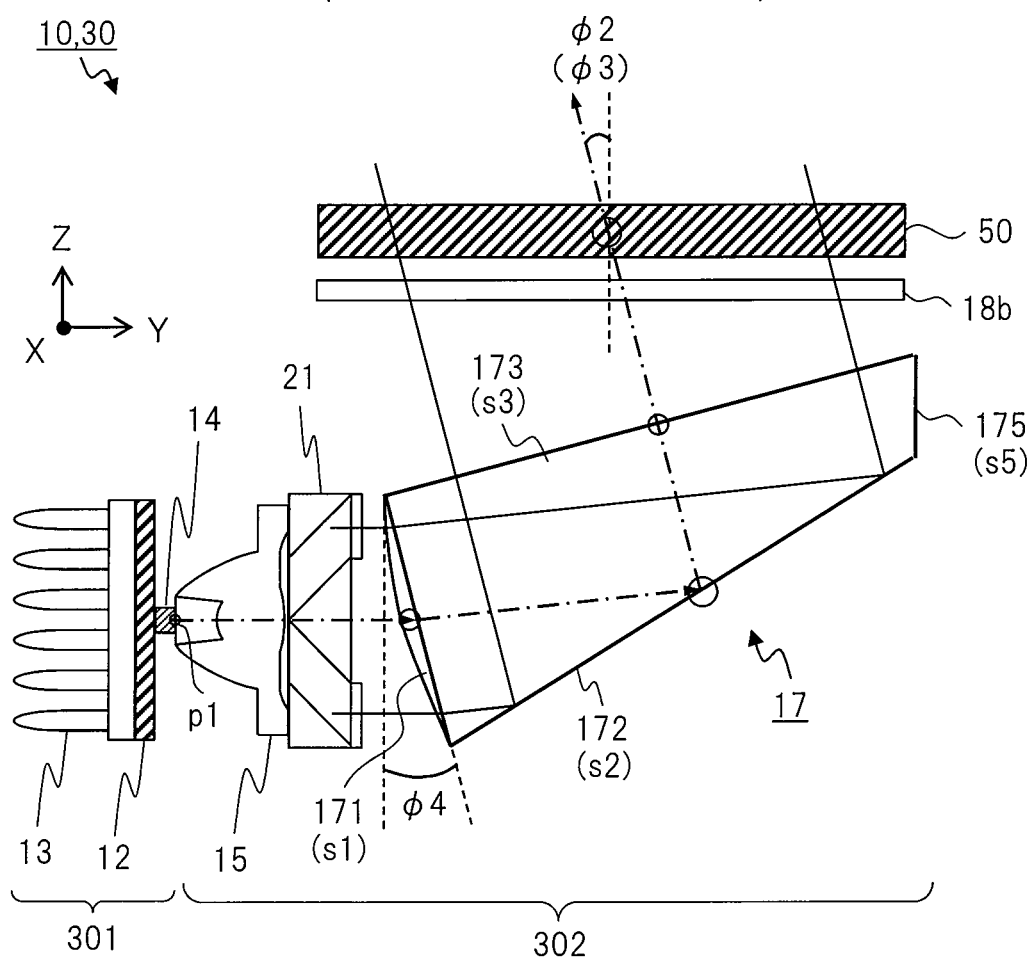
FIG. 45 is a sectional view showing a rough (schematic) configuration of a light guide etc. in a light source apparatus and an image display apparatus of a first modification example of Embodiment 2.

FIG. 45 shows a configuration of a light source apparatus 10 according to a first modification example of Embodiment 2 in a Y-Z plane. In this first modification example, the incidence surface s1 of the incidence portion 171 of the light guide 17 is formed into a free-form surface shape, and the emission surface s3 of the emission portion 173 thereof is formed into a planar shape. A structure including the free-form surface shape of the incidence surface s1 realizes predetermined light distribution control characteristics. The incidence surface s1 of the incidence portion 171 has, a reference plane, a tilt angle φ4 to the Z direction. The reference plane of its incidence surface s1 has a free-form surface shape. In a configuration example of FIG. 45, the optical axis from the reflection portion 172 and the optical axis from the emission surface s3 are inclined with an angle θ3 leftward in the Y direction with respect to the Z direction, and are inclined with an angle θ2 with respect to an axis of the liquid crystal display element 50.

2-23: Second Modification Example

Figure 46:
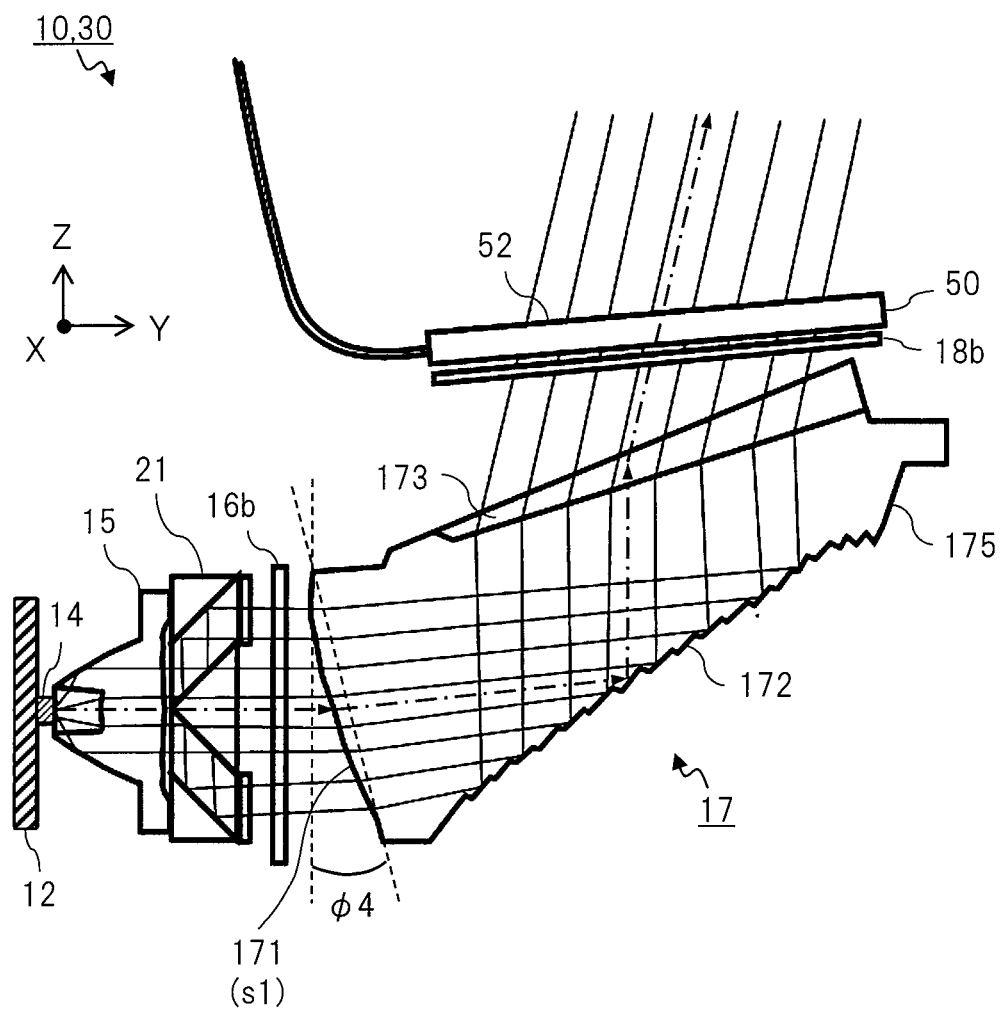
FIG. 46 is a sectional view showing a rough configuration of a light guide etc. in a light source apparatus and an image display apparatus of a second modification example of Embodiment 2.

FIG. 46 shows configurations of a light source apparatus 10 and an image display apparatus 30 according to a second modification example of Embodiment 2 in a Y-Z plane. This second modification example is structurally different from the above-mentioned example in that not only the emission portion 173 but also the incidence surface s1 of the incidence portion 171 of the light guide 17 has a free-form surface shape. Similarly, the incidence surface s1 of the incidence portion 171 has, as a reference plane, a tilt angle φ4 to the Z direction. An incidence side of the incidence surface s1 with respect to the reference plane has a free-form surface shape that is convex. This modification example is designed so as to have the predetermined light distribution control characteristics of the light guide 17 in cooperation with the characteristics of the free-form surface of the incidence surface s1 and the characteristics of the free-form surface of the emission surface s3. In this way, setting both the incidence portion 171 and the emission portion 173 to be the free-form surface shapes increases the degree of freedom of the light distribution control, and can realize more precise and more complicated light distribution control. This makes it possible to more precisely realize preferable image light and a characteristic such as prevention of return external light.

2-24: Third Modification Example

FIG. 47 is a perspective view of, as a light source apparatus and an image display apparatus 30 according to a third modification example of Embodiment 2, an example of a relatively large light source apparatus 10 for realizing a large-area light source. This third modification example has a linear optical axis in the Z direction corresponding to the vertical direction. Correspondingly thereto, the third modification example has a light guide 19 to be light-guided in the Z direction. The light guide is a light distribution control member that realizes predetermined light distribution control characteristics.

FIG. 47(a) shows arrangement of parts inside a case, and omits illustrations of the LED substrate 12 etc. therein. A plurality of LED elements 14, an LED collimator 15, a polarization conversion element 21, an orientation control plate 16b, a light guide 19, and a liquid crystal display element 50 are arranged in the Z direction in order from bottom to top. Each of these components is a roughly flat-plate shape in the X-Y plane, and its X-directional side is longer than its Y-directional side. The X-directional side corresponds to a laterally extending side of the display area 4 of the liquid crystal display element 50 and the HUD apparatus 1.

The polarization conversion element 21 is configured by using two sets of polarization conversion element units 21a, 21b arranged in the Y direction. It has a first polarization conversion element unit 21a shown left in the Y direction, and a second polarization conversion element portion 21*b* shown right, both units being arranged adjacently to each other. Each set of polarization conversion element units has the same structure, and components in each set extend in the X direction.

A plurality of LED elements 14 and collimator elements 15A are arranged in the X direction correspondingly to the configuration of the polarization conversion element 21. For example, the LED elements 14 (14-1, 14-2, . . . , 14-9) satisfying N=9 are spaced a predetermined pitch apart in the X direction with respect to the polarization conversion element portion 21*a* as one. Nine collimator elements 15A are arranged in the X direction correspondingly to these LED elements 14. Similarly, the LED elements 14 (14-10, 14-11, . . . , 14-18), which satisfies N=9, and the corresponding collimator elements 15A in the X direction are spaced a predetermined pitch apart with respect to the polarization conversion element portion 21*b* as the other. Namely, in the present example, total eighteen LED elements 14 and eighteen collimator elements 15A are arranged in the X-Y plane, their arrangements being composed of nine in one row in the X direction and in two rows in the Y direction. This brings a configuration of a planar light source having a relatively large area.

In the Z direction, the light guide 19 is disposed in a space between the light distribution control plate 16*b* and the liquid crystal display element 50. The light guide 19 has a saddle shape as schematically shown. A panel surface of the liquid crystal display element 50 is roughly arranged on the horizontal plane above the light guide 19.

FIG. 47(*b*) is a partially sectional view of FIG. 47(*a*), and shows a Y-Z cross-section of the LED element 14-5 lying at a position close to a center in the X direction. The light guide 19 has an incidence portion 191 (including an incidence surface) on a lower side in the Z direction, and an emission portion 192 (including an emission surface) on an upper side in the Z direction. The incidence and emission surfaces each have a free-form surface shape. Each of free-form surfaces of the incidence and emission surfaces has a convex curve upward (emission side) in the Z direction when viewed from its Y-Z cross-section. Each of free-form surfaces of the incidence and emission surfaces has a concave curve in the Z direction when viewed from its X-Z cross-section. Shown are optical axes a31, a32 passing through the polarization conversion element 21 and light guide 19. The optical axes a31, a32 are subjected to predetermined refraction and light diffusion, etc. due to the free-form surfaces. By such a free-form surface shape of the light guide 19, predetermined light distribution control characteristics are designed. Thus, the light source apparatus 10 of the third modification example brings realization of preferable image light and a characteristic such as prevention of return external light.

Figure 48:
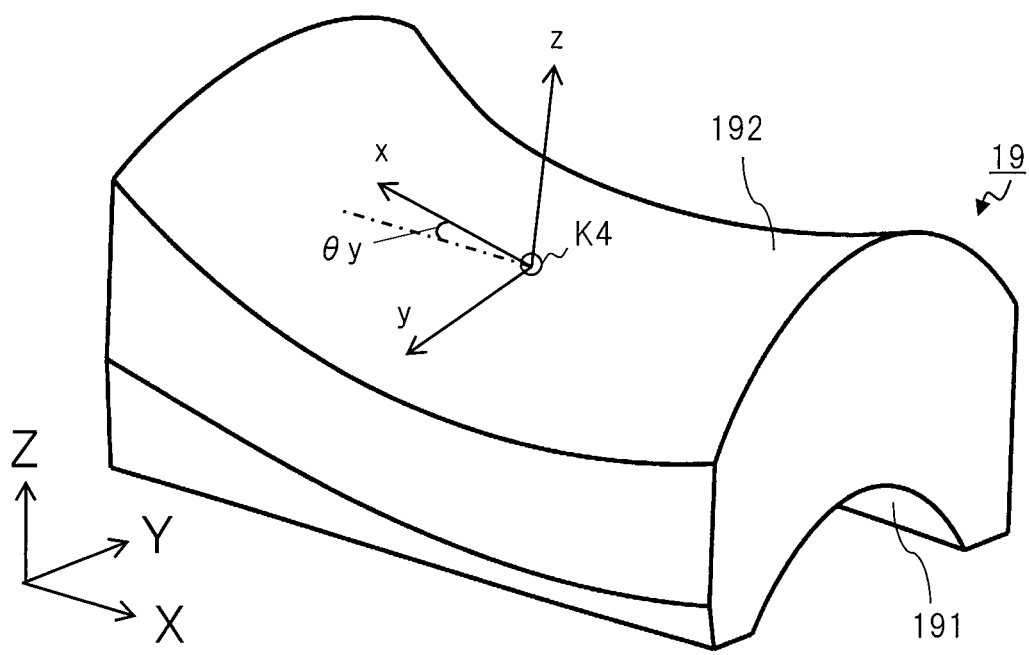
FIG. 48 is a perspective view showing the entire light guide in the third modification example.

With reference to FIGS. 48 and 49, the free-form surface shape of the light guide 19 of FIG. 47 will be described. FIG. 48 shows a perspective view of the light guide 19, and shows an example of how to obtain a reference coordinate system (x, y, z) of the free-form surface. Reference coordinates of the emission surface of the emission portion 192 are set as coordinates that are tilted at an angle θy (e.g., θy=1°) with respect to a direction of a horizontal plane indicated by a dash-single-dot line. The y axis uses, as a reference, coordinates of a position (point K4) offset a predetermined distance (e.g., −1.2 mm) from a center position of the light guide 19. The offsets from the reference coordinates of the incidence surface are assumed to be absent in the angle θy and y axis.

FIG. 49 shows a free-form-surface equation and its coefficients. FIG. 49(*a*) shows a free-form-surface equation similarly to the above; FIG. 49(*b*) shows an example of coefficients and variables of the emission surface of the emission section 192; and FIG. 49(*c*) shows an example of coefficients and variables of the incidence surface of the incidence portion 191. A range of the free-form surface of the light guide 19 is set to −40 mm≤x≤40 mm and −22 mm≤y≤2 mm. A width in the X direction is roughly 80 mm, and a width in the Y direction is roughly 24 mm. Additionally, when a value of z (x, y) becomes smaller than −8 mm on the incidence surface, the value is forcibly set to −8 mm. In other words, a portion which is greatly convex on the lower side in the Z direction (near both ends in the Y direction in the figure) is cut at a position of −8 mm to form a plane (flat surface).

2-25: Fourth Modification Example

FIG. 50 shows an example when a light source having a relatively small area and small size is realized as a light source apparatus 10 and an image display apparatus 30 according to a fourth modification example of Embodiment 2. FIG. 50(*a*) is a perspective view of, as a configuration inside a case of the light source apparatus 10, a state of attaching the liquid crystal display element 50. FIG. 50(*b*) shows a perspective view including a partial cross-section in a state of detaching the liquid crystal display element 50, and shows a light distribution etc. In this light source apparatus 10, the optical axis a1 of the LED element 14 is the Y direction. The LED substrate 12, plural LED elements 14, LED collimator 15, polarization conversion element 21, and light distribution control plate 16*b* are arranged in order in the Y direction. A light guide 19*b* is arranged behind the light distribution control plate 16*b*. In other words, the light guide 19*b* is a light distribution control plate, and has the predetermined light distribution control characteristics of guiding light roughly in the Y direction. The light guide 19*b* has an incidence portion 19*b*1 and an emission portion 19*b*2. Due to its characteristics, the light guide 19*b* has free-form surface shapes on both the incidence and emission surfaces. In the Y-Z cross-section of the light guide 19*b*, the incidence and emission surfaces are free-form surfaces including convex curves on an incidence side in the Y direction.

On the emission side of the light guide 19*b* in the Y direction, the reflection mirror 500 is further disposed with an angle that inclines obliquely to the horizontal plane. The optical axis in the Y direction is roughly converted into the optical axis in the Z direction through reflection by the reflection mirror 500. Above the reflection mirror 500 in the Z direction, the diffuser 18*b* and liquid crystal display element 50 are arranged on the X-Y plane.

The plural LED elements 14 are arranged so that the LED elements 14 (14*a* to 14*e*) satisfying N=5 in the X direction are spaced a predetermined pitch apart as closely as possible. Similarly, the LED collimator 15 is disposed so that the plural collimator elements 15A are arranged in the X direction. Those arrangements constitute the planar light source unit 301 having a relatively small area. The light in the Y direction from the LED element 14 passes through the light distribution control plate 16*b*, and then is incident on the incidence surface of the incidence portion 19*b*1 of the light guide 19*b*. The light incident on the incidence surface of the incidence portion 19*b*1 is guided while being refracted along the free-form surface shape, and is emitted from the emission surface of the emission portion 19*b*2. Specifically, as shown in an example of light beams illustrated in FIG. 50(*b*), the emitting light is condensed toward the reflection mirror 500, and a range of the light beams in the Z direction becomes narrow. For example, a light beam, which passes through an upper position of the optical axis lying at a center in the Z direction, is converted into a light beam directed obliquely downward, and a light beam, which passes through a lower position in the Z direction, is converted to a light beam directed obliquely upward.

The light that has passed through the light guide 19*b* is reflected upward in the Z direction by the reflection mirror 500. The reflected light is diffused while passing through the diffuser 18*b*, and is incident, as illumination light, on the panel surface of the liquid crystal display element 50. The illumination light is condensed through the light guide 19*b* and reflection mirror 500, and is converted into illumination light having a comparatively small area. In a plane of the diffuser 18*b*, an illumination area 501 due to condensation is indicated by a broken line. The illumination light passes through the illumination area 501. The illumination area 501 has a smaller area than that of the panel surface of the liquid crystal display element 50. The present embodiment indicates a case were the illumination light to the liquid crystal display element 50 is used as planar illumination light having a small area as shown by the illumination area 501 and, for example, corresponds to a case where the display area 4 of the HUD apparatus 1 has a relatively small area. In such use applications, a configuration of the light source apparatus 10 like the fourth modification example is preferable.

2-26: Fifth Modification Example

Figure 51:
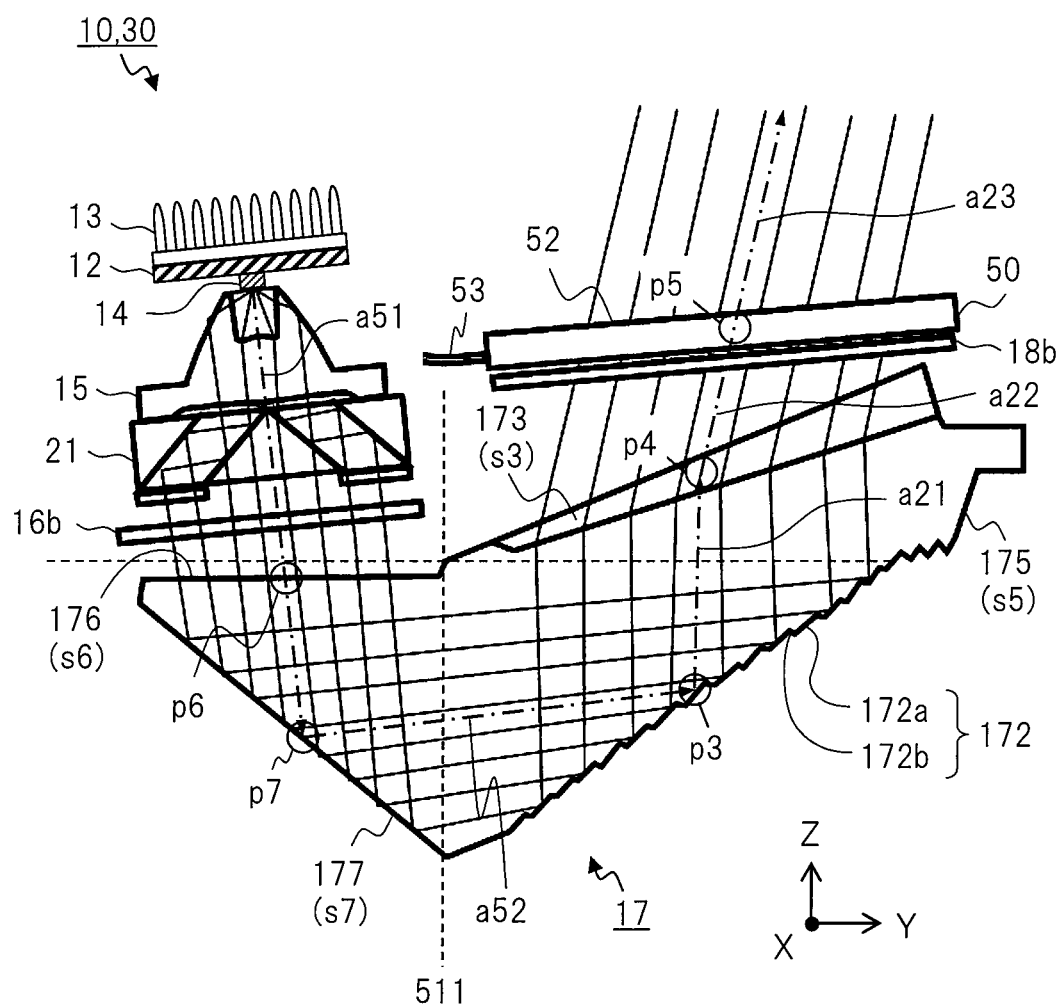
FIG. 51 is a perspective view showing configurations of a light source apparatus and an image display apparatus of a fifth modification example of Embodiment 2.

FIG. 51 is a perspective view showing configurations of a light source apparatus 10 and an image display apparatus 30 according to a fifth modification example of Embodiment 2. In FIG. 51, a configuration of a right portion in the Y direction from a broken line 511 in the Z direction is almost the same as that in FIG. 42 etc. described above, and includes a reflection portion 173, an emission portion 172, and a vertex portion 175. A configuration of a left portion in the Y direction from the broken line 511 is different. In this different configuration, an optical axis a51 of the LED element 14 is roughly along the vertical Z direction, and travels from top to bottom. The structures of the heat sink 13, LED substrate 12, LED element 14, LED collimator 15, polarization conversion element 21, and light distribution control plate 16*b* are almost the same as those of the above, and are different in arrangement direction.

The light guide 17 has a structure in which an incidence portion 176 (including an incidence surface s6) and a reflection portion 177 (including a reflection surface s7) are further added to its incidence side. A shape of the left portion in the Y direction from the broken line 511 of the light guide 17 has a roughly triangular prismatic shape, which extends in the X direction and whose Y-Z cross-section is substantially triangular. The incidence surface s6 of the incidence portion 176 is roughly disposed in a horizontal plane (X-Y plane). The reflection surface s7 of the reflection portion 177 is an incline having a predetermined angle to the horizontal plane. Similarly to the rightward reflection portion 173, the reflection surface s7 of the reflection portion 177 may be formed as a repetition of the reflection and connection surfaces, or is not limited thereto and may be configured by a reflective film etc.

The optical axis a51 from the LED element 14 etc. passes through the orientation control plate 16*b*, and is then incident on a point p51 on the incidence surface s6. Its optical axis a56 is reflected by a point p52 on the reflection surface s7 of the reflection portion 177, and becomes an optical axis a52 which roughly travels right in the Y direction. Similarly to the above optical axis a1, its optical axis a52 is reflected at a point p3 on the reflection surface s3 of the reflection portion 173, and roughly becomes the optical axis a2 (a21, a22, a23, etc.) directed upward in the Z direction.

A component such as the light source unit 301 is arranged in the Z direction by using the incidence portion 176 and the reflection portion 177 of the light guide 17, so that the configuration of the fifth modification example can make a dimension in the Y direction (depth direction) relatively smaller than those of Embodiments 1 and 2. This configuration is preferable, for example, when a depth direction of an arrangement space of the dashboard of the vehicle is limited. In the configuration of the fifth modification example, the incidence surface s6 of the incidence portion 176 is a plane (flat surface), but is not limited thereto and may have a free-form surface shape for realizing predetermined light distribution control characteristics.

2-27: Sixth Modification Example

As a light source apparatus 10 according to a sixth modification example of Embodiment 2, the incidence surface s1 of the incidence portion 171, the emission surface s3 of the emission portion 173, or the reflection surface S2 of the reflection portion 172 of the light guide 17 may be provided with textures, each of which constitutes a functional scattering surface similarly to FIG. 22 described above. For example, the texture as shown in FIG. 22 may be provided on the reflection surface s2 of the reflection portion 172 of the light guide 17 in Embodiment 2 and each modification example as described above. A spatial frequency component of surface roughness of the functional scattering surface is set to 10 nm or less in a high frequency region of 100/mm or more, for example.

FIG. 22(*a*) schematically shows a first example of the texture of a target surface (reflection surface s2). FIG. 22(*b*) schematically shows a second example of the texture of a target surface. In the texture of FIG. 22(*a*), boundaries among the plural reflection surfaces and connection surfaces are linearly arranged and formed. An extension direction of this straight line corresponds to the X direction in which the plural LED elements 14 etc. are arranged. Such a texture performs the light distribution control of light diffusion etc. in a direction in which the plural boundaries are arranged (a stepped incline direction; the Y direction on the corresponding emission surface s3). In the texture of FIG. 22(*b*), boundaries between the plural reflection surfaces and connection surfaces are each arranged and formed in a curved shape. This curved shape is formed so as to correspond to, for example, positions etc. where the plural LED elements 14 and collimator elements 15A are arranged. This makes it possible to perform more precise light distribution control.

In the foregoing, the present invention has been concretely described based on the embodiments. Needless to say, however, the present invention is not limited to the foregoing embodiments, and various modifications and alterations can be made within a range not departing from its gist. Made can be addition or deletion, separation or merging, substitution, and combination, etc. of the components of the embodiment.

EXPLANATION OF REFERENCE NUMERALS

1 . . . Head up display (HUD) apparatus; 3 . . . Windshield; 4 . . . Display area; 5 . . . Eye; 6 . . . Sightline; 7 . . . Virtual image; 10 ... Light source apparatus; 12 ... LED substrate; 13 ... Heat sink; 14 ... LED element; 15 ... LED collimator; 16b ... Orientation control plate; 17 ... Light guide; 18b ... Diffuser; 21 ... Polarization conversion element; 30 ... Image display apparatus; 41, 42 ... Reflection mirror; 43 ... Refraction element; 50 ... Liquid crystal Display element; 80 ... Housing; 81 ... Opening; 171 ... Incidence portion; 172 ... Reflection portion; and 173 ... Emission portion.

The invention claimed is:

1. A light source apparatus comprising:
a light source unit including a plurality of semiconductor light source elements generating light;
a collimator including a plurality of collimator elements each arranged on a light-emitting axis of each of the plural semiconductor light source elements; and
a light guide disposed on an emission side of the collimator,
wherein the light guide includes: an incidence portion having an incidence surface on which light on the light-emitting axis from the semiconductor light source element is incident; and an emission portion having an emission surface that emits the light, and the light guide has a free-form surface shape for realizing predetermined light distribution control on at least one of the incidence surface and the emission surface,
wherein the plural semiconductor light source elements and the plural collimator elements are arranged in a first direction orthogonal to the light-emitting axis,
wherein the light source unit, collimator, light guide are arranged in a second direction corresponding to the light-emitting axis, and
wherein the light guide has a columnar shape extending in the first direction, and includes a reflection portion having a reflection surface, the second-directional light incident on the incidence surface being reflected in a third direction orthogonal to the first and second directions and being caused to be emitted from the emission surface by the reflection surface.

2. The light source apparatus according to claim 1, wherein the light guide has a vertex portion, the vertex portion having a vertex surface that is tangent to one side of the emission surface and one side of the reflection portion on an opposite side to the incidence surface, the emission surface having a predetermined angle to the second direction.

3. The light source apparatus according to claim 1, wherein the reflection portion has a plurality of reflection surfaces and a plurality of connection surfaces, each of which has an angle equal to or larger than a critical angle to parallel, diffused light from the incidence surface, and the reflection and connection surfaces being alternately formed in a serrated shape.

4. The light source apparatus according to claim 1, wherein the reflection portion has a reflective film or a reflection mirror.

5. The light source apparatus according to claim 1, wherein a light distribution control plate or a diffuser for performing predetermined light distribution control is disposed on an incidence side of the incidence surface or on an emission side of the emission surface.

6. A light source apparatus comprising:
a light source unit including a plurality of semiconductor light source elements generating light;
a collimator including a plurality of collimator elements each arranged on a light-emitting axis of each of the plural semiconductor light source elements; and
a light guide disposed on an emission side of the collimator,
wherein the light guide includes: an incidence portion having an incidence surface on which light on the light-emitting axis from the semiconductor light source element is incident; and an emission portion having an emission surface that emits the light, and the light guide has a free-form surface shape for realizing predetermined light distribution control on at least one of the incidence surface and the emission surface,
wherein the plural semiconductor light source elements and the plural collimator elements are arranged in a first direction orthogonal to the light-emitting axis,
wherein the light source unit, collimator, light guide are arranged in a second direction corresponding to the light-emitting axis,
wherein the light guide guides, in the second direction, the second-directional light incident from the incidence surface, and causes it to be emitted from the emission surface, and
wherein the light source apparatus has a reflection mirror on an emission side of the light guide, the reflection mirror causing the second-directional light to be reflected in a third direction orthogonal to the first and second directions.

7. A light source apparatus comprising:
a light source unit including a plurality of semiconductor light source elements generating light;
a collimator including a plurality of collimator elements each arranged on a light-emitting axis of each of the plural semiconductor light source elements; and
a light guide disposed on an emission side of the collimator,
wherein the light guide includes: an incidence portion having an incidence surface on which light on the light-emitting axis from the semiconductor light source element is incident; and an emission portion having an emission surface that emits the light, and the light guide has a free-form surface shape for realizing predetermined light distribution control on at least one of the incidence surface and the emission surface,
wherein the plural semiconductor light source elements and the plural collimator elements are arranged in a first direction orthogonal to the light-emitting axis,
wherein the light source unit and collimator are arranged in a second direction corresponding to the light-emitting axis, and
wherein the light guide includes:
the incidence portion having the incidence surface on which the second-directional light from the collimator is incident;
a first reflection portion having a first reflection surface, the first reflection surface causing the second-directional light incident from the incidence surface to be reflected in a third direction orthogonal to the first and second directions;
a second reflection portion having a second reflection surface, the second reflection surface causing the reflected third-directional light to be reflected in the second direction; and
the emission portion having the emission surface, the reflected second-directional light being emitted from the emission surface.

8. A light source apparatus comprising:
a light source unit including a plurality of semiconductor light source elements generating light;

a collimator including a plurality of collimator elements each arranged on a light-emitting axis of each of the plural semiconductor light source elements; and a light guide disposed on an emission side of the collimator, wherein the light guide includes: an incidence portion having an incidence surface on which light on the light-emitting axis from the semiconductor light source element is incident; and an emission portion having an emission surface that emits the light, and the light guide has a free-form surface shape for realizing predetermined light distribution control on at least one of the incidence surface and the emission surface, wherein the light source apparatus further comprises a polarization conversion element disposed on an emission side of the collimator, wherein the plural semiconductor light source elements and the plural collimator elements are arranged in a first direction orthogonal to the light-emitting axis, and wherein the polarization conversion element includes a polarizing beam splitter and a wave plate, which extend in the first direction and are arranged at positions symmetrical to each other in a plane formed by the first direction and the second direction corresponding to the light-emitting axis.

9. A head up display apparatus projecting image light onto a display area of a windshield of a vehicle or a combiner and providing a virtual image to a driver by reflected light, the head up display apparatus comprising:

a light source apparatus generating and emitting illumination light, and an image display apparatus including a display element, the display element generating and emitting the image light based on the illumination light; and an adjustment optical system including an optical element for guiding the image light to the display area of the windshield or combiner while the image light is reflected, wherein the light source apparatus has:
  a light source unit including a plurality of semiconductor light source elements for generating light;
  a collimator including a plurality of collimator elements each arranged on a light-emitting axis of each of the plural semiconductor light source elements; and
  a light guide is disposed on an emission side of the collimator, wherein the light guide includes: an incidence portion having an incidence surface on which light on the light-emitting axis from the semiconductor light source element is incident; and an emission portion having an emission surface emitting the light, and has a free-form surface shape for realizing predetermined light distribution control on at least one of the incidence surface and the emission surface, wherein the plural semiconductor light source elements and the plural collimator elements are arranged in a first direction orthogonal to the light-emitting axis, wherein the light source unit, collimator, light guide are arranged in a second direction corresponding to the light-emitting axis, and wherein the light guide has a columnar shape extending in the first direction, and includes a reflection portion having a reflection surface, the second-directional light incident on the incidence surface being reflected in a third direction orthogonal to the first and second directions and being caused to be emitted from the emission surface by the reflection surface.

10. The head up display apparatus according to claim 9, wherein a normal-line direction of a display surface of the display element and a normal-line direction of the optical element form an angle of 10° or more to a direction of an optical axis of emitting light from the light source apparatus.

11. The head up display apparatus according to claim 9, further comprising, as the optical element of the adjustment optical system, a refraction element refracting the image light from the display element, and one or more reflection mirrors reflecting the refracted light, wherein a normal-line direction of the refraction element forms an angle of 10° or more to a direction of an optical axis of emitting light from the light source apparatus.

12. The head up display apparatus according to claim 9, wherein the light guide has a vertex portion, the vertex portion having a vertex surface that is tangent to one side of the emission surface and one side of the reflection portion on an opposite side to the incidence surface, the emission surface having a predetermined angle to the second direction.

13. The head up display apparatus according to claim 9, wherein the reflection portion has a plurality of reflection surfaces and a plurality of connection surfaces, each of which has an angle equal to or larger than a critical angle to parallel, diffused light from the incidence surface, and the reflection and connection surfaces being alternately formed in a serrated shape.

14. The head up display apparatus according to claim 9, wherein the reflection portion has a reflective film or a reflection mirror.

15. A head up display apparatus projecting image light onto a display area of a windshield of a vehicle or a combiner and providing a virtual image to a driver by reflected light, the head up display apparatus comprising:

a light source apparatus generating and emitting illumination light, and an image display apparatus including a display element, the display element generating and emitting the image light based on the illumination light; and an adjustment optical system including an optical element for guiding the image light to the display area of the windshield or combiner while the image light is reflected, wherein the light source apparatus has:
  a light source unit including a plurality of semiconductor light source elements for generating light;
  a collimator including a plurality of collimator elements each arranged on a light-emitting axis of each of the plural semiconductor light source elements; and
  a light guide is disposed on an emission side of the collimator, wherein the light guide includes: an incidence portion having an incidence surface on which light on the light-emitting axis from the semiconductor light source element is incident; and an emission portion having an emission surface emitting the light, and has a free-form surface shape for realizing predetermined light distribution control on at least one of the incidence surface and the emission surface, wherein the plural semiconductor light source elements and the plural collimator elements are arranged in a first direction orthogonal to the light-emitting axis, wherein the light source unit, collimator, light guide are arranged in a second direction corresponding to the light-emitting axis, wherein the light guide guides, in the second direction, the second-directional light incident from the incidence surface, and causes it to be emitted from the emission surface, and wherein the light source apparatus has a reflection mirror on an emission side of the light guide, the reflection mirror causing the second-directional light to be reflected in a third direction orthogonal to the first and second directions.

16. The head up display apparatus according to claim 15, wherein a normal-line direction of a display surface of the display element and a normal-line direction of the optical element form an angle of 10° or more to a direction of an optical axis of emitting light from the light source apparatus.

17. The head up display apparatus according to claim 15, further comprising, as the optical element of the adjustment optical system, a refraction element refracting the image light from the display element, and one or more reflection mirrors reflecting the refracted light, wherein a normal-line direction of the refraction element forms an angle of 10° or more to a direction of an optical axis of emitting light from the light source apparatus.

* * * * *